United States Patent
Liu et al.

(10) Patent No.: US 12,529,697 B2
(45) Date of Patent: Jan. 20, 2026

(54) SYSTEM AND METHOD FOR DETECTING, ENUMERATING, OR EXTRACTING MICROORGANISMS IN A SAMPLE

(71) Applicant: Microsensor Labs, LLC, Chicago, IL (US)

(72) Inventors: Peng Liu, Chicago, IL (US); Zerikhun Filatov, Chicago, IL (US)

(73) Assignee: Microsensor Labs, LLC, Chicago, IL (US)

( * ) Notice: Subject to any disclaimer, the term of this patent is extended or adjusted under 35 U.S.C. 154(b) by 0 days.

(21) Appl. No.: 18/648,822

(22) Filed: Apr. 29, 2024

(65) Prior Publication Data

US 2024/0361308 A1    Oct. 31, 2024

Related U.S. Application Data

(60) Provisional application No. 63/462,801, filed on Apr. 28, 2023.

(51) Int. Cl.
*G01N 33/543*    (2006.01)
*G01N 33/569*    (2006.01)
*G01N 35/00*    (2006.01)

(52) U.S. Cl.
CPC .  *G01N 33/54326* (2013.01); *G01N 33/56916* (2013.01); *G01N 35/0098* (2013.01)

(58) Field of Classification Search
CPC ....... G01N 33/54326; G01N 33/56916; G01N 35/0098; C12Q 1/04
See application file for complete search history.

(56) References Cited

U.S. PATENT DOCUMENTS

| | | | |
|---|---|---|---|
| 5,491,068 A | 2/1996 | Benjamin | |
| 5,821,066 A | 10/1998 | Pyle | |
| 10,780,444 B2 | 9/2020 | Liu | |
| 2003/0157706 A1 | 8/2003 | Hamilton | |
| 2021/0001339 A1 | 1/2021 | Liu | |
| 2021/0156772 A1 | 5/2021 | Mcnaughton | |
| 2024/0240264 A1* | 7/2024 | Velineni | C12Q 1/6851 |

OTHER PUBLICATIONS

Almejhim et al. Improved isolation and detection of toxigenic Vibrio parahaemolyticus from coastal water in Saudi Arabia using immunomagnetic enrichment. PeerJ 9:e12402 DOI 10.7717/peerj.12402 (Oct. 29, 2021).*

(Continued)

*Primary Examiner* — Gailene Gabel

(74) *Attorney, Agent, or Firm* — Lempia Summerfield Katz LLC

(57) ABSTRACT

A system and method for detecting, enumerating, or extracting microorganisms in a sample is disclosed. Target microorganisms, such as *Salmonella* bacteria, may be of interest. Magnetic beads may be bound to the target microorganisms. After which, the bead-bound cells may be isolated. For example, a magnetic field may be applied in order to separate the target cells (with the magnetic beads attached thereto) and move then to a predetermined section of the well. Agar, or other immobilizing agent, may be added to the wells in order to immobilize the target cells. After which, the target cells are incubated and periodically analyzed to determine whether the target cells are growing, thereby indicating that the microorganisms are contained within the well.

18 Claims, 25 Drawing Sheets

(56) References Cited

OTHER PUBLICATIONS

Beyor et al. Immunomagnetic bead-based cell concentration microdevice for dilute pathogen detection. Biomed Microdevices 10: 909-917 (2008).*

Search Report for International App. PCT/US2024/026772 mailed Aug. 26, 2024.

Written Opinion for International App. PCT/US2024/026772 mailed Aug. 26, 2024.

Acharya Tankeshwar, Pour Plate Method: Procedure, Uses, (Dis)Advantages, Microbe Online, General Microbiology https://microbeonline.com/pour-plate-method-principle-procedure-uses-disadvantages/, Oct. 4, 2022, 2023 Microbe Online.

Acharya Tankeshwar, Streak Plate Method: Principle, Procedure, Uses, Microbe Online, General Microbiology https://microbeonline/streak-plate-method-principle-purpose-procedure-results/, Oct. 28, 2022, 2023 Microbe Online.

How EasySep Magnetic Cell Separation Technology Works: Fast and Easy Cell Isolation, YouTube, https://www.youtube.com/watch?v=mjTwPMWv7qs, May 2, 2016, Stemcell Technologies.

Nisha Rijal, Chromogenic Culture Media: Principle, Composition, Results, Microbe Online, Culture Media https://microbeonline.com/chromogenic-culture-media-principle-composition-and-results/, Jan. 9, 2024, 2024 Microbe Online.

Nisha Rijal, Spread Plate Technique: Principle, Procedure, Results, Microbe Online, General Microbiology https://microbeonline.com/spread-plate-technique/, Oct. 28, 2022, 2023 Microbe Online.

\* cited by examiner

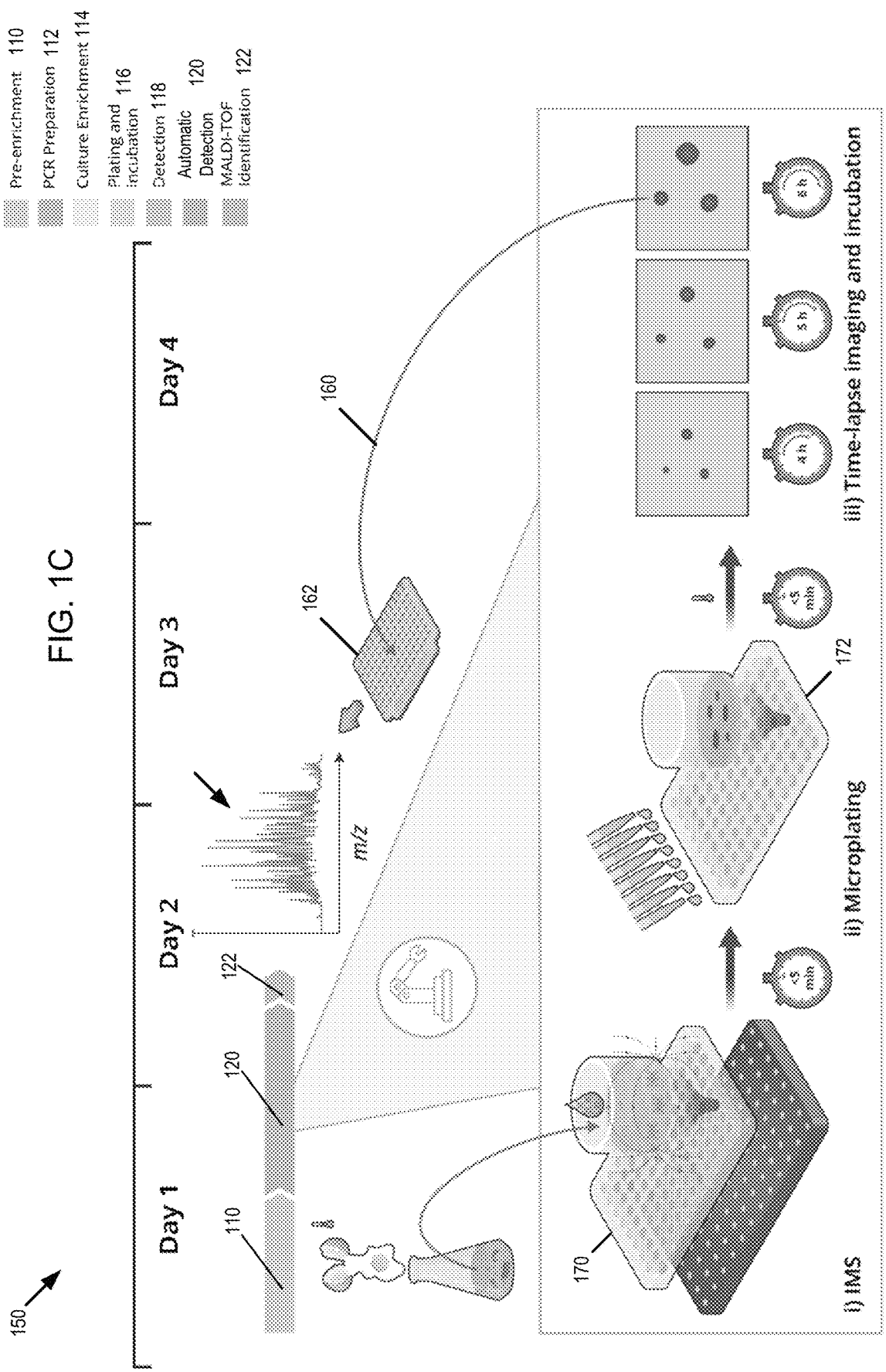

Pre-incubation 4 hours 12 hours

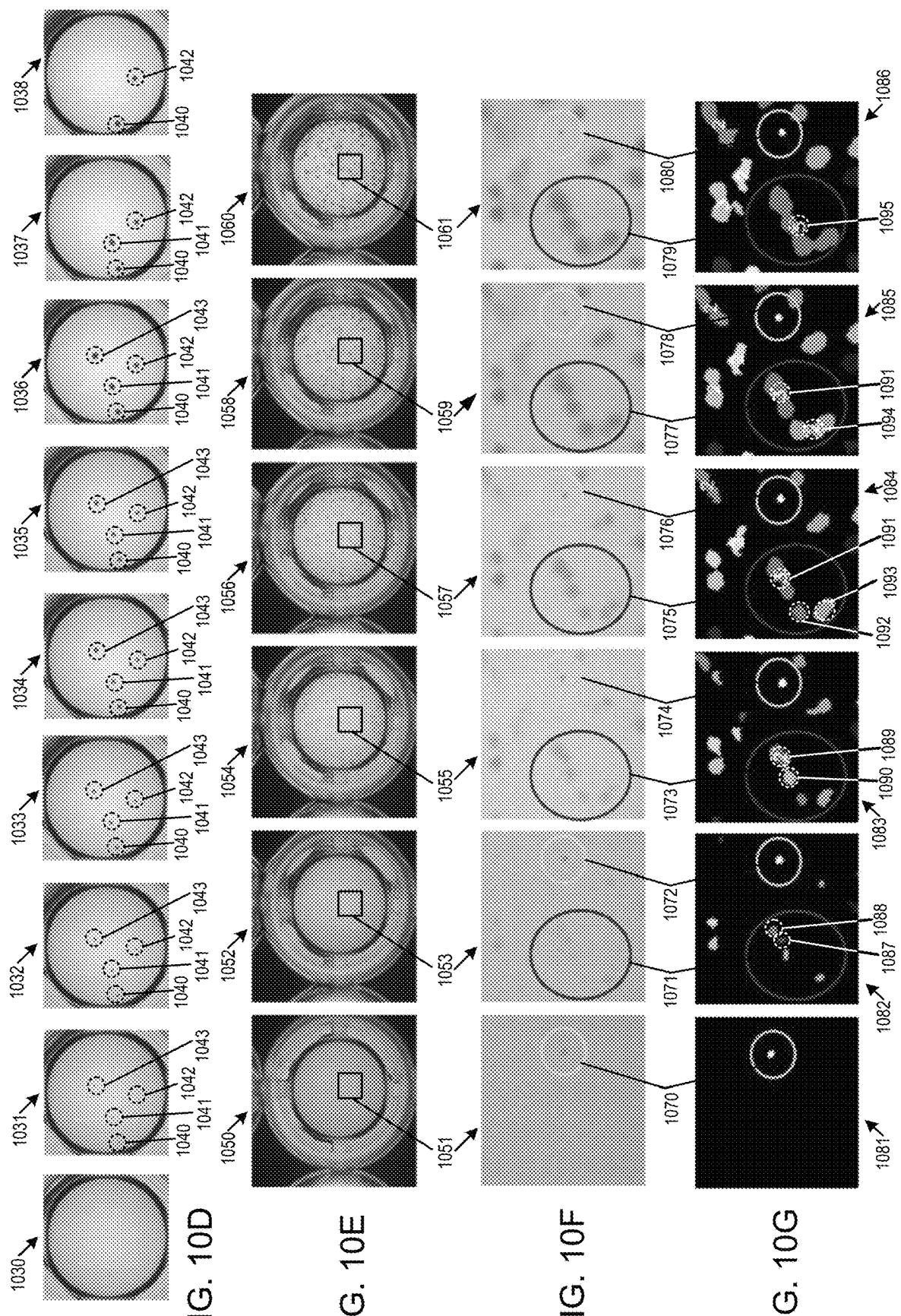

SYSTEM AND METHOD FOR DETECTING, ENUMERATING, OR EXTRACTING MICROORGANISMS IN A SAMPLE

REFERENCE TO RELATED APPLICATION

The present application claims priority to U.S. Provisional Application Ser. No. 63/462,801 (filed on Apr. 28, 2023), which is incorporated by reference herein in its entirety.

TECHNICAL FIELD

The present application relates generally to analysis of a sample, and more particularly to analysis of a food or environment sample for the presence of a pathogen, such as *Salmonella*.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

*Salmonella* infection, per CDC estimation, annually causes about 1.35 million illnesses and is the leading cause for foodborne illness hospitalizations (approximately 26,500) and deaths (approximately 450) in the United States. The *Salmonella* infection rates have remained virtually unchanged since 2000. It is estimated that 95% of *Salmonella* infections are due to the consumption of contaminated food, according to several prevalence studies conducted in the United States.

Current testing of *Salmonella* in food and environmental samples may be divided into three stages: (i) detection of the presence or absence of the pathogen; (ii) identification of the isolate as *Salmonella* and its specific serovar designation; and (iii) subtyping of the isolate for association with any clinical cases of *salmonellosis*. Current technologies for identification and subtyping, including matrix-assisted laser desorption/ionization-time of flight (MALDI-TOF) mass spectrometry and whole genome sequencing, require a single colony or pure culture to begin with. Therefore, it is desired to have *Salmonella* isolates available as soon as it is detected.

Culture-based techniques have been the principal means in bacterial pathogen testing due to their detection sensitivity (with a theoretical detection limit of 1 colony-forming unit (CFU)) and ability to isolate bacteria in colonies. Therefore, culture-based detection methods have been the gold standard of regulatory agencies for decades. For example, culture-based reference methods for *Salmonella* detection in food include the Food and Drug Administration (FDA) Bacteriological Analytical Manual (BAM), the United States Department of Agriculture (USDA) Microbiological Laboratory Guidebook (MLG), and the ISO 6579-1:2017 Microbiology of the food chain—Horizontal method for the detection, enumeration and serotyping of *Salmonella*—Part 1: Detection of *Salmonella*.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 1C is an illustration of a workflow for detection and confirmation of *Salmonella* using one example implementation of the present invention.

FIG. 10D are time lapse images of well E10 from the 96-well plate depicted in FIGS. 10A-C when incubated for 6-12 hours and after picking two colonies after 12 hour incubation.

FIG. 10E are time lapse images of well B11 from the 96-well plate depicted in FIGS. 10A-C, with FIG. 10F being a zoom-in of the area of interest depicted in FIG. 10E.

FIG. 10G depicts post processing analysis of the images depicted in FIG. 10F illustrating how the automated system and method detects and enumerates colonies (e.g., *Salmonella* colonies).

SUMMARY

In one or some embodiments, a method for detecting, enumerating, or extracting of one or more colonies of microorganisms from a sample is disclosed. The method includes: after performing immunomagnetic separation in order to separate one or more bead-bound cells and the one or more bead-bound cells are plated, incubating the one or more bead-bound cells in order to generate one or more colonies formed by the one or more bead-bound cells; and performing one or more of detecting, enumerating, or extracting the one or more colonies formed by the one or more bead-bound cells.

In one or some embodiments, at least one apparatus configured for isolation and detecting, enumerating, or extracting of one or more colonies of microorganisms from a sample is disclosed. The at least one apparatus includes: at least one receptacle (such as a well and/or a Petri dish) configured to incubate one or more bead-bound cells in order to generate one or more colonies formed by the one or more bead-bound cells, the one or more bead-bound cells being formed by immunomagnetic separation; at least one imaging sensor; and at least one processor in communication with the at least one imaging sensor. The at least one processor is configured to: perform at least one of detecting, enumerating, or extracting the one or more colonies formed by the one or more bead-bound cells.

DETAILED DESCRIPTION OF EMBODIMENTS

Figure 1A:
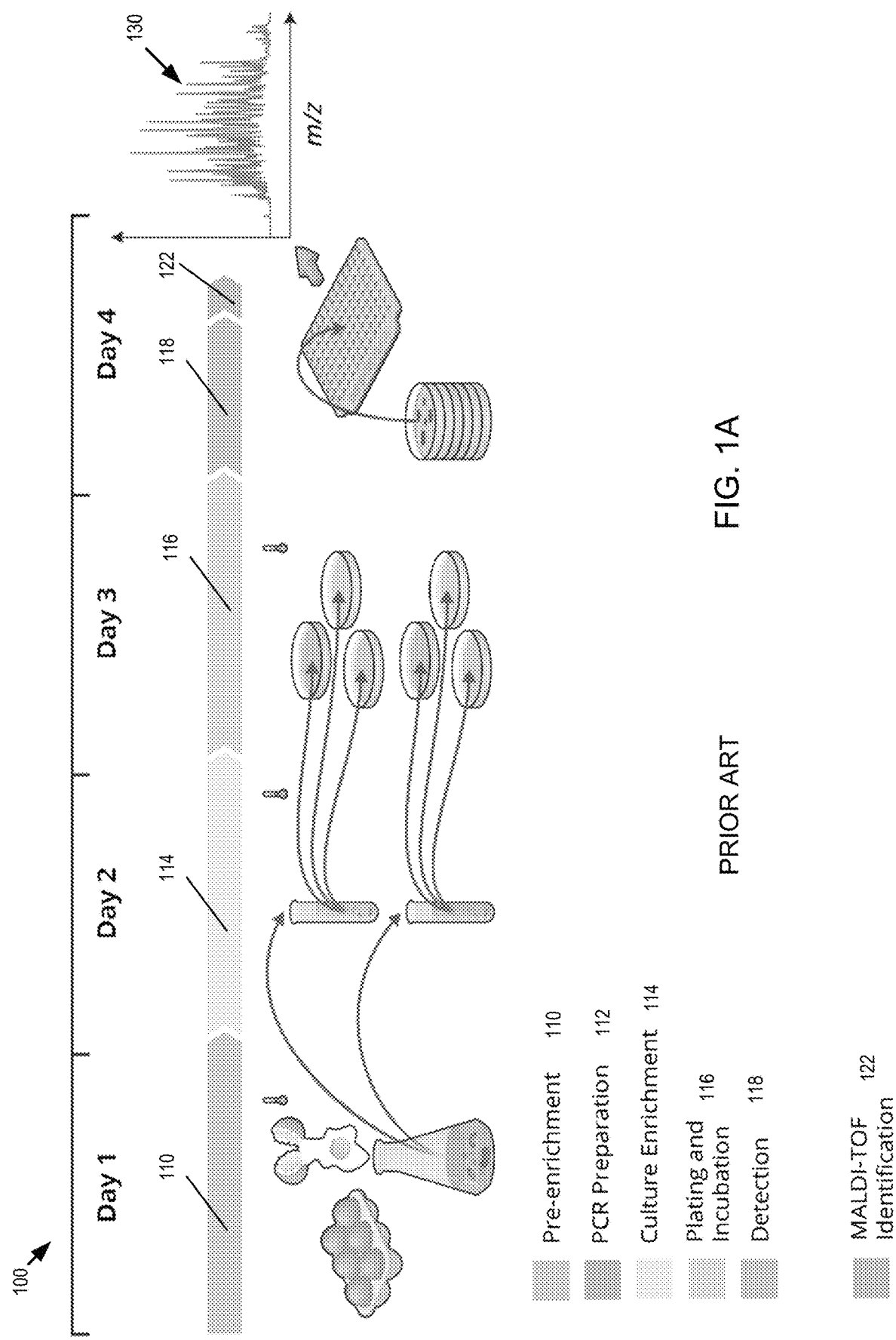
FIG. 1A is an illustration of a workflow for detection and confirmation of *Salmonella* using the Bacteriological Analytical Manual (BAM) methodology.

As discussed in the background, culture-based techniques have been considered the gold standard of testing for decades due to their detection sensitivity and have been. However, this conventional approach suffers from several shortcomings. First, the detection step may take a very long time. This is illustrated in diagram 100 in FIG. 1A. For example, the current *Salmonella* detection method used by the FDA Bacteriological Analytical Manual (BAM) requires 4 days to complete, as shown by the time span to perform the pre-enrichment step 110, the culture enrichment 114, the plating and incubation 116, the detection 118, and the matrix-assisted laser desorption/ionization Time-of-Flight mass-spectrometer (MALDI-TOF) 122. Specifically, FIG. 1A illustrates The FDA BAM method for *Salmonella* detection, which includes a 24-hour resuscitation in non-selective pre-enrichment broth (see pre-enrichment step 110), followed by parallel 24-hour selective enrichments in Tetrathionate (TT) and Rappaport-Vassiliadis (RV) broths to reduce the growth of competitive flora (see culture enrichment 114). TT and RV broths are then respectively plated on three selective agar petri dishes and incubated for another 24 hours (see plating an incubation 116) before colonies can be detected on day 4 (see detection 118). Isolated presumptive *Salmonella* colonies are picked out and smeared onto a target plate for identification and subtyping by MALDI-TOF mass spectrometry (illustrated by graph 130).

For many food commodities, especially fresh produce, this time frame as illustrated in FIG. 1A is far too long to effectively test food vehicles before they are consumed or to hold in warehouses while awaiting test results before the food spoils. Second, the traditional culture-based detection methods are very labor intensive, require well-trained personnel, take up a large bench space, and thus are not suitable for high throughput food pathogen testing. Furthermore, the repetitive manual operations are subject to human errors (e.g., cross contamination), which may impact the quality of results, and can even present risks to human health and to the environment.

Figure 1B:
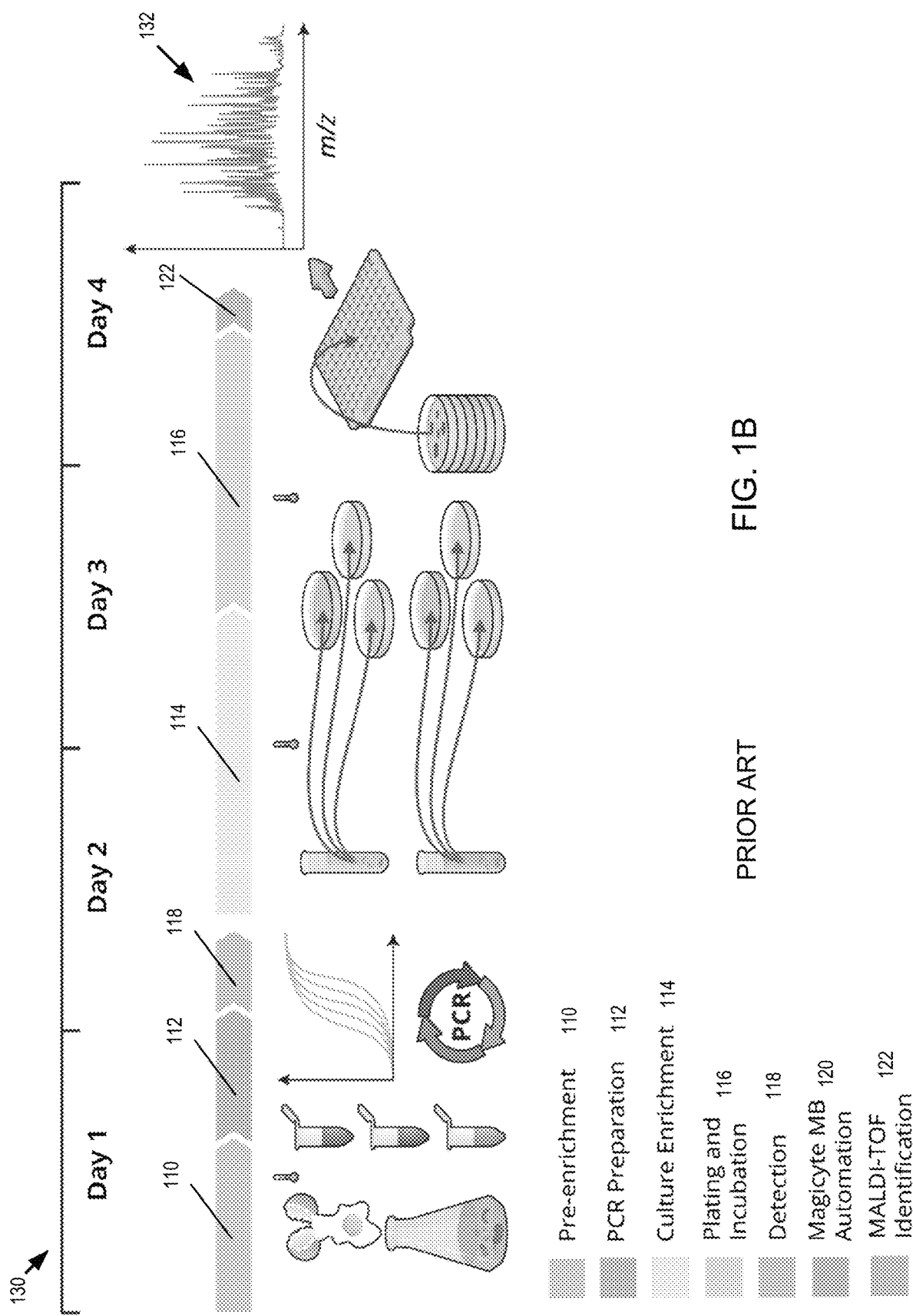
FIG. 1B is an illustration of a workflow for detection and confirmation of *Salmonella* using Polymerase Chain Reaction (PCR) technology.

Alternative testing methods, such as Polymerase Chain Reaction (PCR) technology have been widely used in food pathogen testing for faster detection results-usually the presence or absence of pathogens can be reported in the same day or next day. This is illustrated in graph 130 in FIG. 1B. Specifically, PCR detection method allows detection results to be available in the same or next day with a shorter pre-enrichment step of 6-12 hours (see pre-enrichment step 110 in FIG. 1B), following by PCR preparation 112 and detection 118. However, for confirmation of presumptive samples, bacteria culture may be conducted to isolate single colonies from the pre-enriched sample including culture enrichment 114, plating and incubation 116, and then isolated colonies of interest are picked for MALDI-TOF identification (illustrated by graph 132).

While PCR technology may reduce the time to detect pathogens (e.g., bacteria causing illness), they also have several limitations. Foremost, for presumptive positive samples, these methods do not provide pathogen isolates which are required by subsequent analysis. As a result, culture-based methods must be used to acquire colonies, which takes several days. In addition, PCR preparation steps are labor intensive and require well-trained personnel. PCR detection may also suffer from a high rate of false positives due to the test's inability to distinguish between live and dead cells.

Thus, in one or some embodiments, a method and system are disclosed that are configured to perform any one, any combination, or all of: detection of microorganisms in a sample; enumeration of microorganisms in the sample; or extraction of microorganisms in the sample. In one or some embodiments, this detection, enumeration, and/or extraction may be performed after any one, any combination, or all of: performing immunomagnetic separation (IMS) in order to separate one or more bead-bound cells; plating (e.g., placement on a Petri dish and/or in a well) of the one or more bead-bound cells; or generating diluted samples. In particular, after IMS and/or plating and/or diluting, the bead-bound cells may be cultured (such as by using agar). In this regard, the present disclosure is in contrast with previous uses of IMS, which do not thereafter culture the bead-bound cells (such as in a liquid medium and/or a solid medium), instead performing other operations, such as PCR.

In particular, in one or some embodiments, a method and system are disclosed that detects microorganisms in a sample to improve on one or more aspects of the culture-based testing method or the PCR testing method. As discussed in more detail below, the disclosed system and method are configured to be any one, any combination, or all of: quicker; more cost-effective; more automated; or more high-throughput. Merely by way of example, the disclosed method and system, when compared to conventional methods, may reduce the time-to-result and labor cost by multiple times (e.g., by fourfold), while still preserving bacterial colonies for further use and analysis. In this regard, the method and system may be used as an automated platform to rapidly isolate and detect pathogens, such as *Salmonella* (e.g., detect a particular strain of *Salmonella* from other strains of *Salmonella* or other bacteria).

Thus, in one or some embodiments, a method and system for isolation (such as rapid isolation) and detection (such as rapid detection) of a microorganism in the formation of discrete colonies is disclosed. In one or some embodiments, the method and system comprise an immunomagnetic separation (IMS) following by combining with an immobilizing medium (such as combining with agar, an agarose medium, or the like). As discussed in more detail below, the immobilizing medium may have one or more characteristics or functions, such as any one, any combination, or all of: (i) immobilizing cells within the immobilizing medium (e.g., changing its state from liquid to a more solid state (such as a gelatinous state) in order to immobilize the cells); (ii) providing at least one substance (e.g., saccharides, such as polysaccharides) to act as a growth agent during incubation (e.g., the substance may be tailored to culture specific cells of interest; and/or (iii) providing the at least one substance to modify at least one characteristic of the colony during incubation (e.g., the substance may change the color of the colony so that image analysis may more easily identify the colony as a colony of interest). Further, any discussion regarding agar herein may be applied to any immobilizing medium configured to perform one or both of immobilizing or providing a growth agent. Agar may be focused on bacterial growth. Other immobilizing agents, such as hydrogels, may be used to grow cells, such as cells other than bacteria.

In one or some embodiments, the combining with an immobilizing medium may comprise any one, any combination, or all of the following plating methods: streaking plating method (e.g., cells are added onto the surface of agar); spreading plating method; pouring plating method (e.g., sample is added over or onto a solid agar surface or other solid immobilizing medium); or pouring liquid immobilizing medium onto the same. In this regard, plating may use a variety of different types of hardware, such as Petri dishes and/or wells. Other types of hardware are contemplated.

In one or some embodiments, streaking may be used to isolate the microorganisms (e.g., bacteria) from a mixed population into a pure culture. For example, the sample may be streaked over an agar surface (such as a solid agar surface) in order to thin out the bacteria. By streaking, a dilution gradient may be established across the surface of the agar plate. Alternatively, other types of dilution may be performed, as discussed further below. Because of this, confluent growth may occur on the part of surface where the bacterial cells are not sufficiently separated; in other regions where few bacteria are deposited, separate macroscopic colonies develop. Various types of streaking are contemplated including: quadrant streaking; T-streak; continuous streak; or radiant streak.

In one or some embodiments, spread plating may be used. For example, a fixed volume of sample, such as 0.1 mL, may be removed from a tube and placed onto an agar surface (such as a solid agar surface). The sample may then spread (such as evenly spread) over the agar surface using a sterile, bent glass rod.

In one or some embodiments, pour plating may be used. For example, a fixed amount of inoculum (such as 1 ml) from a sample may be placed in the center of a sterile surface using a sterile pipette. Molten cooled agar (such as 15 mL) may then be poured into the well containing the inoculum. In one or some embodiments, a magnetic field is applied at least partly during any one, any combination, or all of: prior to pouring the liquid agar into the well; while the liquid agar is being poured into the well; while the liquid agar (after being poured into the well) is cooling; or after the liquid agar is cooled. Thus, in a specific embodiment, the magnetic field is applied while the liquid agar is being poured and while the liquid agar is cooling. The application of the magnetic field may be performed whether the sample is placed on a bed of solid agar or is not (e.g., on the bottom of the well). Applying the magnetic field may enable the bead-bound cells to be in a predetermined part of the well (such as at the bottom of the well or on remain on the solid bed of agar in the well).

In one or some embodiments, after IMS, during or as part of plating, a sample may be diluted. In particular, when performing one or more operations, such as one or both of enumeration or extraction, dilution of the sample may be performed. In one or some embodiments, at least a predetermined number of beads may be introduced for binding in the sample. As one example, 100 thousand antibody conjugated beads may be introduced, meaning that in a sample with 100 thousand target cells or more (to which the antibody conjugated beads will bind to), there are, ideally, 100 thousand bindings. As another example, while 100 thousand antibody conjugated beads may be introduced, in a sample with 1,000 target cells, there are, ideally, 1,000 bindings. As still another example, while 100 thousand antibody conjugated beads may be introduced, in a sample with 10 target cells, there are, ideally, 10 bindings. Because there is potentially such a large range of values of target cells and because the wells are of limited size, it may be difficult both to enumerate the number of target cells and/or to extract the target cells. In the example of a sample with 100 thousand target cells (and 100 thousand bindings), it would be extremely difficult to enumerate that number in a well since there are so many bound cells or to extract a bead-bound target cell. In this regard, dilution may assist in enumeration and/or extraction. Given the limitations (both physical with the limited space of the well and electronic with the limited resolution of imaging), there is typically a dynamic range where enumeration and/or extraction may be reliably performed. In one or some embodiments, the dynamic range is the same for both enumeration and extraction. Alternatively, the dynamic range is different for enumeration and extraction (e.g., mutually exclusive of one another or only partly overlapping). As one example, the dynamic range for enumeration may be 1-200 and the dynamic range for extraction is 1-100 (e.g., 1-50). In this regard, dilution may be performed in order for one or more wells to be within the dynamic range for one or both of enumeration or extraction.

In practice, dilution may occur by iteratively extracting a portion from a respective sample. In the example of a sample with 100 thousand target cells, a predetermined portion (such as 10% of the original sample) may be extracted of the original sample from a well (e.g., well #1) and placed in another well (e.g., well #2) along with buffer (e.g., buffer that comprises the other 90%) (e.g., the original sample is 100 microliters; 10 microliters are extracted and placed in a separate well that has 90 microliters of buffer). If the sample has at least 100 thousand target cells (with 100 thousand bindings to beads), the 10% extracted would ideally contain 10 thousand target cells (with 10 thousand bead-bound cells), leaving 90 thousand bead-bound target cells in the original sample. This process may be performed iteratively, meaning the predetermined portion (e.g., 10%) is extracted from well #2 and placed into well #3. In the example of 100 thousand bead-bound cells in the original sample, well #2 would ideally have 10 thousand bead-bound target cells, meaning extracting 10% would leave 9 thousand bead-bound target cells in well #2 with 1 thousand bead-bound target cells in well #3. With another iteration, the predetermined portion (e.g., 10%) is extracted from well #3 and placed into well #4 (ideally leaving 900 bead-bound target cells in well #3 and 100 bead-bound target cells in well #4). In yet another iteration, the predetermined portion (e.g., 10%) is extracted from well #4 and placed into well #5 (ideally leaving 90 bead-bound target cells in well #4 and 10 bead-bound target cells in well #5). In still another iteration, the predetermined portion (e.g., 10%) is extracted from well #4 and placed into well #5 (ideally leaving 9 bead-bound target cells in well #5 and 1 bead-bound target cells in well #6). In this regard, one or more of the wells (such as wells #4, #5 and #6) are within the dynamic range. As discussed in more detail below, the dilution may be performed in a first set of wells (such as on a first well plate) and thereafter the contents of the first set of wells may be transferred to a second set of wells (which may be on a second well plate), with the second set of wells having agar or other type of growth medium, with the second set of wells then being subject to enumeration and/or extraction.

In the example of a sample with 1,000 target cells, the different wells ideally would have: well #1 (900 bead-bound target cells); well #2 (90 bead-bound target cells); well #3 (9 bead-bound target cells); well #4 (1 bead-bound target cell); well #5 (0 bead-bound target cells); well #6 (0 bead-bound target cells), again leading to wells #2, #3, and #4 being within the dynamic range. It is noted that in this example (with 1,000 target cells), there will be 99 thousand free beads that do not bind with any target cells. In one or some embodiments, the free beads need not be removed from one, some, or any of the wells, thereby avoiding an additional step.

It is further noted that the number of beads (e.g., 100 thousand beads) and/or the number of iterative dilutions may be modified based on the amount of desired resolution and/or the dynamic range. As one example, if it is desired to enumerate at least 1 million target cells in the sample, the number of beads may be increased to 1 million and the number of iterative dilutions may likewise increase (such as to 7 wells). As another example, if it is desired to enumerate at least 100 million target cells in the sample, the number of beads may be increased to 100 million and the number of iterative dilutions may likewise increase (such as to 9 wells).

Thus, in one or some embodiments, after IMS, plating occurs in preparation for incubation/analysis (e.g., performing any one, any combination, or all of: detection of colony/colonies; enumeration (such as counting) of colony/colonies; or colony picking of the one or more colonies). In this regard, one or more images may be obtained of the well(s) during incubation. This is in contrast to prior methodologies, which performed other operations, such as Immunoassay or PCR, as discussed above. More specifically, in one or some embodiments, the plating of the samples occurs without the step of removing the beads from the bead-bound cells. As discussed in more detail below, in certain embodiments, the beads from the bead-bound cells may be used as part of the processing, such as by applying a magnetic field in order to position the bead-bound cells prior to and/or during culturing of the bead-bound cells and/or in order to colony pick. Further, the beads may be on the order of 1 micron, which may be much smaller than the size of the colonies, which may be on the order of 10 microns (e.g., greater than 10 microns and/or less than 100 microns). So, because the beads are at least a factor of ½ the size of the colonies, at least a factor of ⅓ the size of the colonies, at least a factor of ¼ the size of the colonies, at least a factor of ⅕ the size of the colonies, at least a factor of 1/10 the size of the colonies, the beads need not be removed. In this regard, apart from the need to perform the additional step of removing the beads from the bead-bound cells, the beads in the bead-bound cells may be used in the processing.

As one example, plating may comprise placing the bead-bound cell onto a surface of agar or an agar mixture, wherein the surface of the agar or the agar mixture is sufficiently solid. For example, a well may be coated with a film of agar or an agar mixture that is in solid form. After performing the IMS in a first well, the bead-bound cell may be extracted from the first well and then placed onto the surface of the agar or agar mixture in a second well that is separate from the first well. Further, various definitions of solid are contemplated. As one example, sufficiently solid may be such that the bead-bound cell sits on the surface without the bead-bound cell fully penetrating the surface so that the bead-bound cell is not immersed within the agar or the agar mixture (e.g., the bead-bound cell is less than 100% immersed within the agar or the agar mixture; the bead-bound cell is less than 95% immersed within the agar or the agar mixture; the bead-bound cell is less than 90% immersed within the agar or the agar mixture; the bead-bound cell is less than 80% immersed within the agar or the agar mixture; the bead-bound cell is less than 70% immersed within the agar or the agar mixture; the bead-bound cell is less than 60% immersed within the agar or the agar mixture; the bead-bound cell is less than 50% immersed within the agar or the agar mixture; the bead-bound cell is less than 40% immersed within the agar or the agar mixture; the bead-bound cell is less than 30% immersed within the agar or the agar mixture; the bead-bound cell is less than 20% immersed within the agar or the agar mixture; the bead-bound cell is less than 10% immersed within the agar or the agar mixture; the bead-bound cell is less than 5% immersed within the agar or the agar mixture; the bead-bound cell is less than 4% immersed within the agar or the agar mixture; the bead-bound cell is less than 3% immersed within the agar or the agar mixture; the bead-bound cell is less than 2% immersed within the agar or the agar mixture; the bead-bound cell is less than 1% immersed within the agar or the agar mixture; or the bead-bound cell is not immersed at all within the agar or the agar mixture). Thus, in one or some embodiments, the agar or agar mixture may be a gel or gelatinous but may be sufficiently solid to support the bead-bound cell on its surface.

In one embodiment, after placing the bead-bound cell onto the surface of agar or the agar mixture that is sufficiently solid, the culture is grown (without adding additional agar or the agar mixture) in order to determine whether the sample includes the microorganism at issue (e.g., whether the sample includes Salmonella, such as a particular strain of Salmonella, or to identify Salmonella (or the particular strain of Salmonella) from other bacteria (such as E. coli)). Alternatively, after placing the bead-bound cell onto the surface of agar or an agar mixture, additional agar or agar mixture is added onto or on top of the bead-bound cell sitting on the surface of agar. In one or some embodiments, this additional agar or agar mixture may be at least partly fluid or at least partly liquid (e.g., the agar may be heated prior to being poured onto the bead-bound cell). In one or some embodiments, a fluid may comprise a liquid that continuously deforms under an applied shear stress or external force. As discussed in more detail below, because the additional agar or agar mixture is in liquid or fluid form and in order keep the bead-bound cell in a predetermined position within the second well, a magnetic field may be applied (e.g., the magnetic field may be applied so that the bead-bound cell is pulled downward toward a bottom of the second well). Because of the magnetic field, the bead-bound cell may be held on top of the sufficiently solid agar or agar mixture while the additional agar or agar mixture becomes more solid. In this way, the bead-bound cell, held or positioned in the predetermined part of the second well (e.g., on top of the sufficient solid agar or agar mixture), may be positioned in a predetermined focal plane (or predetermined section).

Alternatively, after performing the IMS in a first well, the bead-bound cell is not extracted from the first well. Instead, additional agar or agar mixture (e.g., that is at least partly fluid or at least partly liquid) is added onto or on top of the bead-bound cell still in the first well. Similar to the discussion above, because the additional agar or agar mixture is in liquid or fluid form and in order keep the bead-bound cell in a predetermined position within the first well, a magnetic field may be applied (e.g., the magnetic field may be applied so that the bead-bound cell is pulled downward toward a bottom of the first well). Because of the magnetic field, the bead-bound cell may be held at or near the bottom of the first well while the additional agar or agar mixture becomes more solid. In this way, the bead-bound cell, held or positioned in the predetermined part of the first well, may be positioned in the predetermined focal plane (or predetermined section).

Thus, the plating may result in any one of the following occurring: (i) agar (or an agar mixture or another type of immobilizing agent) is on top of the sample (which may include the bead-bound cell(s)) but not underneath the sample; (ii) agar (or an agar mixture or another type of immobilizing agent) is underneath sample (which may include the bead-bound cell(s)) but not on top of the sample; or (iii) agar (or an agar mixture or another type of immobilizing agent) is both on top and underneath the sample (which may contain the bead-bound cell(s)) (e.g., the sample is sandwiched between agar). After immobilizing the bead-bound cell(s) in the agar, the sample may be incubated. In this regard, the incubating of the sample may occur using a liquid and/or solid medium (e.g., agar). As discussed above, in one instance, the sample is at the bottom of the well so that growth of the sample may be outward and/or upward, but not downward. In another instance, the sample is placed on top of the bed of agar so that growth of the sample is outward and downward, but not upward. In yet another instance, the sample is sandwiched between agar, which may result in the growth of the sample being outward, upward, and downward, which may result in the greatest amount of growth in multiple directions (e.g., in a spherical volume). Further, in one or some embodiments, certain microorganisms may grow with or without oxygen. In particular, in one or some embodiments, those microorganisms that grow without oxygen may be more amenable for growth when sandwiched between agar.

As discussed above, after culturing the sample, various functions may be performed including any one, any combination, or all of: detecting whether one or more colonies are in a respective well; enumerating (e.g., counting and/or detecting for purposes of collecting) the one or more colonies in the respective well; or picking/collecting any of the one or more colonies in the respective well. Further, as discussed above, a magnetic field may be applied in order to position the bead-bound cells with respect to the immobilizing medium (e.g., the agar). By way of example, when pouring liquid agar onto the bead-bound cells (either on a bed of solid agar or not), a magnetic field may be applied in order to position the bead-bound cells in a predetermined or predefined plane (e.g., on the bottom of the well; on the top of the solid bed of agar; etc.). Separate from generally applying a magnetic field to the respective well, the system may automatically control the magnetic field so that the distribution of the magnetic fields applied across, along, or in the 2-D plane of the predefined plane may be predetermined. In the prior art, a Petri dish was used. The size of the Petri dish may be on the order of 10 cm in diameter. In contrast, the wells may be part of a microplate and may include at least ten, at least fifty, or at least 90 wells on the microplate. In this regard, the wells may be on the order of 6 mm in diameter, and may thus be at least a factor of 10 less in size (e.g., the wells are no more than 5 mm in diameter; no more than 6 mm in diameter; no more than 7 mm in diameter; no more than 8 mm in diameter; no more than 9 mm in diameter; no more than 10 mm in diameter). As such, there is much less space (both in the predetermined plane and in volume) in which to incubate the samples.

In one or some embodiments, the magnetic field distribution applied to the well may be automatically controlled. More specifically, the magnetic field distribution may be dependent on one or more factors. In one embodiment, the magnetic field distribution may be dependent on the type of analysis. By way of example, the magnetic field distribution applied is different when detecting one or more colonies in the respective well versus when enumerating the one or more colonies in the respective well and/or when collecting the one or more colonies from the respective well. In particular, the system (e.g., the magnetic module discussed below) may generate a magnetic field distribution that focuses the magnetic field in a certain part of the well (e.g., the center of the well) so that the bead-bound cells are attracted to the certain part of the well. In this way, the analysis of the imaging may detect whether the one or more colonies are present in the well since: (1) each of the bead-bound cells may be attracted to the particular area in the well (e.g., the center) so that the growth of the colonies may be localized in the particular area; and (2) imaging may be more accurate since the image analysis may focus on the particular area (e.g., the image analysis may focus on whether a colony is localized at the center of the well).

Alternatively, the system may generate magnetic field distribution that evenly distributes the magnetic field across an area of the predetermined plane. In one instance, the area comprises the entire area of the predetermined plane of the well. In another instance, the area comprises the area of the predetermined plane of the well except for around the perimeter wall (e.g., at least 0.2 mm from the wall along at least a part or along the entirety of the perimeter; at least 0.15 mm from the wall along at least a part or along the entirety of the perimeter; at least 0.2 mm from the wall along at least a part or along the entirety of the perimeter; at least 0.25 mm from the wall along at least a part or along the entirety of the perimeter; etc.). As discussed above, enumerating the one or more colonies may comprise counting the colonies in the well. As such, in order to effectively count the one or more colonies in the well, it is advisable to space the colonies in the well apart. In this regard, the even distribution of the flux may, in turn, distribute the bead-bound cells across the predetermined plane so that growth of multiple bead-bound cells, even in a well of 6 mm in diameter, may be distinct. For example, in an instance where three distinct bead-bound cells are within a single well, colonies for each of the first bead-bound cell, the second bead-bound cell, and the third bead-bound cell may be distinct from one another, thereby allowing for the image analysis, which may be configured to detect the distinct colonies within the well and then to tally the detected distinct colonies for purposes of enumeration. Similarly, picking the one or more colonies from the well may comprise using a pipette tip (or the like), which may magnetically and/or mechanically collect the detected colony. However, colonies close to the well wall may be more difficult to collect and extract from the well. As such, in one or some embodiments, the magnetic field generated may include an area around the perimeter (e.g., in a square cross-section of the well, the area around the perimeter may be defined by at least 0.1 mm from the wall, with the magnetic field being less (such as zero) than the magnetic field further away from 0.1 mm the wall; in a circular cross section, the area around the perimeter may be defined by at least 0.1 mm from the wall). Thus, the colonies, after incubation, may not be as close to the wall, thereby making extraction after incubation of the colonies easier. In this way, the magnetic field generated may comprise a flux density in the area that is uniform (or substantially uniform) so that the magnetic beads may be evenly distributed in the area, and the colonies grown within the well may be better isolated from one another.

An example of this is shown in the illustration 150 in FIG. 1C, in which a pre-enrichment step 110 is performed, and the disclosed automatic detection step 120. Any one, any combination, or all of the pre-enrichment step 110, the automatic detection step 120 or the MALDI-TOF identification 122 may be performed automatically. The pre-enrichment step 110 may include the immunomagnetic separation (IMS) step i). The disclosed automatic detection step 120 may include one or both of: plating (such as the different plating steps discussed above; see microplating step ii)); or imaging and incubation (see time-lapse imaging and incubation step iii)). Specifically, in one or some embodiments, a pre-enrichment step 110 may occur, which may comprise no more than: a 10-hour pre-enrichment step; an 11-hour pre-enrichment step; a 12-hour pre-enrichment step; a 13-hour pre-enrichment step; a 14-hour pre-enrichment step; a 15-hour pre-enrichment step; a 16-hour pre-enrichment step; a 17-hour pre-enrichment step; or an 18-hour pre-enrichment step.

Immunomagnetic separation (IMS) may efficiently isolate cells out of cultured cells and may be used as a method of quantifying the pathogenicity of a sample, such as of food. In one or some embodiments, a pathogen may be described in terms of its ability to perform any one, any combination, or all of: produce toxins; enter tissue; colonize; hijack nutrients; or immunosuppress the host. In one or some embodiments, immunomagnetic separation is directed to the isolation of specific matter (e.g., cells) through the specific capture of biomolecules through the attachment of small-magnetized particles, beads, containing antibodies and lectins. These beads may be coated to bind to targeted biomolecules, gently separated and goes through multiple cycles of washing to obtain targeted molecules bound to these super paramagnetic beads, which may differentiate based on strength of magnetic field and targeted molecules, are then may be eluted to collect supernatant and then may be able to determine the concentration of specifically targeted biomolecules. An example of using immunomagnetic separation is disclosed in U.S. Pat. No. 10,780,444, incorporated by reference herein in its entirety.

In the immunomagnetic separation (IMS) step, magnetic nanoparticles conjugated with anti-*Salmonella* antibodies may be added to sample wells, which may bind to *Salmonella*; a magnet array (e.g., a 96-magnet array, a 24-magnet array) may be used to isolate bead-bound *Salmonella* in each well where background microorganisms may be aspirated and discarded. Various uses of magnets are contemplated in the IMS step. In one embodiment, in which a plate may contain a plurality of wells (e.g., a 96 well plate), a single magnet may be assigned to each of the plurality of wells, with the magnet being movable (e.g., by a motor or the like) to be in a predetermined position relative to the well (e.g., closer to or further away from the well; and/or positioned at a predetermined side or bottom of the well). In this way, the magnet(s) may be moved relative to a respective well in order to generate a predetermined magnetic field as discussed herein. Alternatively, fewer than one magnet per well for the plurality of wells on the plate are provided. As one example, one respective magnet may be provided for each of 4 wells, with the placement of the respective magnet (e.g., using a motor for movement of the respective magnet) may determine whether there is a predetermined magnetic field in one or more of the 4 wells. In this regard, a respective well in the well plate may be placed (either by being moved to the magnet(s), the magnet(s) being moved to the plate, or both) proximate to one or more magnets (and in turn be exposed to one or more magnetic fields. In practice, the well may be conical in shape, with either a flat or a V-shaped bottom. The magnet(s) may be positioned relative to the respective well to be proximate to one or both of a side of the well (e.g., a left side of the well, a right side of the well) and/or a bottom of the well. Still alternatively, the magnet may comprise a ring magnet that may be positioned on slipped onto the respective well to thereby encircle the conically-shaped well.

Regardless, the system, under control of a software program, may generate the predetermined magnetic fields within the respective well discussed herein based on control of the magnets (e.g., movement of the magnets relative to the wells). Yet alternatively, instead of the magnets moving to the wells to generate the predetermined magnetic field. The wells may move (e.g., via a motor moving the wells) relative to the magnets (with the magnets being stationary) so that the result of the predetermined magnetic field being generated within the wells may still be achieved. In this regard, various ways in which the magnetic fields may be generated including: (1) moving the magnets relative to the wells to generate the predetermined magnetic field; (2) moving the wells relative to the magnets to generate the predetermined magnetic field; or (3) moving both the magnets and the wells relative to one another to generate the predetermined magnetic field. In this way, one or both of the magnets or the wells may be moved to generate the predetermined magnetic field.

Thus, as shown in FIG. 1C, samples may be inserted into wells of microplate 170. The wells in microplate 170 may be preloaded with reagents, with the samples added to the wells resulting in binding occurring. For example, the antibody (or antibody cocktail) may include antibody complexes that bind to targeted surface antigens on the desired or undesired cells (e.g., depending on whether performing a positive or negative selection). The magnetic particles may thereafter be added to the labelled samples, and may then attach to the free end of the antibody complexes. The process of binding the antibody to the target cells may take 15-30 minutes. In one embodiment, the antibodies bind to the cells of interest (e.g., for positive selection). Alternatively, the antibodies bind to cells that are not of interest (e.g., for negative selection). After which, separation may occur. As one example, for beads bound (via the antibody) to the target cells of interest, a magnet may be used to move the beads-bound cells to a predetermined part of the well; after which, supernatant may be removed and discarded (e.g., unlabeled cells may be removed). As another example, for beads bound to the cells not of interest, a magnet may be used to move the beads-bound cells to a predetermined part of the well; after which, the liquid (which may include the cells of interest) may be removed and analyzed in a different well. In this regard, bead-bound *Salmonella* (an example of the magnetic bead-bound microorganisms) may be held by magnets at a predetermined section of the well (e.g., on the bottom of each well).

After which, in ii) microplating, a liquid medium, such as a liquid medium that solidifies and immobilizes, may be added (either to the microplate 170 used in i) IMS or in a different microplate 172). For example, a substance may be added for incubation, such as a low-melting-point selective agarose medium may be added into the wells for incubation. As such, FIG. 1C illustrates the embodiment in which liquid agar (or other type of immobilizing medium) is added to the well, with the magnetic bead-bound microorganisms being held by a magnetic field at the bottom of the well until the agar (or other type of immobilizing medium) has sufficiently solidified (e.g., entirely solidified) in order for the magnetic bead-bound microorganisms to be held at the bottom of the well after removal of the applied magnetic field. After which, the sample may be incubated to determine whether growth in the sample indicates *Salmonella* (or other type of microorganism). Alternatively, the magnetic field may continue to be applied at least partly during growth of the microorganisms in the sample.

Thus, after the pre-enrichment step 110, aliquots of the samples may be added into a plate, such as a microplate, on a platform (disclosed further below) for pathogen detection, such as *Salmonella* detection. In one or some embodiments, the step of adding the samples into the plate may take on the order of minutes (e.g., less than 5 minutes; less than 10 minutes; or less than 15 minutes). After which, incubation may occur. For example, at intervals, such as at predetermined intervals (e.g., every hour), an image may be obtained on one, some, or each well of the microplate during incubation. Similarly, obtaining the images from each well of the microplate may take on the order of minutes (e.g., less than 5 minutes; less than 10 minutes; or less than 15 minutes). Using image analysis (discussed further below), microcolonies may be detected (e.g., by their size and/or color change). This is illustrated in FIG. 1C, in which the time-lapse imaging and incubation is shown at 4 hours, 5 hours, and 6 hours. These are merely for illustration purposes. Other numbers of images, and time at which the images are taken, are contemplated.

Any one, any combination, or all of IMS, microplating, incubation, imaging, and detection may be automated and may take a total of 6-12 hours (e.g., no more than: 6 hours; 7 hours; 8 hours; 9 hours; 10 hours; 11 hours; or 12 hours). Further, in one or some embodiments, the IMS, microplating and imaging of the well plate (e.g., the 96-well plate) may only take minutes; thus, the detection may be completed in the same day or next day (e.g., the detection may be completed in less than: 24 hours; 25 hours; 26 hours; 27 hours; 28 hours; 29 hours; 30 hours; 31 hours; 32 hours; 33 hours; 34 hours; 25 hours; or 36 hours).

Figure 6A:
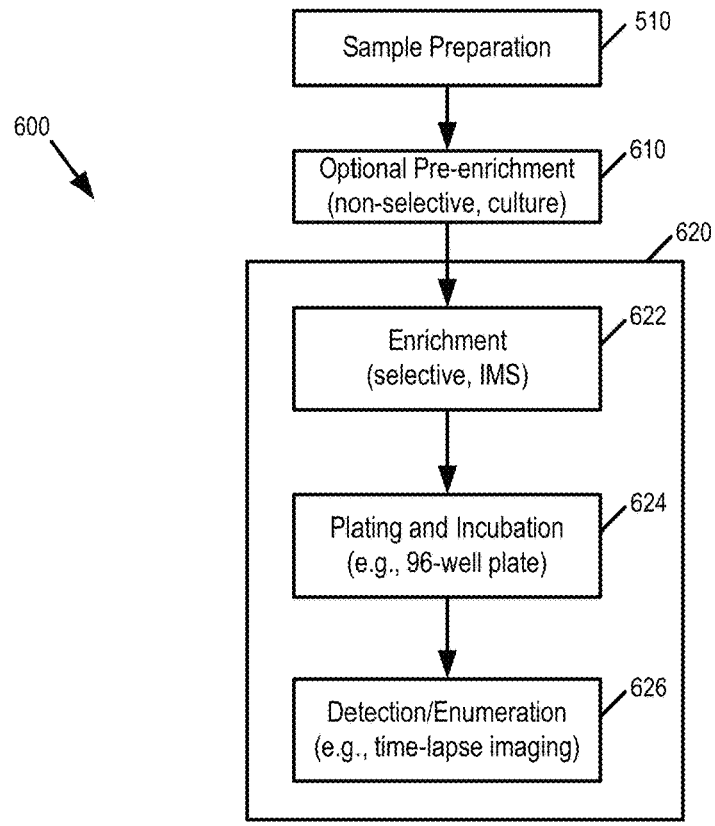
FIG. 6A is a first example flow diagram of the disclosed methodology.
Figure 6B:
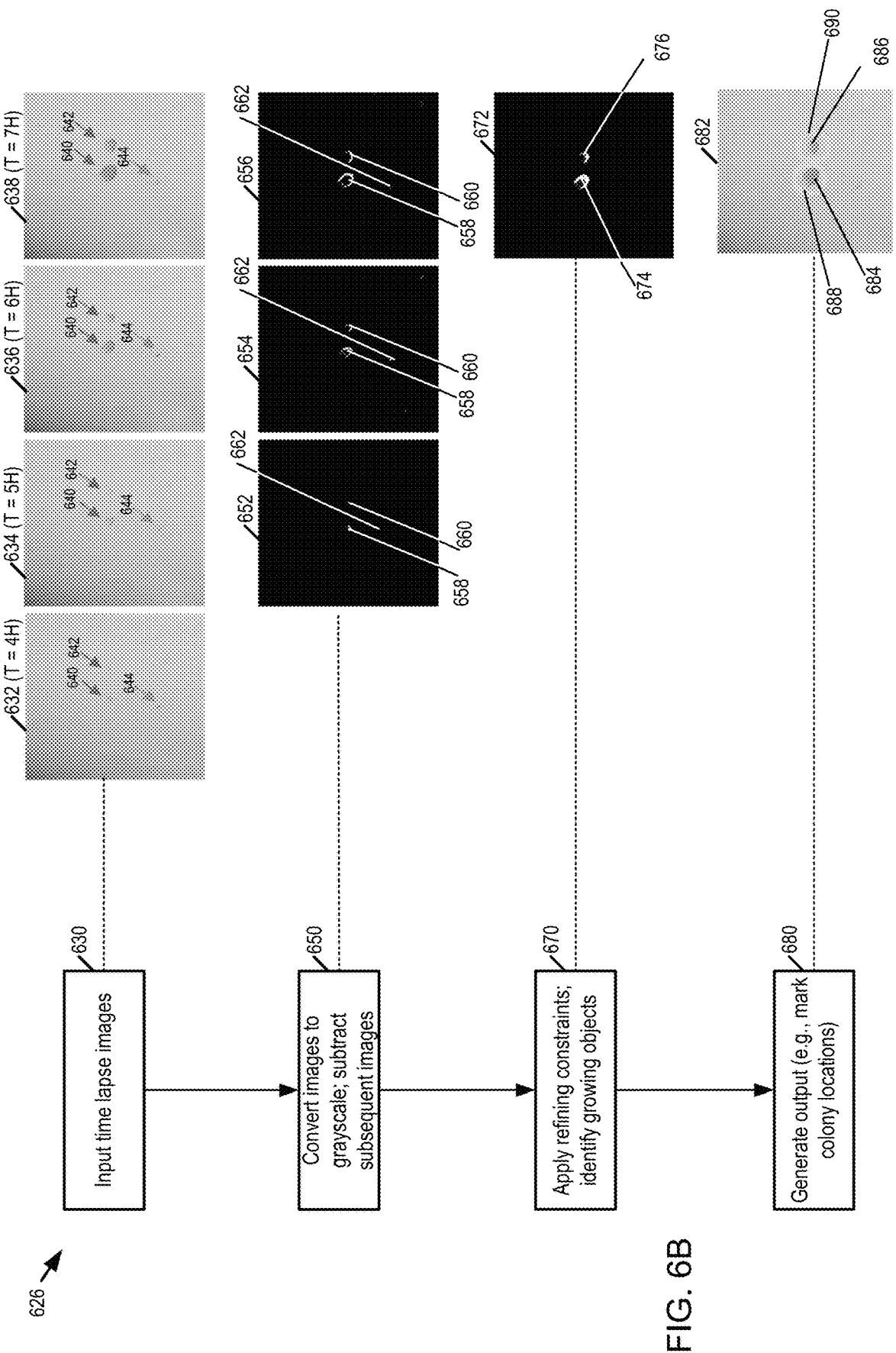
FIG. 6B is an example flow diagram of detection/enumeration as illustrated in FIG. 6A.

Thus, in one or some embodiments, the time-lapse imaging and incubation may be used in order to perform one or both of: (A) detecting colonies; or (B) detecting colonies that are indicative of being the microorganism of interest. As one example, the time-lapse imaging may be analyzed in order to detect colonies (e.g., *Salmonella* colonies, non-*Salmonella* colonies, etc.) based on the any one, any combination, or all of: size; growth rate; color; morphology; etc. In one or some embodiments, the detection may comprise a presumptive positive identification of the specific pathogen. After which, identification may be performed in subsequent processing, such as using MALDI-TOF. An example of this is illustrated in FIG. 6B. After detecting the colony/colonies in a respective well, the colony/colonies may be extracted for further analysis (e.g., using genome sequencing or MALDI-TOF discussed further below). As another example, the time-lapse imaging may be analyzed in order to detect colonies of interest (e.g., *Salmonella* colonies). In particular, *Salmonella*, such as a *Salmonella* typical colony or a *Salmonella* atypical colony, may have certain image-identifiable characteristics, such as any one, any combination, or all of: an identifiable morphology; an identifiable color; an identifiable growth rate; etc. In this regard, the image analysis of the time-lapse images may detect the colonies and further detect, from the detected colonies, which exhibit the characteristics (e.g., the morphology indicative of a *Salmonella* colony, the color indicative of a *Salmonella* colony, or the growth rate of indicative of a *Salmonella* colony) of a *Salmonella* colony. After which, for those colonies identified (such as preliminarily identified) as a *Salmonella* colony may be removed from the well (see 160) and placed into well plate 162 for further analysis (e.g., after a presumptive positive determination, the detected colony may be subject to further analysis, such as MALDI-TOF, in order to confirm the presumptive positive determination was correct).

As merely one example, different microorganisms may exhibit different growth rates, such as *listeria* doubling in size every 60 minutes, *E-coli* doubling in size every 10 minutes (or less), and *Salmonella* doubling in size every 20-30 minutes. When detecting *Salmonella* colonies, this measure of growth rate may be used to remove colonies with different growth rates. Further, using growth rate as an indicator may enable quicker detection of colonies, including colonies of microorganisms of interest. Typically, the colonies may be grown for 24 hours; after which, an image may be taken to determine the size of the colonies. In such a methodology, waiting such a long time to analyze the image results in any of the colonies growing to a large size, so that the growth rate cannot, from a practical standpoint, be used as to identify of the type of colony. Instead, the analysis of the time-lapse images results in quicker analysis and potentially better identification of the colonies of interest, such as by analyzing growth rate, as discussed above. In this regard, presumptive colonies (whether the analysis indicates as a presumptive colony or indicates as a presumptive *Salmonella* colony) may be picked out or selected for further analysis by MALDI-TOF, the result of which is illustrated by graph 230, which illustrates mass (M) versus z (charge number of ions), which is indicative of mass-to-charge ratio. m/z comprises a physical quantity relating the mass and the electric charge of a given particle, and may be plotted as a mass spectrum histogram plot of intensity vs. m/z in a chemical sample, such as in graph 230. Instruments other than a mass spectrometer may be used to characterize the sample.

As such, the disclosed method and system may be used in food safety, which is considered an extremely price-sensitive business sector. For example, it may cost a food contract lab about $10-15 (including lab supplies and reagent, labor, facilities, equipment etc.) to perform a PCR test for *Salmonella* detection. In contrast, the disclosed method and system (because of the reduction of hands-on time and assay miniaturization) may save nearly 30% on a *Salmonella* detection test (see Table 1). For a presumptive *Salmonella* positive sample where a comprehensive test is needed for detection, identification and subtyping, the disclosed method and system may save nearly 50% in cost and 75% on time-to-result over PCR-based methods. Combined with lower instrument costs, the disclosed method and system may be a more affordable solution for small food pathogen testing labs such as food plant labs and corporate labs. In this regard, the disclosed system and method offer a more rapid, a reliable and a more cost-effective solution for pathogen testing, such as *Salmonella* testing, that may be essential to effectively safeguard the food supply and subsequently reduce infectious outbreaks.

As a platform technology, the disclosed technology may benefit microbiology laboratories in a variety of fields, including, for example, clinical diagnostics, pharmaceutical quality control and food safety testing. More specifically, the disclosed technology may advance food pathogen screening, infection disease diagnostics, and drug development by detecting bacterial colonies quickly and cost effectively.

Figure 1D:
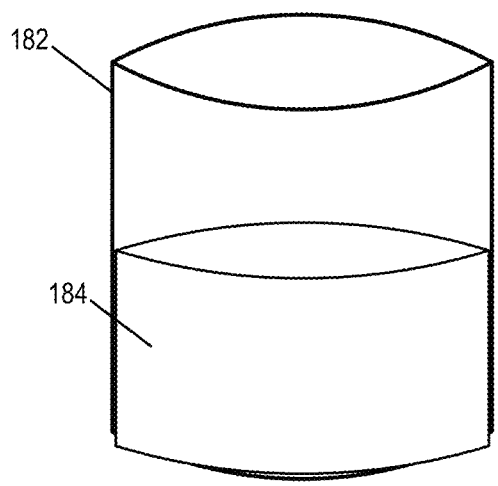
FIG. 1D is an illustration of a well with a system to apply a predetermined magnetic field thereto.
Figure 1D:
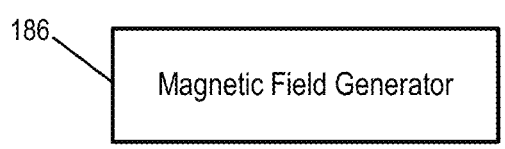

FIG. 1D is an illustration 180 of a well 182 with a system, such as a magnetic field generator 186, configured to automatically apply a predetermined magnetic field thereto. As discussed above, a predetermined magnetic field may be automatically generated by the magnetic field generator 186, such as any one, any combination, or all of: evenly distributed along a predetermined plane (e.g., in order to more evenly distribute multiple bead-bound cells present in the sample 184); more power magnetic field at a predetermined part of the well 182 (e.g., in order to generate a higher magnetic field in the center of the well 182 so that the bead-bound cells present in the sample 184 are attracted to the center); or evenly distributed in part of the predetermined plane but not in the other part of the predetermined plane (e.g., apply an evenly distributed magnetic field except close to the wall of the well, such as except at least 0.2 mm from the wall of the well).

Figure 2A:
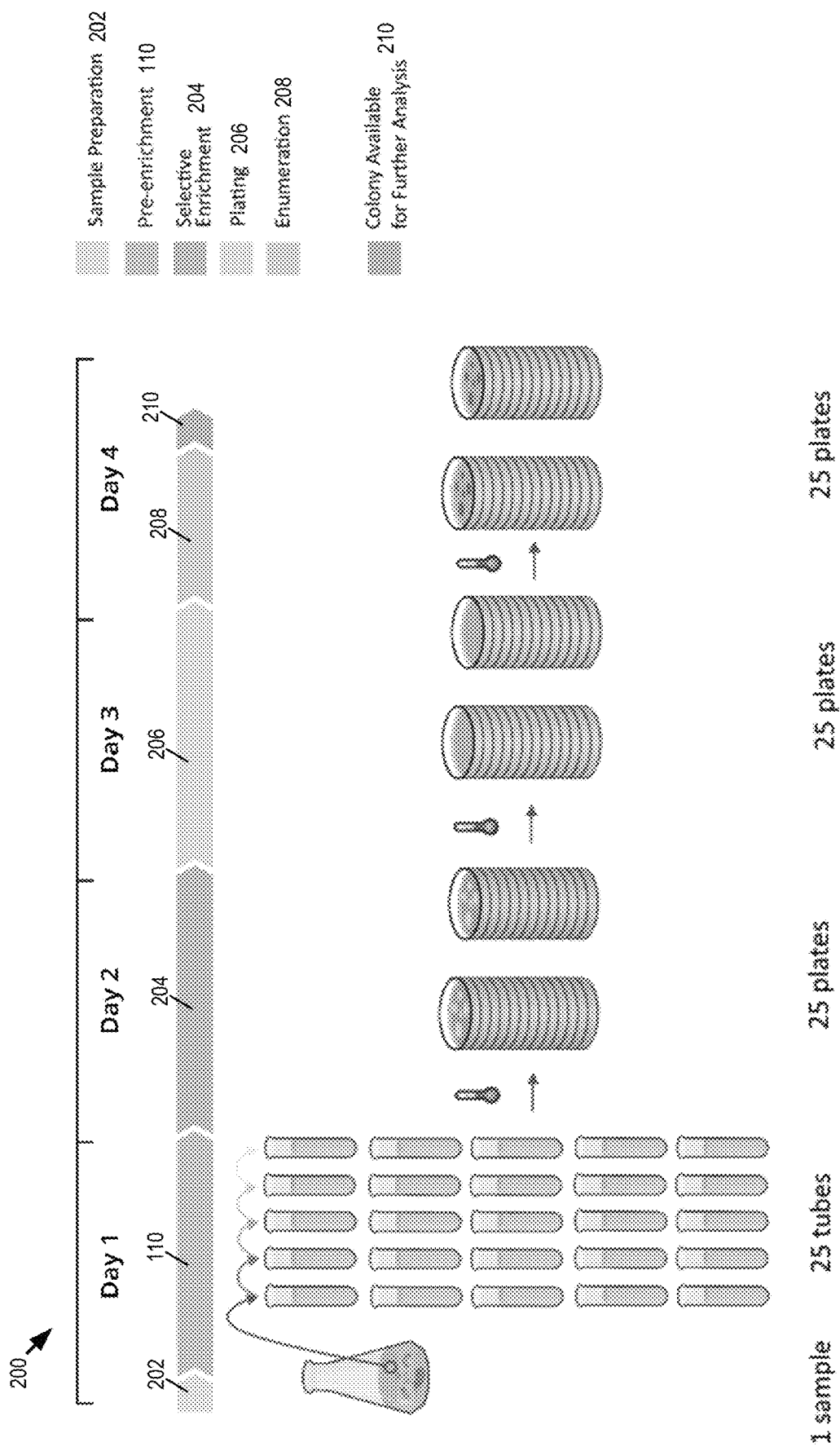
FIG. 2A is an illustration of an EPA 1682 for analysis of *Salmonella* from a sample (e.g., sewage sludge).

FIG. 2A is an illustration 200 of an EPA 1682 for analysis of *Salmonella* from a sample (e.g., sewage sludge). As shown, different stages are illustrated including: sample preparation 202; pre-enrichment step 110; selective enrichment 204; plating 206; enumeration 208; and colony available for further analysis 210. In the illustration 200 in FIG. 2A, samples are first homogenized and mixed with sterile buffered dilution water. In EPA 1682, 20 mL of homogenized samples are inoculated into TSB tubes and incubated for 24 hours at 36° C. Then six discrete, 30-µL drops from each TSB tube are applied onto a corresponding Modified Semisolid Rappaport-Vassiliadis (MSRV) plate and incubated at 42° C. for 16 to 18 hours. On day 3, a streak a target colony from each MSRV plate onto an XLD plate, which is then incubated for 18 to 24 hours at 36° C. On day 4, each XLD plate is checked: pink to red colonies with black centers are considered *Salmonella*. Thus, as shown, a 5-tube 5-dilution MPN method based on EPA 1682 requires at least 25 tubes, 50 Petri dishes and 4 days to test one sample.

Figure 2B:
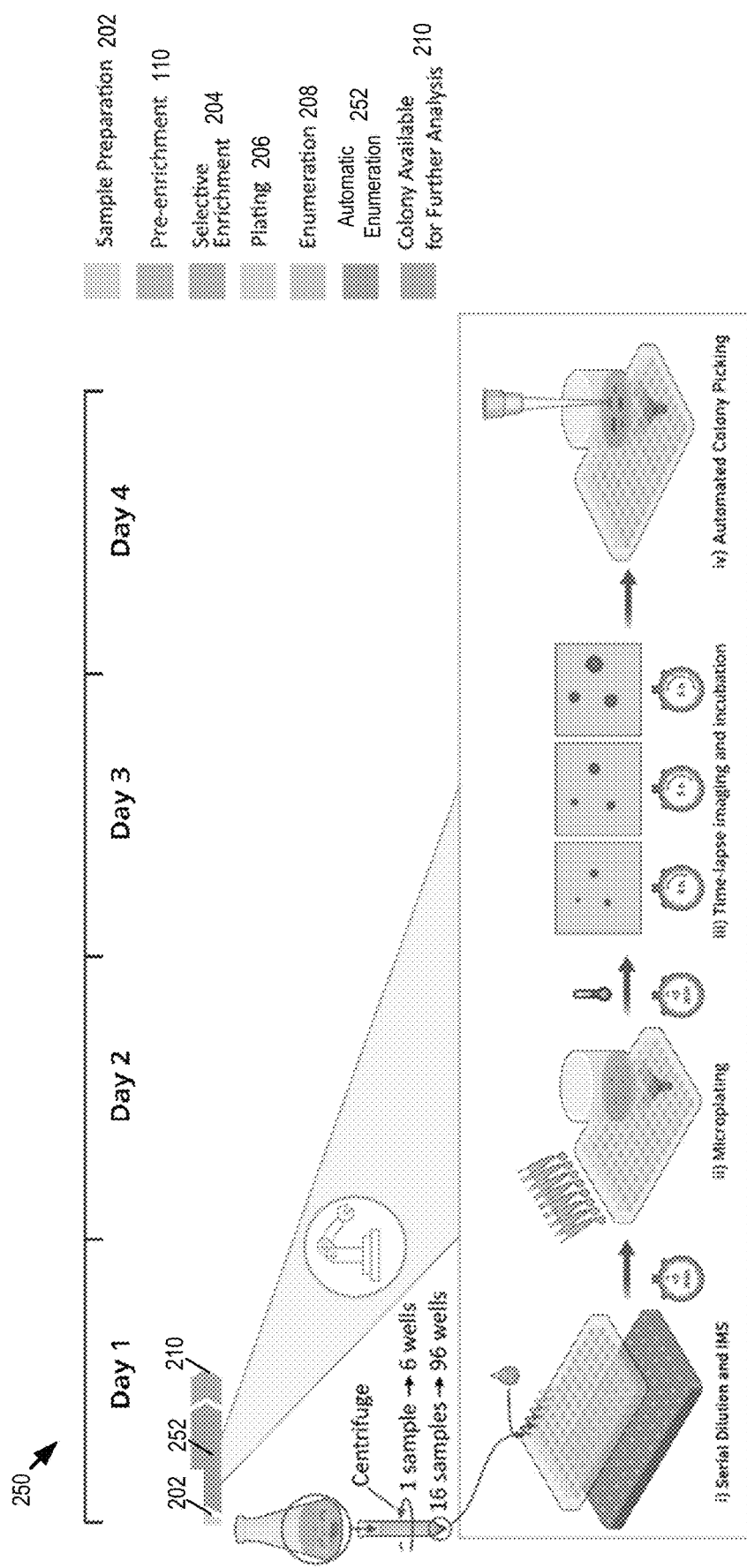
FIG. 2B is an illustration of an automated isolation and/or enumeration from a sample (e.g., sewage sludge).

FIG. 2B is an illustration 250 of an automated isolation and/or enumeration 252 from a sample (e.g., sewage sludge). In one embodiment of the automated system and method, homogenized samples may first be centrifuged. The pallet may then be mixed with antibody-conjugated magnetic beads in a well plate, such as a 96-well "sample" plate, and loaded into an apparatus (such as disclosed in FIG. 4B), where each sample may be serially diluted (e.g., into 6 wells). Then, bead-bound *Salmonella* may be separated from the samples by a magnet array and plated into a separate well plate, such as a 96-well "culture" plate with a selective growth medium (e.g., selective Xylose Lysine Deoxycholate (XLD) agar and incubated at 37° C. for 12 hours Images of each well may be taken periodically, such as every hour, and analyzed for colony count (e.g., see FIGS. 10D-F). Up to a predetermined number of colonies (e.g., 6 colonies) from each sample may be automatically picked and transferred into yet another well plate, such as a 96-well "output" plate for further analysis. In this regard, the disclosed system and method may achieve any one, any combination, or all of: the ability to enumerate bacteria and to obtain microbial colonies rapidly from heterogeneous samples, with enumeration results and colonies to be available 2-3 times earlier than current reference methods; culture microorganisms in a single microwell of a well plate (instead of an agar Petri dish), which reduces media usage and biowaste by over a factor of 600 compared to EPA 1682; leverages robotics, sensing technologies and imaging processing algorithms for a fully automated solution; or monitor colony growth with time-lapse images to ensure accurate colony count and that a "discrete" colony used for downstream analysis originates from a single microcolony, not a merged colony originating from two or more microcolonies (as discussed further below).

Figure 3A:
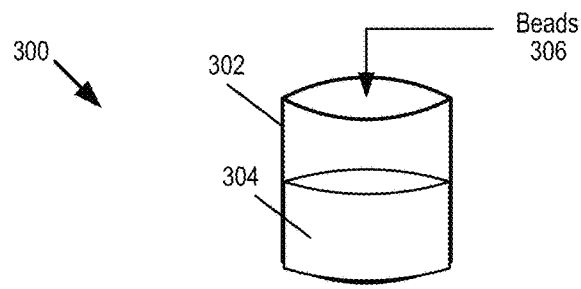
FIG. 3A is an illustration of beads being introduced into a well for binding with a solution or a sample.

As discussed above, various methods of plating are contemplated. FIGS. 3A-L illustrates examples methods of plating, with any one, any combination, or all of the steps illustrates in FIGS. 3A-L being performed automatically. Other methods of plating are contemplated. FIG. 3A is an illustration 300 of beads 306 being introduced into a well 302 that contains a solution or a sample 304 so that the beads 306 may bind to the microorganisms at issue, thereby resulting in bead-bound cell(s).

Figure 3B:
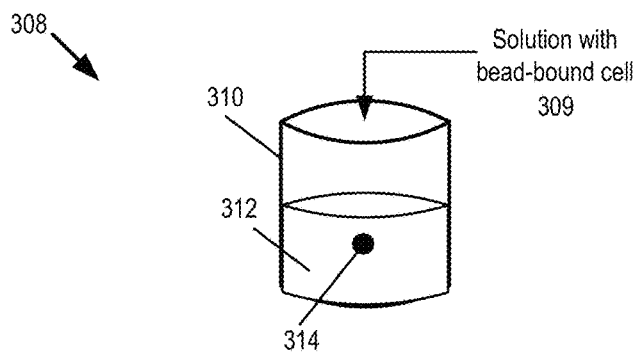
FIG. 3B is an illustration of the bead-bound cell(s) in the solution being introduced into a well.

FIG. 3B is an illustration 308 of the bead-bound cell(s) 314 in the solution 309 being introduced into a well 310 (which may be different from the well 302 where binding occurred in FIG. 3A), resulting in solution 312 being in well 310.

Figure 3C:
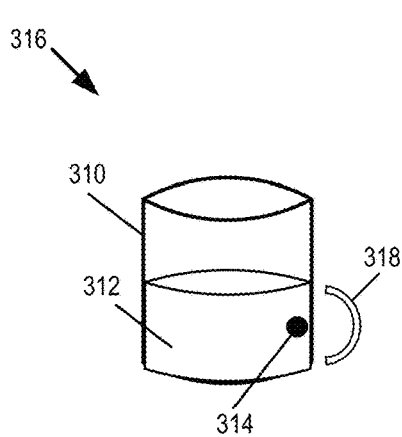
FIG. 3C is an illustration of the bead-bound cell(s) being moved to a side of the well using a magnetic field.

FIG. 3C is an illustration 316 of the bead-bound cell(s) 314 being moved to a side of the well 310 using a magnetic field. Various types of magnetic fields and various ways to generate the magnetic fields are contemplated. As one example, magnet(s), such as illustrated by magnet 318, may be used to generate a magnetic field. In one embodiment, the magnetic field generated may be used to attract the bead-bound cell(s) 314. As one example, the bead-bound cell(s) may have one pole and the magnetic field generated may have an opposite pole, so that the bead-bound cell(s) are attracted to the predetermined portion of the well, such as the side of the well illustrated in FIG. 3C. As another example, the bead-bound cell(s) 314 may have one pole and the magnetic field generated may have the same pole, so that the bead-bound cell(s) 314 are repelled by the magnetic field, thereby pushing the bead-bound cell(s) 314 away to the predetermined portion of the well. In either instance, the bead-bound cell(s) 314 are positioned in the predetermined portion of the well.

Figure 3D:
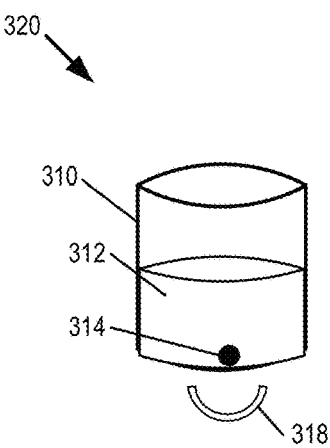
FIG. 3D is an illustration of the bead-bound cell(s) being moved to the bottom of the well using a magnetic field.

FIG. 3D is an illustration 320 of the bead-bound cell(s) 314 being moved to the bottom of the well using a magnetic field, such as by using magnet 318. FIGS. 3C and 3D are merely examples of predetermined portions of the well. Other portions or parts of the well in which to position the bead-bound cell(s) 314 are contemplated.

Figure 3E:
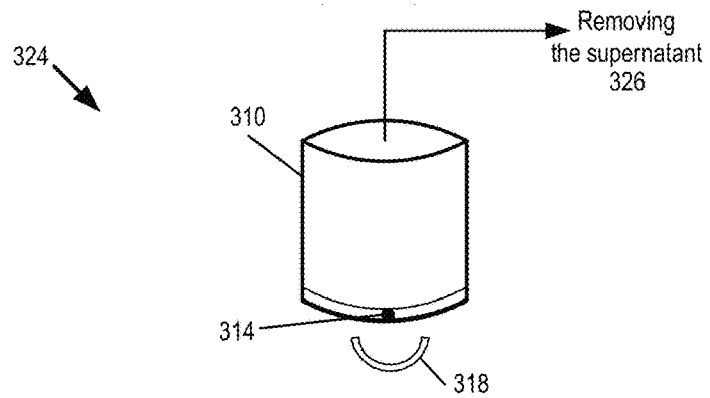
FIG. 3E is an illustration of the well after the supernatant is removed while the magnetic field is applied so that the bead-bound cell(s) remain at the bottom of the well.

FIG. 3E is an illustration 324 of the well 310 after the supernatant 326 is removed while the magnetic field is applied so that the bead-bound cell(s) 314 remain at the bottom of the well 310.

Figure 3F:
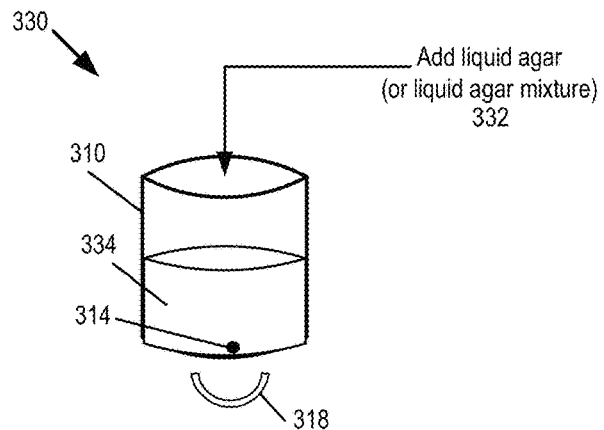
FIG. 3F is an illustration of liquid agar or an agar mixture being added to the well while the magnetic field is applied so that the bead-bound cell(s) remain at the bottom of the well.

FIG. 3F is an illustration 330 of liquid agar or an agar mixture being added 332 to the well while the magnetic field is applied so that the bead-bound cell(s) 314 remain at the bottom of the well while the liquid agar or agar mixture 334 is on top of the bead-bound cell(s) 314.

Figure 3G:
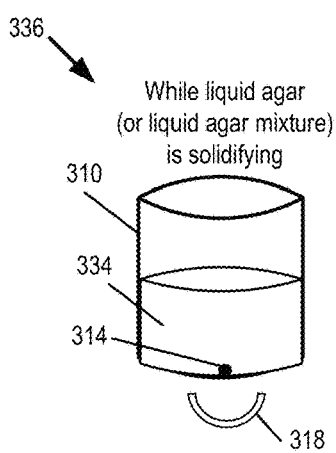
FIG. 3G is an illustration of the liquid agar or an agar mixture solidifying while the magnetic field is applied so that the bead-bound cell(s) remain at the bottom of the well as the liquid agar or an agar mixture solidifies.

FIG. 3G is an illustration 336 of the liquid agar or an agar mixture 334 solidifying while the magnetic field (via magnet 318) is applied so that the bead-bound cell(s) 314 remain at the bottom of the well as the liquid agar or an agar mixture 334 solidifies.

Figure 3H:
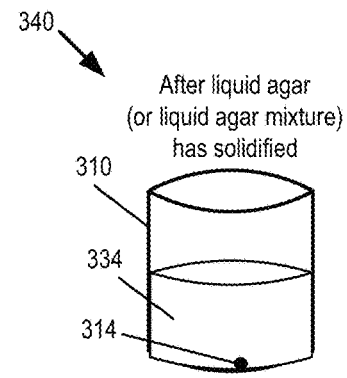
FIG. 3H is an illustration of the magnetic field being removed after the liquid agar or an agar mixture has solidified, thereby keeping the bead-bound cell(s) at the bottom of the well and at a predetermined focal plane for imaging.

FIG. 3H is an illustration 340 of the magnetic field being removed after the liquid agar or an agar mixture 334 has solidified, thereby keeping the bead-bound cell(s) 314 at the bottom of the well and at a predetermined focal plane for imaging.

Figure 3I:
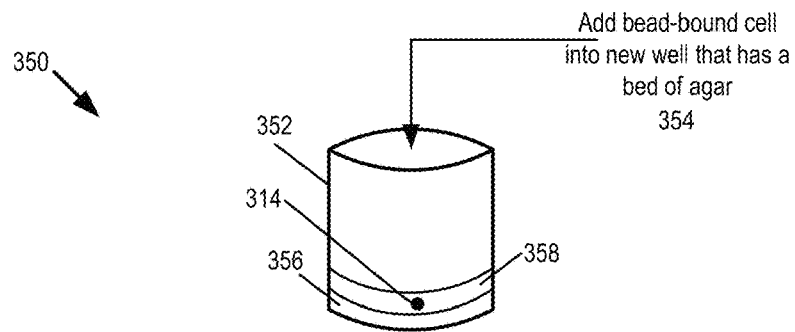
FIG. 3I is an illustration of the bead-bound cell(s) being added to a new well after IMS on the surface of a bed of solid agar or agar mixture.

FIG. 3I is an illustration 350 of the bead-bound cell(s) 314 being added 354 to a new well 352 (after IMS), with the bead-bound cell(s) 314 (within solution 358) placed on the surface of a bed 356 of solid agar or agar mixture. As discussed above, various plating is contemplated. In one instance, the sample may be placed on a bed of solid immobilizing agent, such as illustrated in FIG. 3I. After which, in one or some embodiments, the sample is incubated without depositing an immobilizing agent on top of the sample. In such an instance, the colony may grow along the surface (such as isotropically or substantially evenly along the surface).

Figure 3J:
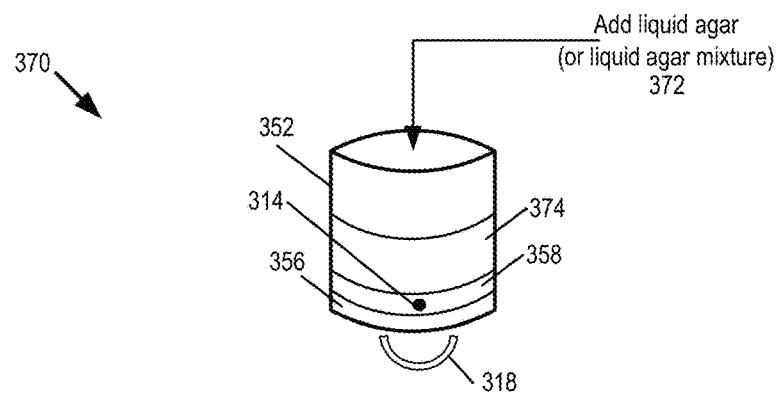
FIG. 3J is an illustration of liquid agar or an agar mixture being added to the new well while the magnetic field is applied so that the bead-bound cell(s) remain on the surface of the bed of solid agar or agar mixture in the new well.
Figure 3K:
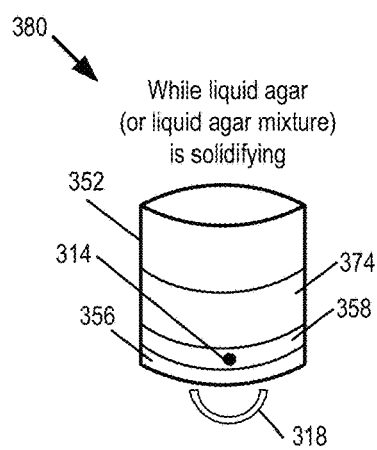
FIG. 3K is an illustration of the liquid agar or an agar mixture solidifying while the magnetic field is applied so that the bead-bound cell(s) remain on the surface of the bed of solid agar or agar mixture in the new well as the liquid agar or an agar mixture solidifies.
Figure 3L:
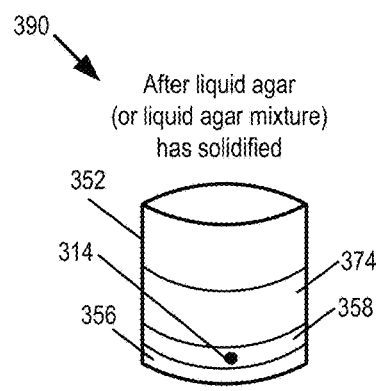
FIG. 3L is an illustration of the magnetic field being removed after the liquid agar or an agar mixture has solidified, thereby keeping the bead-bound cell(s) on the surface of the bed of solid agar or agar mixture in the new well and at a predetermined focal plane for imaging.

Alternatively, the plating may comprise sandwiching the sample between immobilizing agent (such as the same immobilizing agent or different immobilizing agents). This is illustrated in FIGS. 3J-L. Specifically, FIG. 3J is an illustration 370 of liquid agar or an agar mixture being added 372 to the new well 352 while the magnetic field (e.g., generated by magnet 318) is applied so that the bead-bound cell(s) 314 remain on the surface of the bed 356 of solid agar or agar mixture in the new well 352, with the liquid agar or agar mixture 374 on top of the bead-bound cell(s) 314.

FIG. 3K is an illustration 380 of the liquid agar or an agar mixture 374 solidifying while the magnetic field is applied so that the bead-bound cell(s) 314 remain on the surface of the bed 356 of solid agar or agar mixture in the new well 352 as the liquid agar or an agar mixture 374 solidifies.

FIG. 3L is an illustration 390 of the magnetic field being removed after the liquid agar or an agar mixture 374 has solidified, thereby keeping the bead-bound cell(s) 314 on the surface of the bed 356 of solid agar or agar mixture in the new well 352 and at a predetermined focal plane (e.g., predetermined section) for imaging. Thus, FIGS. 3J-L are similar to FIGS. 3F-H, except the sample is on a bed 356 of solid agar or agar mixture and except the process is performed in a different well.

As shown in FIG. 3L the bead-bound cell(s) 314 are sandwiched between the bed 356 of solid agar or agar mixture and the liquid agar or an agar mixture 374 has solidified. Thus, in growing the sample, the bead-bound cell(s) 314 may grow in one or more directions, such as any one, any combination, or all of: outward (e.g., in a same plane as the bead-bound cell(s) 314); downward (e.g., in a plane below where the bead-bound cell(s) 314 is shown); or upward (e.g., in a plane above where the bead-bound cell(s) 314 is shown). This may enable quicker or more easily identifiable growth in order to better detect the microorganisms. For example, the imaging system, which may include a microscope that is focused on the same plane as the bead bound cell(s), my more easily detect the growth. This is in contrast to isotropic growth along a surface of agar, such as discussed above. Specifically, surface growth may: (i) result in different colonies merging together (which may be more difficult for enumeration and colony picking); and (ii) make detecting the colonies via imaging more difficult (e.g., 2D growth along the surface of agar may be more difficult to detect than 3D grown when the sample is sandwiched in agar).

Figure 4A:
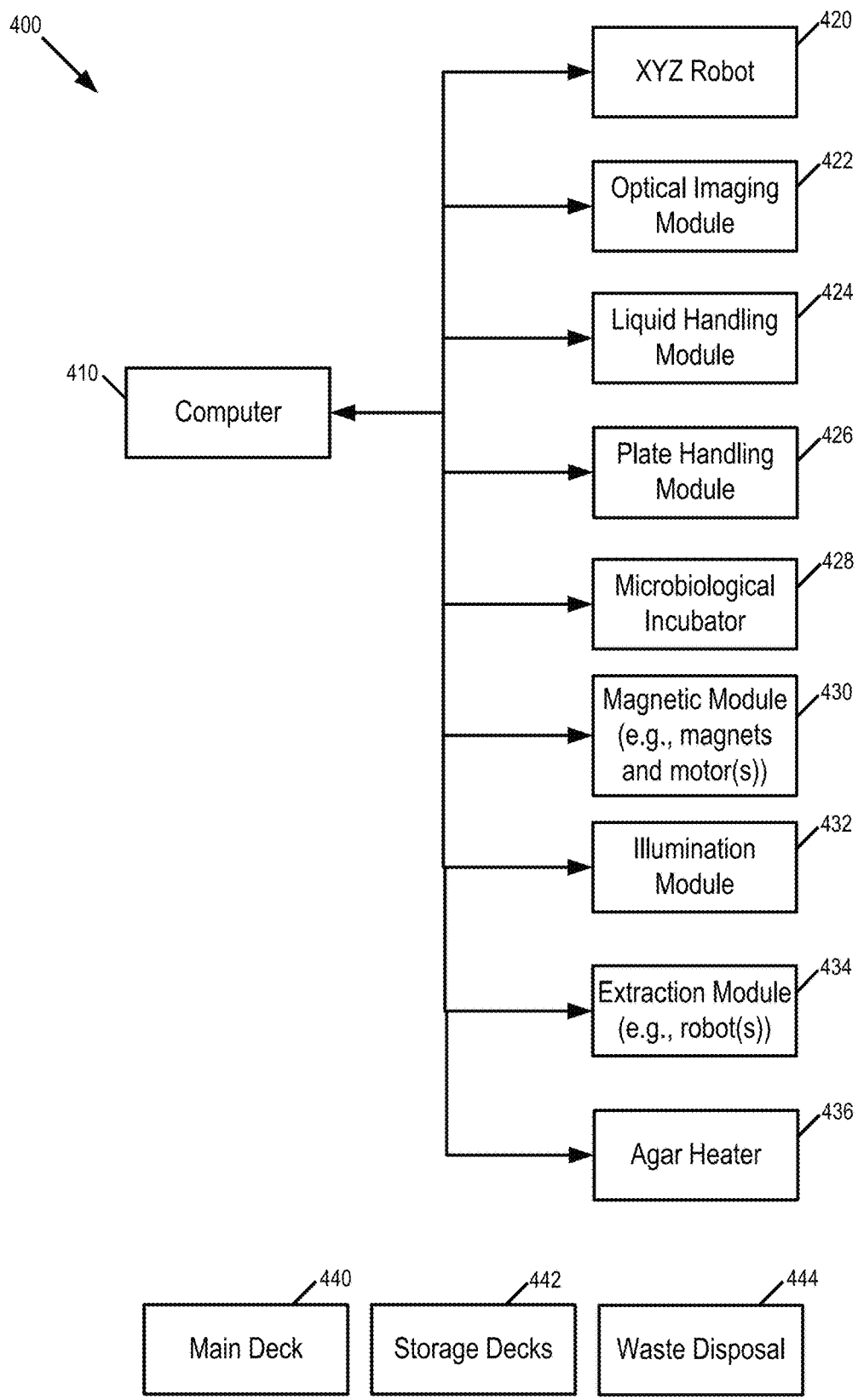
FIG. 4A is a functional block diagram of one example of the disclosed system.

FIG. 4A is a functional block diagram 400 of one example of the disclosed system. In one or some embodiments, the system (alternatively termed an instrument) comprises multiple computer-controlled modules (such as using computer 410), including any one, any combination, or all of: an optical imaging module 422 (e.g., which may include an objective lens (such as an 5× objective lens), an LED (such as a white LED), and an imaging device or imaging sensor (such as a digital camera)); a liquid handling module 424 (which may include a multiple-channel, such as an 8-channel, pipette head); a plate handling module 426 (such as a 2-finger adaptative gripper) mounted to a XYZ robot 420 (e.g., XYZ Gantry robot); a microbiological incubator 428 (such as a single-microplate incubator module that comprises a heater or the like); a magnetic module 430 (magnets (such as a 12×8 magnet array, an example of which is illustrated in FIG. 1D) and/or one or more motors in order to move the magnets in the magnet array); an illumination module 432 (such as one or more LED lights); an extraction module 434 (alternatively termed an extraction device) (e.g., a robot mechanism or the like that includes a pipette tip (or the like) in which to magnetically and/or mechanically collect the desired colony (or colonies)); and an agar heater 436. In one or some embodiments, the computer 410 may be configured to automatically control the magnetic module 430 in order to generate a predetermined magnetic field, such as one or both of an evenly distributed flux across a predetermined plane or section (such as a focal plane for purposes of imaging) and/or focused on a predetermined part (which may be a section) of the well (e.g., the center). In one or some embodiments, the computer is configured to receive input as to the type of analysis, such as at least one of detection of colonies (e.g., detection of a specific type (or specific types) of colony), enumeration of colonies (e.g., enumeration of colonies of the specific type (or specific types)), or picking/removal of colonies from the well (e.g., extraction of one or more colonies of the specific type (or specific types)). Responsive to the input, the system is configured to automatically control the magnetic module 430 in order to generate the predetermined magnetic field. As one example, responsive to receiving an input indicating detection of colonies (e.g., detection of a specific type of colony), the computer 410 is configured to automatically control the magnetic module 430 in order for the magnetic module 430 to generate a focused magnetic field in the predetermined section of the well. As another example, responsive to receiving an input indicating enumeration of colonies (e.g., enumeration of a specific type of colony) and/or picking of colonies (e.g., extraction of a specific type of colony), the computer 410 is configured to automatically control the magnetic module 430 in order for the magnetic module 430 to generate an evenly distributed flux across a predetermined plane. In this way, the type of analysis may determine the type of magnetic field generated in the respective well. Further, in terms of extraction, the computer 410 may be configured to automatically control extraction module 434, which may comprise a robot, in order to extract a colony (or colonies) selected for extraction. In one or some embodiments, the computer 410, automatically performing image analysis, may indicate a position of a colony (or respective positions of colonies) within a respective well. In turn, the computer 410 may automatically control the robot of extraction module 434 in order to extract the colony at the indicated position within the respective well (or extract the colonies at the respective positions within the respective well).

In one or some embodiments, multiple robots may be used to perform various functions, such as for plate handling, extraction, or the like. Alternatively, a single robot may be used to perform multiple functions, such as plate handline, extraction, or the like (e.g., extraction device may comprise a robot which is configured to perform plate handling as well). Thus, in one or some embodiments, XYZ robot 420 may be configured to perform any one, any combination, or all of: moving the microplate (e.g., into/out of the heater; onto a platform for the optical imaging module 422 to take an image of the wells therein; etc.); adding agar (or other immobilizing agent) into a respective well; etc.

Figure 13:
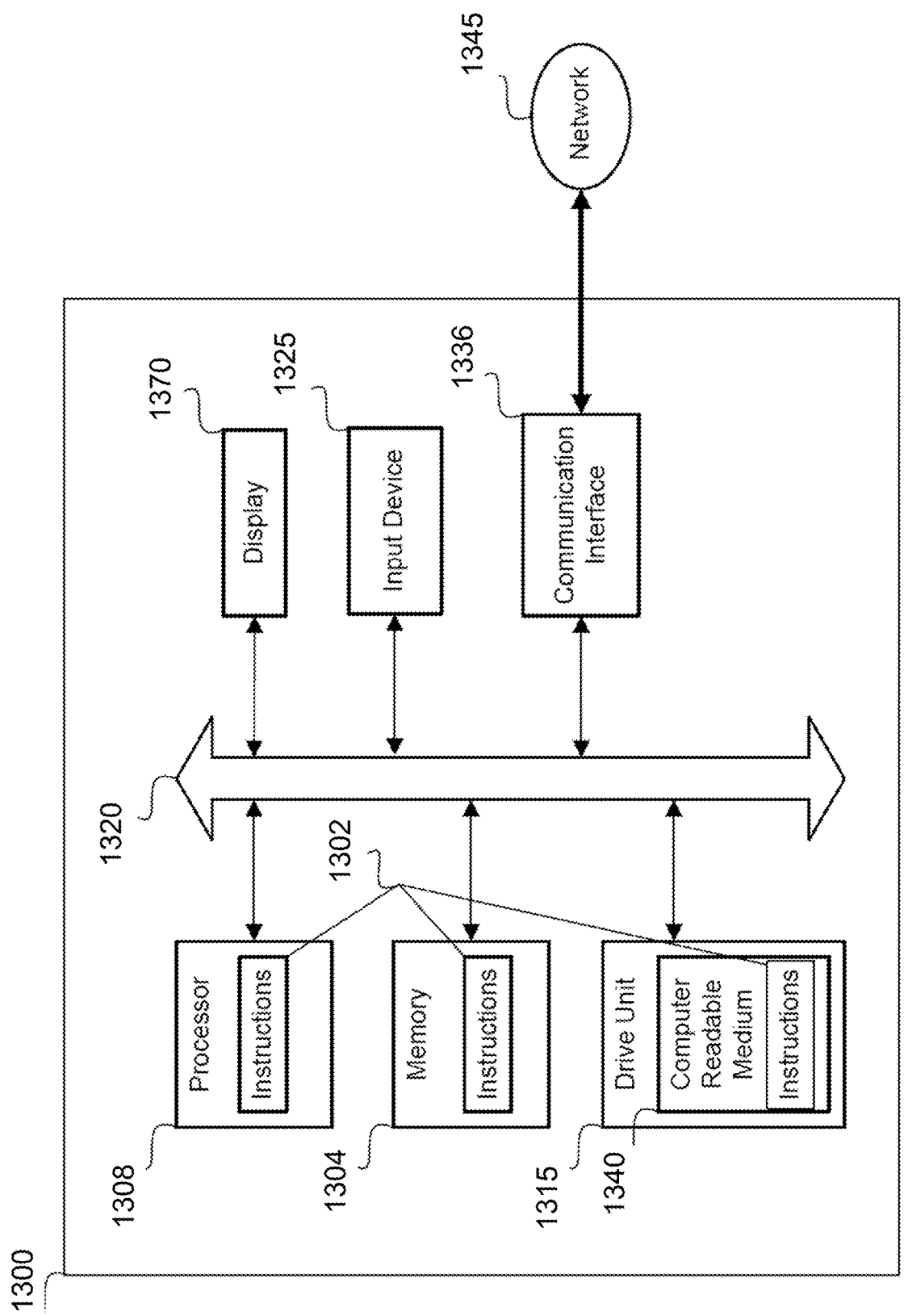
FIG. 13 is a general computer system, programmable to be a specific computer system, which may represent any of the computing devices referenced herein.

In one or some embodiments, the floor of the instrument may have one or more waste baskets for waste disposal 444 and one or more standardized deck slots that may be used for any one, any combination, or all of: the main deck 440; the magnetic module 430 (alternatively termed a magnetic field generator); microbiological incubator(s) 428 (such as a plurality of stackable microbiological incubators 428); and storage of consumables and reagents (see storage decks 442). In one or some embodiments, one or more well plates may be used, such as 441, 443, 445, which may be used for various processes. In particular, in one or some embodiments, a well plate may comprise a "sample" well plate (such as well plate 441), a "culture" well plate (such as well plate 443, 454), etc. In practice, one or more robots (e.g., a robot with a gripper, see XYZ robot 420) may move well plate to incubator 428 for incubation. Periodically, the one or more robots may move a well plate for imaging (such as well plate 454). After which, the well plate may be moved back to incubator 428. In one or some embodiments, the entire instrument (excluding the computer) may measure at 25"×23"×26". In this regard, the system may provide a complete and scalable end-to-end solution for rapid detection of bacterial colonies. In one or some embodiments, the computer 410 may comprise a desktop instrument with intuitive lab automation software working in combination with a low-cost assay kit, an example of which is illustrated in FIG. 13. The instrument may comprise one or multiple computerized modules that automatically implement any one, any combination, or all of: inoculation; magnetic cell isolation; incubation; plate imaging; plate handling; culture reading; and result reporting. The system may also eliminate the need for agar plates, may reduce or minimize the required lab space and may reduce costs on reagents and consumables.

In one or some embodiments, agar (or other immobilizing medium) may be heated by a microwave in a separate device to become liquid in form and then poured into a receptacle (e.g., in one of the storage decks 442) of the system, and thereafter heated using agar heater 436 (which may comprise a hotplate) in order to keep the agar in liquid form. Alternatively, solid agar may be placed in agar heater 436 with agar heater 436 heating the solid agar sufficiently to change its form to liquid. Still alternatively, the system may not need an agar heater if the liquid agar is heated sufficiently, placed in an insulated receptacle, and poured into the wells quickly (prior to the liquid agar solidifies).

Thus, as shown in FIG. 4A, immunomagnetic separation, plating, incubation, and detection/enumeration/extracting may be performed within the same machine. Alternatively, any one, any combination, or all may be performed by separate machines. As one example, immunomagnetic separation and plating may be performed in separation machine(s) (such as two separate machines) from the machine that performs incubation and any one, any combination, or all of detection, enumeration, or extracting.

Figure 4B:
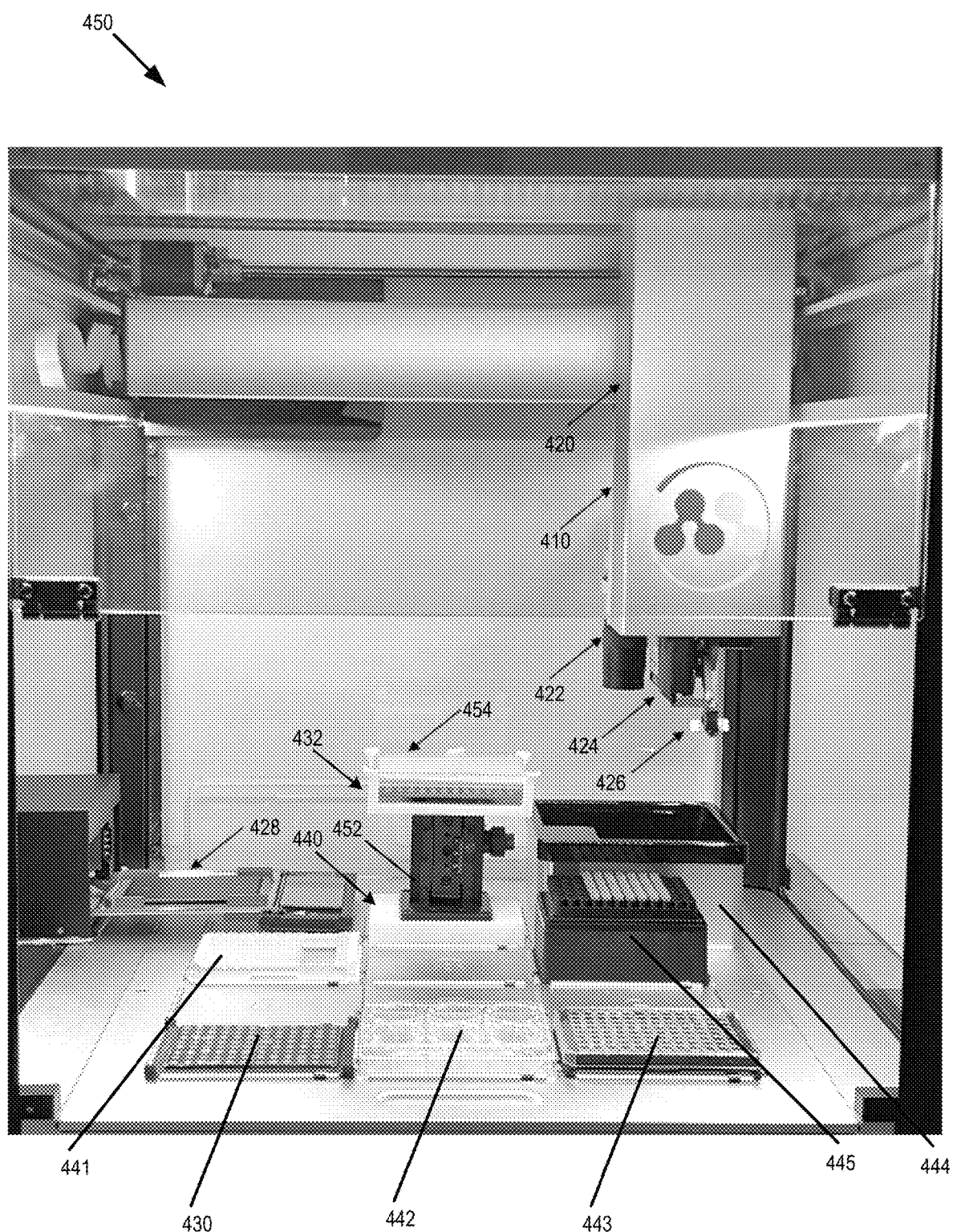
FIG. 4B is an illustration of an example *Salmonella* detection system.

FIG. 4B is an illustration 450 of an example *Salmonella* detection system. In one or some embodiments, the *Salmonella* detection system may be configured to perform any one, any combination, or all of: inoculation; incubation; immunomagnetic separation; microplating; imaging; microcolony reading; or result reporting. The computer, shown as 410 contained therein, may comprise a microcomputer. Further, FIG. 4B illustrates an optical imaging module 422, a liquid handling module 424, and a plate handling module 426 (which may comprise a multi-finger, such as a 2-finger, adaptative gripper), one, some or each of which may be mounted to XYZ robot 420 (such as a Gantry robot). In one or some embodiments, the incubation function may be achieved through the microbiological incubator 428 (such as a single-microplate incubator). Alternatively, multiple microbiological incubators 428 may be stacked on top of one another for higher throughput. For example, the system may run a high-throughput microbial assay (e.g., up to 384 samples with 4 stacked microbiological incubators 428) on a compact and cost-effective desktop platform. In one or some embodiments, the *Salmonella* detection system may have multiple standardized deck slots including an illumination module 432 (which may comprise an LED array, such as a 12×8 RGB LED array automatically controllable by computer 410), a magnetic module 430 (such as a 12×8 magnet array), multiple storage slots for consumables and reagents (storage decks 442), and waste disposal 444 (such as a waste basket). Further, as discussed above, a single well (on a single microplate) may be used after IMS or multiple wells (on the same or different microplates) may be used after IMS. Thus, the system depicted in FIGS. 4A-B may be used in either type of system, whether using a single well or multiple wells. In one or some embodiments, the illumination module 432 may be positioned on or connected to a platform, such as Z-stage 452 illustrated in FIG. 4B. In practice, Z-stage 452 may move upward and downward. The wells, such as the 96-wells 454 illustrated in FIG. 4B, may be placed on the illumination module 432 in order for the wells to be illuminated.

In one or some embodiments, at least one magnetic field is applied. In particular, at least two magnetic fields may be applied (e.g., generated by two different magnets or generated by moving a magnet in two different places with respect to the well). As one example, two magnets may be used, with one magnet positioned to apply a magnetic field so that the bead-bound cells are pulled to one side of the well. This may make aspiration easier to remove the background cells (e.g., the cells that are not the bead-bound cells). A second magnet may be used to generate a magnetic field in order to pull the bead-bound cells to the bottom of the well (or other predetermined section). In this way, when liquid agar (or other immobilizing agent) is poured or applied to the well, the bead-bound cells may be positioned in the predetermined section of the well while the liquid agar is cooling. In one or some embodiments, one may physically move the magnet(s) with respect to predetermined parts of the well in order to apply the predetermined magnetic fields in the different sections of the well (e.g., move the magnet to a first position relative to the well in order to perform IMS of the bead-bound cells and then move the magnet to a second position relative to the well in order to immobilize the bead-bound cells to the bottom of the well when adding the liquid agar and/or while the liquid agar is solidifying).

Thus, the two different types of magnetic fields (generated by different magnets or generated by the same magnet) may be used to immobilize the bead-bound cells, but for different purposes. As one example, one magnetic field may be used to immobilize the bead-bound cells for the function of aspirating the background cells (e.g., immobilizing for the separation during IMS). As another example, the second magnetic field may be used to immobilize the bead-bound cells while the liquid immobilizing agent is cooling (e.g., immobilizing for imaging). In one embodiment, the two different magnetic fields (for IMS and for imaging) may be applied to a single well (e.g., where IMS is performed in a particular well and where the liquid agar is poured into the same particular well). Alternatively, the two different magnetic fields (for IMS and for imaging) may be applied to two different wells. For example, a first magnetic field is applied to a first well in order to perform IMS. After IMS, the sample (which may include bead-bound cells) may be removed from the first well and placed into a second well. A second magnetic field may then be applied to the second well while adding the liquid agar/the liquid agar is cooling.

Figure 5:
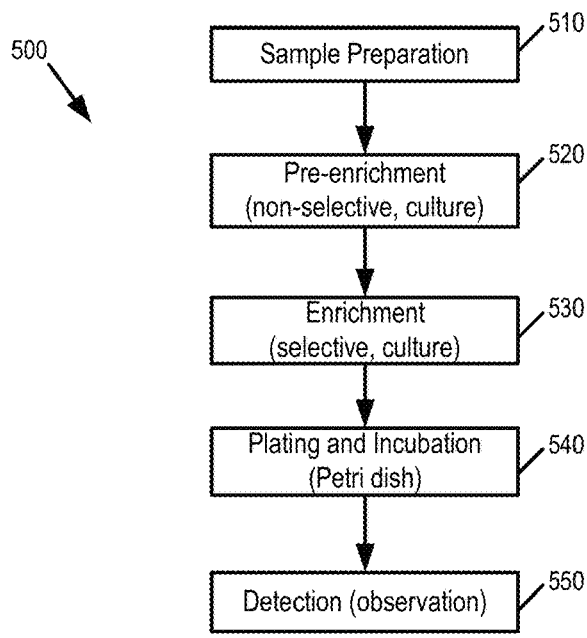
FIG. 5 is a flow diagram for culture-based methods.

As discussed above, traditional culture-based methods for *Salmonella* detection in food may rely on a series of enrichment steps with increasing selectivity culminating in the isolation of *Salmonella* on selective agar plates. In this regard, the traditional culture-based methods may take days to obtain results and may be labor intensive. For example, the FDA Bacteriological Analytical Manual (BAM) method includes serial culture steps in broth formulations (a nonselective pre-enrichment culture, followed by a selective enrichment culture step) and plating onto selective agars to isolate suspect colonies. The pre-enrichment broths (e.g., Lactose, Universal Pre-enrichment, BPW, and Trypticase Soy) may be optimized to resuscitate *Salmonella*, while the selective enrichment (e.g., Tetrathionate and Rappaport-Vassiliadis) broths are to hamper the growth of competitive bacteria. The traditional flow diagram 500 for culture-based methods is illustrated in FIG. 5.

At 510, sample preparation may be performed. After which, at 520, a pre-enrichment (non-selective culture step) is performed, which may take approximately 24 hours. Specifically, the pre-enrichment and its duration may strongly depend on the level of *Salmonella* contamination, the level of stress or injury on the *Salmonella* by the food matrix or processing environment, and the level of toxicity of the selective enrichment step. Furthermore, some dried foods, notably herbs and spices, may contain compounds that could inhibit *Salmonella* growth in the enrichment cultures, and thus require complex steps such as compound neutralization.

At 530, an enrichment (selective culture step) is performed, which may take approximately 24 hours. Specifically, Tetrathionate (TT) and Rappaport-Vassiliadis (RV) broths are the most common broths for selective enrichment of *Salmonella*. TT broths induce TT production and thus provide a metabolic advantage to microorganisms that have TT reductase such as *Salmonella*. Bile salts and brilliant green dye may be added to the base broth also inhibit gram-positive bacteria. RV broths, on the other hand, rely on low PH, $MgCl_2$ and malachite green to inhibit competing bacteria and provide favorable conditions for *Salmonella* growth. In addition, incubation of RV or TT broths above 37° C. may further reduce competitive bacteria. For example, the FDA BAM recommends incubation of RV medium for 24±2 h at 42±0.2° C. and incubation of TT broth for 24±2 h at 43±0.2° C.

At 540, plating and incubation is performed, which may take approximately 24 hours. Specifically, TT and RV broths may be respectively streaked on 3 selective agar petri dishes: bismuth sulfite (BS), xylose lysine desoxycholate (XLD), and Hektoen enteric (HE) agar. All plates may be incubated for 24±2 h at 35° C.

At 550, colony detection is performed, which may take less than 1 hour. Specifically, plates may be examined or observed for the presence of colonies that may be *Salmonella* based on typical *Salmonella* colony morphology. Colonies of interest can be picked out for further analysis. Thus, FIG. 5 illustrates the traditional method, with multiple steps that each takes 24 hours or longer (e.g., a 24-hour nonselective pre-enrichment, followed by a 24-hour selective enrichment, plating onto selective agar plate and incubation for another 24 hours, before colonies can be observed on day 4).

In one or some embodiments, after a negative detection (e.g., the image analysis does not detect any colonies of interest), processing may end. Alternatively, or in addition, after a presumptive positive detection (e.g., detection of a potential colony of interest), identification and subtyping may be performed. For example, Matrix-assisted laser desorption ionization-time of flight (MALDI-TOF) mass spectrometry (MS) may be used for rapid identification of bacterial and fungal isolates. In comparison to other microbiological identification methods, this technology is easier to operate, lower in per sample cost and faster in turn-around time (~10 min from colony selection to identification), and thus has become the most common technique used for bacterial analysis in clinical diagnostics. In MALDI-TOF, a colony of interest is placed onto the sample target plate and overlaid with matrix. The mass spectra of expressed proteins generated are analyzed and compared with species spectral library populated with composite reference spectra from clinically relevant isolates.

The disclosed methodology may address one or more limitations of traditional methods, such as time to result, while maintaining the advantages of the traditional methods, such as detection sensitivity and colony availability for further studies. FIG. 6A is a first example flow diagram 600 of the disclosed methodology. In the disclosed methodology, the samples may be prepared at 510 and pre-enrichment at 610 may optionally be performed. In one or some embodiments, pre-enrichment (610) is different from pre-enrichment 520 in FIG. 5, taking less time (e.g., taking 4-8 hours (e.g., no more than: 4 hours; 5 hours; 6 hours; 7 hours; or 8 hours) as opposed to 24 hours in 520). After which, in one or some embodiments, steps 620 may comprise automated steps, which may comprise enrichment (selective, IMS) at 622, plating and incubation (e.g., using a 96-well plate) at 624, and detection/enumeration (e.g., using time-lapse imaging) at 626.

In particular, immunomagnetic isolation (IMS) in enrichment at 622 may be used for rapid isolation of viable and functional of *Salmonella* from pre-enrichment media, where magnetic nanoparticles conjugated with anti-*Salmonella* antibodies may be added to sample wells to bind to *Salmonella* and then a magnet array (e.g., a 96-magnet array) may be used to isolate bead-bound *Salmonella* in each well from background flora. In this regard, unlike other high-throughput techniques such as fluorescence-activated cell sorting (FACS), IMS may be compact, low-cost and easy to implement and does not require a highly engineered fluidic, optic and electronic system for operation. Hence the use of IMS for selective enrichment also relaxes the requirement on the pre-enrichment step duration.

After IMS, in one or some embodiments, magnet(s) may then be used to isolate the particle-conjugated target cells. Specifically, bead-bound *Salmonella* may be held by magnets on the bottom of each well when a shallow layer of a medium, such as a low-melting-point (40° C.) agarose medium, is added into the wells. The microplate may then be incubated (e.g., at 37° C.) and moved from the incubator by the plate handling module to the illumination deck for imaging on each well once every hour starting at hour 4. In one or some embodiments, in each hour, it takes approximately 5 minutes to obtain images of all the wells in the microplate. Rapid detection of microcolonies may be achieved by time-lapse imaging, where the size and/or color of microcolonies over time may be analyzed for one or more aspects to determine whether the one or more aspects have changed. For example, the size and/or color of the colonies may be detected whereas those of non-growing particles (e.g., dust, debris) that do not change in size and/or color remain unchanged.

As discussed above, the steps performed on pre-enriched samples, including any one, any combination, or all of IMS, microplating, incubation, optical imaging, image analysis and result reporting, may be automated and may take as few as 6 hours to complete (e.g., no more than: 6 hours; 7 hours; 8 hours; 9 hours; 10 hours; 11 hours; or 12 hours). In one or some embodiments, the pre-enrichment step may be optional or may take much less time than the traditional methods (e.g., since the IMS step, unlike the selective culture enrichment, is non-toxic). In one or some embodiments, the entire methodology (e.g., the time to result), including the optional pre-enrichment step, may be 24 hours (e.g., no more than: 24 hours; 25 hours; 26 hours; 27 hours; 28 hours; 29 hours; or 30 hours).

FIG. 6B is an example flow diagram of detection/enumeration 626 as illustrated in FIG. 6A. At 630, time-lapse images may be input. As discussed above and in further detail below, in one or some embodiments, the bead-bound cells may be positioned in a predetermined focal plane (or predetermined section), thereby assisting in more accurate imaging and/or in using less expensive imaging equipment. In practice, the images may be captured in real time by an optical system, such as optical imaging module 422. As shown in FIG. 6B, the images are at different times, such as at time=4 hours (632), time=5 hours (634), time=6 hours (636), and time=7 hours (638). Within the images may comprise various objects of potential interest, such as 640, 642, 644, which are show in each of 632, 634, 636, 638. At 650, the images may be converted to grayscale to make subsequent processing more rapid (see image 634 converted to grayscale image 652; image 636 converted to grayscale image 654; image 638 converted to grayscale image 656).

Thus, images 632, 634, 636, 638 may be used to demonstrate the feasibility of detecting *Salmonella* microcolonies via time-lapse images, *Salmonella* cells were plated into a sample well with a shallow layer of the low melting agarose medium on a 96-well microplate and incubated at 37° C. Images 632, 634, 636, 638 were taken after 4, 5, 6, 7 hours, respectively, of incubation under a 5× objective lens. Two growing objects (shown as 640, 642) are detected in the field of view and are suspect microcolonies. In contrast, an object on the lower part of the image of the well (shown as 644) does not change in size and shape over time, and thus is unlikely to be a microcolony, and therefore may be designated as such (e.g., object 644 may be tagged as not a microcolony and ignored for future analysis).

In the disclosed methodology, in one or some embodiments, the bead conjugated *Salmonella* cells may be pulled down to the bottom of the well by IMS before the agar medium is added, so all of the colonies are on the same focal plane (or same section). Alternatively, the bead conjugated *Salmonella* cells may be placed on a bed of agar after performing IMS (e.g., in a different well from where IMS was performed). Still alternatively, the bead conjugated *Salmonella* cells may be placed on a bed of agar after performing IMS and then the liquid agar or agar medium may be added on top. Magnets generating a magnetic field may be used in order to position the bead conjugated *Salmonella* cells in the same focal plane (e.g., a predetermined focal plane) in any one, any combination, or each of these instances. This may also allow a cost-effective optical imaging module to be used in the disclosed platform. In particular, the applied magnetic field may be used in order to move the bead-bound cells to a predetermined portion of the well (e.g., the bottom of the well; on the surface of the bed of agar). After which, the agar medium may be used to immobilize the bead-bound cells at the predetermined portion of the well (after which, the applied magnetic field may optionally be removed). In this way, the applied magnetic field in combination with the immobilizing agent (e.g., the agar medium) may be used in order to more easily detect the cells of interest. Specifically, the cells of interest may be positioned in the predetermined portion of the well (e.g., the bottom), thereby making it easier to detect the cells of interest in several ways. First, the imaging device (e.g., the camera) may be configured so that its focus is at the predetermined portion of the well (e.g., the bottom) for accurate imaging of the cells of interest. Second, the other cells (which are not of interest) are not moved by the magnetic field to the predetermined portion of the well (e.g., the bottom). In this way, the focal plane of interest (e.g., at the bottom of the well) is more likely to include the cells of interest since the applied magnetic field moves the cells of interest there and is less likely to include the cells not of interest since the magnetic field does not move the cells not of interest there.

The difference between subsequent images may then be calculated, resulting in a series of black and white images, where the white pixels depict the pixels which were different across the two subtracted images. As shown, the converting to grayscale and subtracting of the subsequent images results in three objects of potential interest 658, 660, 662. At 670, filtering criteria, such as size and/or shape changes, may be applied to generate an updated image 672 in order to detect growing colonies. Using analysis of the updated image 672 may detect the growing objects/colonies. As shown in FIG. 6B, of the objects of potential interest 658, 660, 662, two objects 674, 676 are identified as growing objects/colonies.

After all the growing objects have been identified and filtered down, the position and count of the identified growing objects may be saved. At 680, an output image 682 may be generated indicative of the identified growing objects, shown as 684, 686. In particular, a visual indicator of the position of the colony (or colonies) may also be implemented to provide the user with feedback regarding the progress of the protocol. For example, the output image 682 may be modified, such as by overlaying one or more markers. As shown in FIG. 6B, circles 688, 690 are overlayed onto output image 682. Other markers (such as arrows or the like) are contemplated. In this regard, FIG. 6B illustrates a flow diagram outlining one example of image analysis algorithm for microcolony detection and enumeration.

Thus, in the algorithm, each captured image may first be converted to grayscale and then compared to the image taken at a predetermined time before (e.g., one hour before). The difference between the images may be calculated, resulting in a series of images 652, 654, 656 with white pixels in black field, where the white pixels show the difference of the two images. Changes across the different images may further be calculated to obtain measures of higher order derivatives. Since colonies may be growing in an exponential manner, the presence of non-zero higher order derivatives in the change between images of an observed object may be used as an indicator that the observed object is likely a colony. The larger the number of images obtained, the more accurate this detection may become. In one or some embodiments, the minimal number of images needed to differentiate a colony from contaminants (e.g., solid particles) is three. Obtaining more images increases the specificity of the resulting data. The specificity may be further increased by applying known filtering criteria to the identified objects, such as a threshold on the size of the objects and/or a threshold on the rate of growth of the objects. The locations of the colonies may then be noted and highlighted (see 682) on a live feed of the well of interest for the sake of real-time user feedback.

Figure 7A:
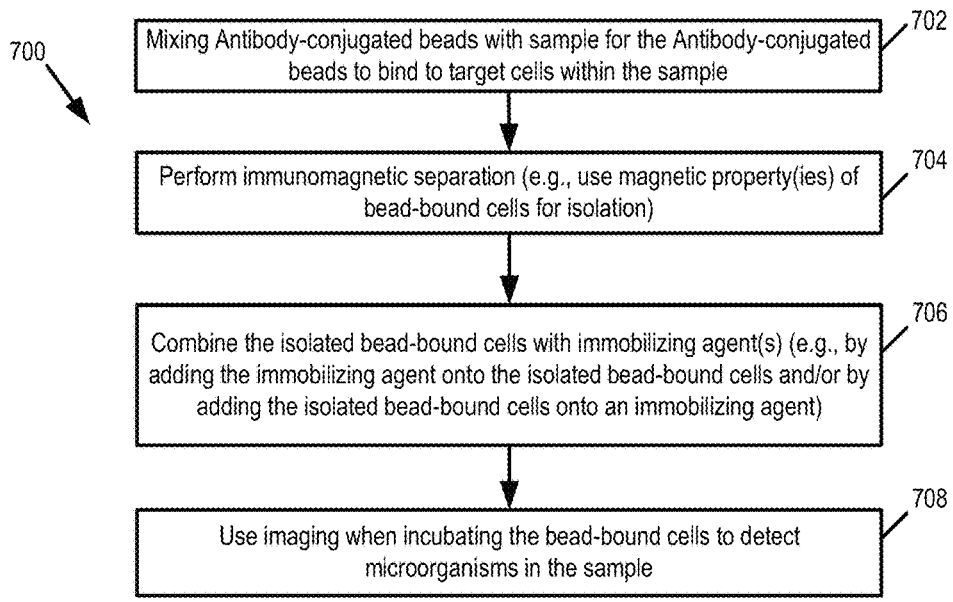
FIG. 7A is a flow diagram for performing immunomagnetic separation, combining with an immobilizing agent, and using imaging to detect microorganisms in the sample.

FIG. 7A is a flow diagram 700 for performing immuno-magnetic separation, combining with an immobilizing agent, and using imaging to detect microorganisms in the sample. Any one, any combination, or all of the flow diagram 700 may be performed automatically. At 702, Antibody-conjugated beads may be mixed with a sample and bind to target cells. At 704, immunomagnetic separation is performed. For example, the magnetic property or properties of the bead-bound cells are used for isolation. At 706, the isolated bead-bound cells are combined with one or more immobilizing agents. This is discussed in further detail in FIGS. 7B-D. Any one, any combination, or all of the steps of 706 illustrated in FIGS. 7B-D may be performed automatically. For example, an immobilizing agent may be added onto the isolated bead-bound cells. Alternatively, or in addition, the isolated bead-bound cells may be added onto an immobilizing agent. After which at 708, imaging is used when incubating the bead-bound cells in order to detect whether there are the target microorganisms in the sample.

Figure 7B:
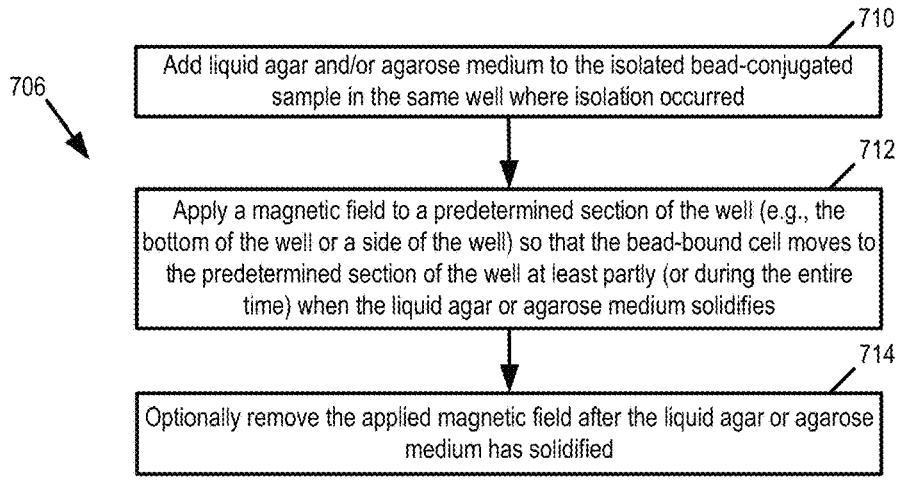
FIG. 7B is a first example of combining with the immobilizing agent.

FIG. 7B is a first example of combining with the immobilizing agent 706. At 710, liquid agar and/or an agarose medium may be added to the isolated bead-conjugated sample in the same well where isolation (e.g., IMS) occurred. At 712, a magnetic field is applied to a predetermined section of the well (e.g., the bottom of the well or a side of the well) so that the bead-bound cells move to the predetermined section of the well at least partly (or during the entire time) when the liquid agar or agarose medium solidifies. In one or some embodiments, the magnetic field is applied prior to adding the liquid agar and/or agarose medium at 710. Alternatively, the magnetic field is applied at the same time as adding the liquid agar and/or agarose medium or shortly thereafter (e.g., the magnetic field added at least partly while the liquid agar or the agarose medium is solidifying). At 714, the applied magnetic field may optionally be removed after the liquid agar or agarose medium has solidified. In one or some embodiments, the liquid agar or agarose medium may generally solidify within minutes. As such, the magnetic field may be removed at a predetermined time after adding the liquid agar and/or agarose medium at 710 (such as at 10 minutes after adding the liquid agar and/or agarose medium).

Figure 7C:
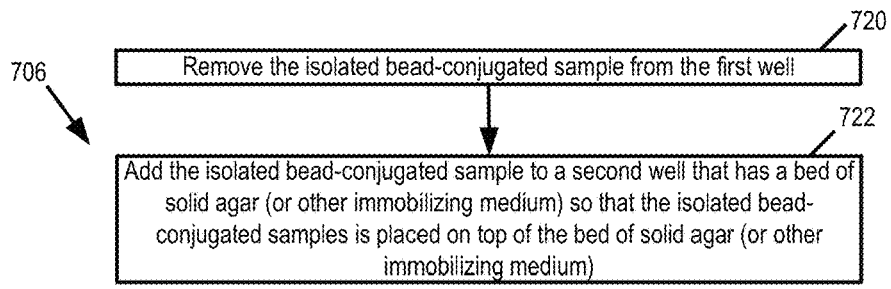
FIG. 7C is a second example of combining with the immobilizing agent.

FIG. 7C is a second example of combining with the immobilizing agent 706. At 720, the isolated bead-conjugated sample is removed from the first well. After which, at 722, the isolated bead-conjugated sample is added to a second well that has a bed of solid agar (or other solid immobilizing medium) so that the isolated bead-conjugated samples is placed on top of the bed of solid agar (or other immobilizing medium). Thus, in one embodiment, combining with the immobilizing agent 706 consists of placing the isolated bead-conjugated sample onto the solid agar (or other solid immobilizing medium).

Figure 7D:
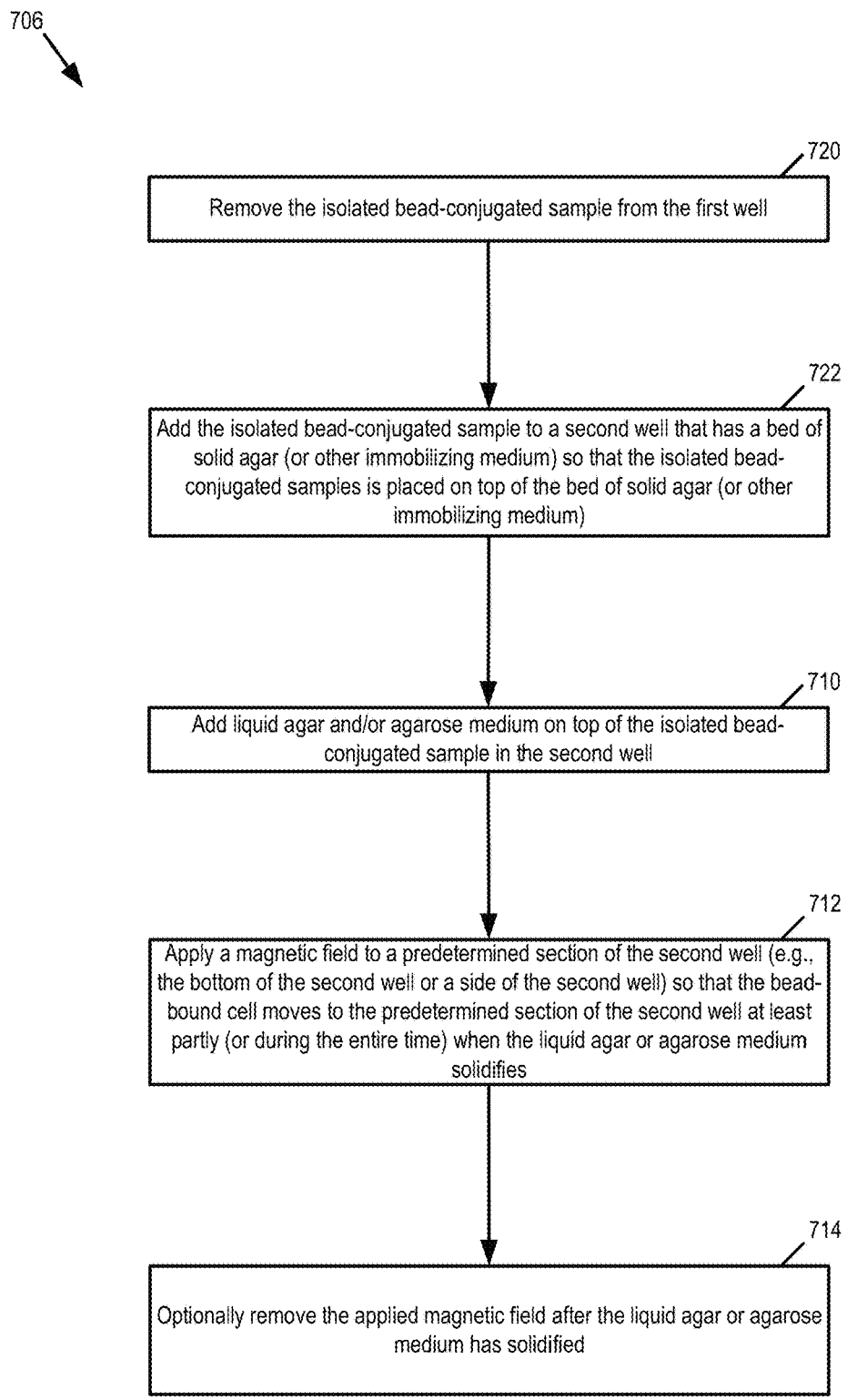
FIG. 7D is a third example of combining with the immobilizing agent.

FIG. 7D is a third example of combining with the immobilizing agent. As shown, FIG. 7D includes steps from each of FIGS. 7B-C. Specifically, 720 and 722 are performed, thereby resulting in the placement of the isolated bead-conjugated sample onto the solid agar (or other solid immobilizing medium) in a different well. After which, 710, 712, and 714 may be performed, whereby liquid agar or agarose medium (or other liquid immobilizing agent) are poured and solidified onto the isolated bead-conjugated sample onto the solid agar (or other solid immobilizing medium) previously placed on the bed of solid agar (or other solid immobilizing medium). In this way, the isolated bead-conjugated sample may be sandwiched between solid agar (or other solid immobilizing medium).

Figure 8A:
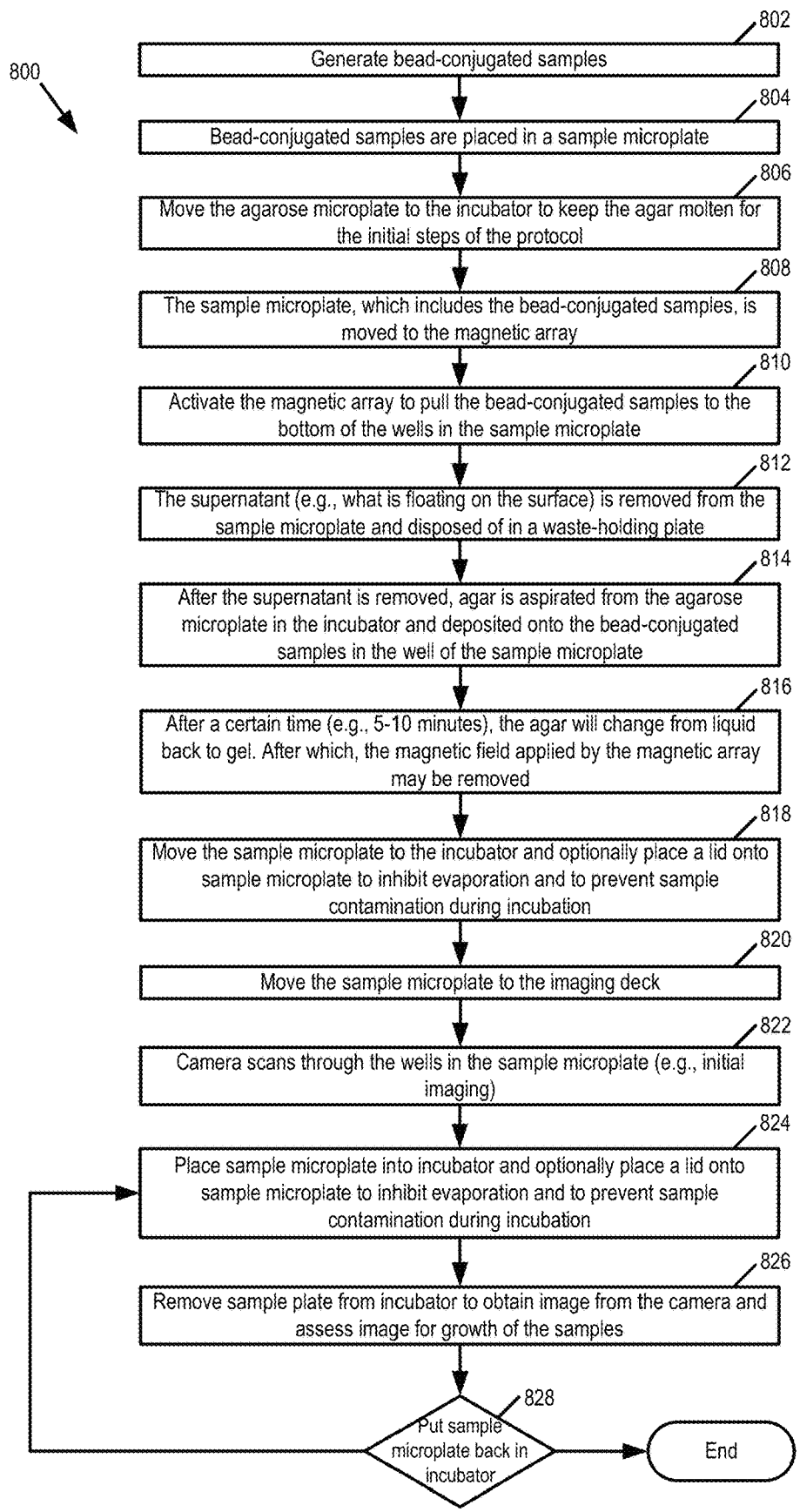
FIG. 8A is a second example flow diagram of the disclosed methodology.

FIG. 8A is a second example flow diagram 800 of the disclosed methodology, which may include additional detail regarding FIGS. 3A-H. Any one, any combination, or all of the flow diagram 800 may be performed automatically. At 802, the bead-conjugated samples may be generated. As discussed above, U.S. Pat. No. 10,780,444, incorporated by reference herein in its entirety, discloses immunomagnetic separation and the generation of bead-conjugated samples. At 804, bead-conjugated samples may be placed in the sample microplate. At 806, the agarose microplate is moved to the incubator to keep the agar molten for the initial steps of the protocol. In this regard, 806 is to prepare for adding the molten agar at step 814. At 808, the sample microplate, which includes the bead-conjugated samples, is moved to the magnetic array. At 810, the magnetic array is activated to pull the bead-conjugated samples to a predetermined part of the well, such as to the bottom of the wells in the sample microplate. At 812, the supernatant (e.g., what is floating on the surface) is removed from one or more wells of the sample microplate (e.g., the supernatant is removed at a top portion that is above the bottom of the well) and disposed of in a waste-holding plate.

At 814, after the supernatant is removed, agar, which is molten, is aspirated from the agarose microplate in the incubator and deposited onto the bead-conjugated samples in the well of the sample microplate. At 816, after a certain time (e.g., 5-10 minutes), the agar will change from liquid back to gel (e.g., from a liquid to a more solid state). Thus, the agar is an example of a suspension that has cooled within the well from a liquid to a more solid state. In this way, the bead-conjugated samples may be frozen or immobilized at the predetermined part of the well. After which, the magnetic field applied by the magnetic array may be removed. Alternatively, the magnetic array may continue to apply the magnetic field (with or without application of the agar in order to freeze the bead-conjugated samples into place).

At 818, the sample microplate is moved to the incubator and optionally placed thereon a lid to inhibit evaporation and to prevent sample contamination during incubation. At 820, after incubation for a predetermined amount of time (e.g., 1 hour), the sample is moved to the imaging deck. At 822, after the lid is removed from the sample microplate, the camera (s), which is part of the imaging deck, may scan through the wells in the sample microplate (e.g., the initial imaging of the wells at a predetermined plane at the bottom of the well). After which, at 824, the sample microplate is placed back into the incubator and optionally placed thereon a lid. At 826, the sample plate is removed from the incubator, the lid is removed from the sample plate, and the camera obtains images from the wells (e.g., at the predetermined plane). After which, the images are analyzed/assessed for growth of the samples. At 828, it is determined whether to put the sample microplate back into the incubator. If so, flow diagram 800 loops back to 824. If not, flow diagram ends. The determination whether to loop back to 824 may be based on one of several criteria. In one embodiment, the determination may be based on a number of iterations. For example, the number of iterations may be predetermined (e.g., 3 iterations of looping back to 824). Alternatively, or in addition, the determination may be based on whether the identified growing objects has changed between iterations (e.g., if the number/placement of growing objects in a directly previous iteration is the same as the number/placement of growing objects in the current iteration, the flow diagram ends; if the number/placement of growing objects in the previous X iterations (such as the previous 2 iterations) is the same as the number/placement of growing objects in the current iteration, the flow diagram ends).

Any one, any combination, or all of the steps illustrated in FIG. 8A may be automated. Alternatively, or in addition, any one, any combination, or all of the steps illustrated in FIG. 8A may be triggered by user input, with the user input thereafter triggering an automatic action. As one example, the placing of bead-conjugated samples in the sample microplate at 804 may be triggered by a user input (e.g., the operator may input via the user interface to place the bead-conjugated samples into the sample microplate). Responsive to the user input, the system may automatically place the bead-conjugated samples into the sample microplate. Alternatively, responsive to generating the bead-conjugated samples (e.g., responsive to determining that the process of bead-conjugation has completed), the system may automatically place the bead-conjugated samples into the sample microplate. As another example, the agarose microplate moving to the incubator at 806 may be automatically performed responsive to placing the bead-conjugated samples into the sample microplate. Alternatively, the operator may manually command via the user interface to move the agarose microplate moving to the incubator. As still another example, moving the sample microplate at 808 and activating the magnetic array at 810 may be automatically performed in sequence responsive to placing the bead-conjugated samples into the sample microplate. Alternatively, the operator may manually command via the user interface to move sample microplate to the magnetic array and/or to activate the magnetic array.

As yet another example, the supernatant may be automatically removed at 812 (e.g., responsive to activating the magnetic array for at least a predetermined amount of time, such as at least 10 seconds, at least 30 seconds, at least one minute, etc.), the system may automatically control the removal of the supernatant and automatically dispose of the supernatant into the waste-holding plate. Alternatively, the operator may manually command via the user interface to remove the supernatant. As still another example, responsive to removing the supernatant (automatically or not), the system at 814 may be triggered to automatically aspirate the agar from the agarose microplate and automatically deposit the agar into the well(s) of the sample microplate. Alternatively, the operator may manually command via the user interface to aspirate the agar and deposit the agar into the well(s) of the sample microplate. As yet another example, the system at 816 may automatically remove the magnetic field applied (e.g., after a predetermined amount of time, such as at least 5 minutest) after depositing the agar into the well(s), the magnetic field is automatically removed. Further, the moving of the sample microplate into/out of the incubator and/or placing/removing the lid on the sample microplate may be automatically performed (e.g., responsive to waiting for the agar to cool and/or to determining to put the sample microplate at 828 back into the incubator, the system may automatically determine to place the lid on the sample microplate and move the sample microplate into the incubator; responsive to waiting a predetermined amount of time after placing the sample microplate into the incubator, the system may automatically remove the sample microplate from the incubator and remove the lid). Further, automatically responsive to removing the sample microplate from the incubator and removing the lid, the system may automatically use the camera(s) to obtain images of the well(s) in the sample microplate.

In this way, the methodology may include an image analysis algorithm so the system may automatically detect and enumerate colonies of interest. As the microcolonies grow over time, the software may utilize this unique property to reliably discriminate the microcolonies from contaminants (e.g., dust, debris) and background noise.

Figure 8B:
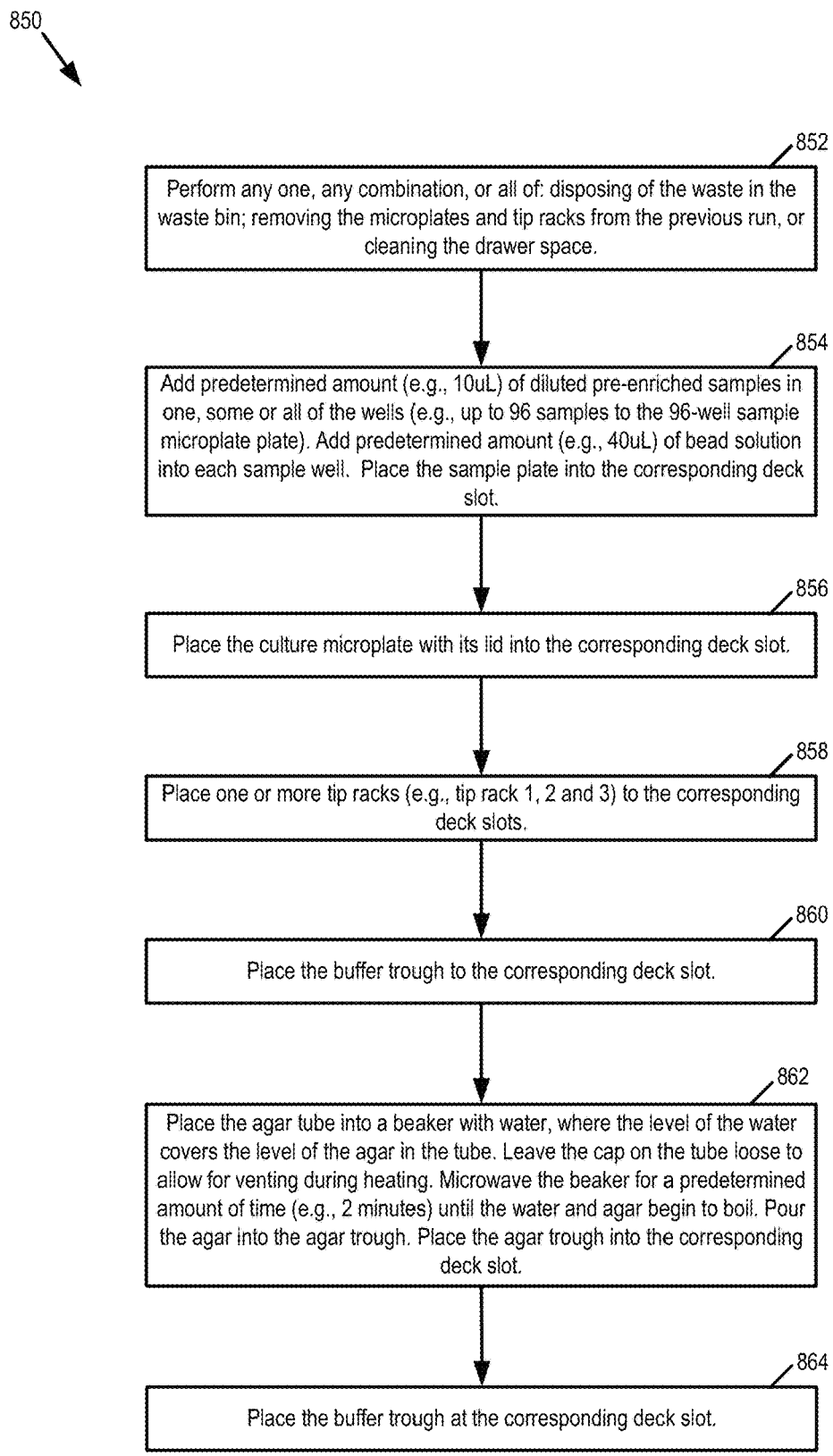
FIG. 8B is a flow diagram for an example protocol before an operator begins a run of analyzing samples.

FIG. 8B is a flow diagram 850 for an example protocol before an operator begins a run of analyzing samples. Any one, any combination, or all of the flow diagram 850 may be performed automatically. In one or some embodiments, prior to initiating the automated run, one or more steps may be performed, such as any one, any combination, or all of the following listing in the flow diagram 850 in FIG. 8B. In particular, at 852, if necessary, any one, any combination, or all of the following is performed: disposing of the waste in the waste bin; removing the microplates and tip racks from the previous run, or cleaning the drawer space. At 854, a predetermined amount (e.g., 10 uL) of diluted pre-enriched samples is added in one, some or all of the wells (e.g., up to 96 samples to the 96-well sample microplate plate) and a predetermined amount (e.g., 40 uL) of bead solution is added into each sample well. The sample plate may be placed into the corresponding deck slot, such as one illustrated in FIG. 4B.

At 856, the culture microplate with its lid may be placed into the corresponding deck slot, such as one illustrated in FIG. 4B. At 858, one or more tip racks (e.g., tip rack 1, 2 and 3) may be placed into the corresponding deck slots, such as illustrated in FIG. 4B. At 860, the buffer trough may be placed into the corresponding deck slot. At 862, the agar tube may be placed into a beaker with water, where the level of the water may cover the level of the agar in the tube. The cap may be left loose on the tube to allow for venting during heating. The beaker may be heated, such as by microwaving the beaker for 2 minutes, until the water and agar begin to boil. The agar may be poured into the agar trough. After which, the agar trough may be placed into the corresponding deck slot, such as one illustrated in FIG. 4B. At 864, the buffer trough may be placed at the corresponding deck slot. After which, the automated protocol may be selected and the operator may click start to begin the automated protocol.

Figure 8C:
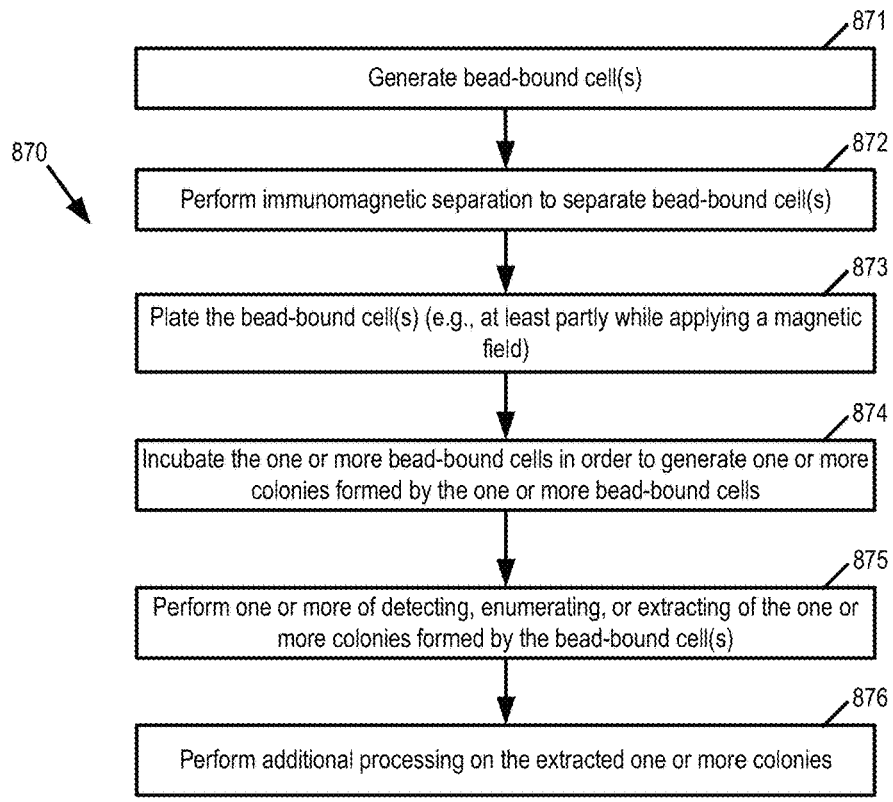
FIG. 8C is a flow diagram for an example protocol for analyzing samples.

FIG. 8C is a flow diagram 870 for an example protocol for analyzing samples. Any one, any combination, or all of the flow diagram 870 may be performed automatically. At 871, bead-bound cell(s) may be generated, such as by adding samples to one or more wells and adding beads to the one or more wells. In one embodiment, the samples are first added to the one or more wells, and the beads are thereafter added. Alternatively, the sequence may be reversed. In either instance, the bead-bound cells may be generated.

After which, at 872, immunomagnetic separation may be performed in order to separate the bead-bound cell(s). As discussed above, one or more magnets may be used in order to perform the immunomagnetic separation. At 873, plating of the bead-bound cell(s) may be performed. As discussed above, various methods of plating are contemplated. As one example, the bead-bound cell(s) may be placed on a bed of agar. This is illustrated, for example, in FIG. 3I. As another example, agar may be placed on top of the bead-bound cell(s). This is illustrated, for example, in FIGS. 3F-H and 3J-L. As still another example, the bead-bound cell(s) may be sandwiched between agar. This is illustrated, for example, in FIGS. 3J-L. In any of these instances, the bead-bound cell(s) may be placed into contact with an immobilizing medium, such as agar, as part of the plating process. As yet another example, the bead-bound cell(s) may be spread or streaked as part of the plating process. Various devices may be used to spread or streak as part of the plating process, such as an inoculation loop/needle.

At 874, the one or more bead-bound cell(s) (or no bead-bound cells, in the case where there are zero bead-bound cells for negative samples) that are plated are incubated in order to generate one or more colonies that are formed by the one or more bead-bound cell(s). As discussed above, different magnetic fields may be applied at least partly during incubation. As one example, responsive to later performing detection of the one or more colonies, a focused magnetic field may be applied to a part of the well (e.g., the center of the well) at least partly (or entirely) during incubation in preparation for the imaging system performing detection (e.g., presumptively positive) whether there are any colonies within the respective well. As another example, responsive to later performing enumeration of the one or more colonies, a uniform magnetic field may be applied to a part of the well at least partly (or entirely) during incubation in preparation for the imaging system performing enumeration (e.g., counting) of the colonies within the respective well. At 875, any one, any combination, or all of the following with regard to the one or more colonies that are formed by the one or more bead-bound cell(s) is performed: detecting the one or more colonies; enumerating the one or more colonies; or extracting the one or more colonies. After which, at 876, additional processing or analysis may be performed on the extracted one or more colonies. As one example, matrix-assisted laser desorption/ionization-time of flight (MALDI-TOF) mass spectrometry may be performed.

In one or some embodiments, one, some, or each of the following functions may be performed in the same machine including: generating bead-bound cell(s); performing immunomagnetic separation to separate the bead-bound cell(s); plating the bead-bound cell(s); incubating the bead-bound cell(s); or performing one or more of detecting, enumerating or extracting the one or more colonies formed by the bead-bound cell(s). Further, in one or some embodiments, one, some, or each of the following functions may be performed in the same well within the same machine including: generating bead-bound cell(s); performing immunomagnetic separation to separate the bead-bound cell(s); plating the bead-bound cell(s); incubating the bead-bound cell(s); or performing one or more of detecting, enumerating or extracting the one or more colonies formed by the bead-bound cell(s).

Alternatively, one, some, or each of the following functions may be performed in the one machine and other function(s) (such as a remainder of the functions) may be performed in another machine, including: generating bead-bound cell(s); performing immunomagnetic separation to separate the bead-bound cell(s); plating the bead-bound cell(s); incubating the bead-bound cell(s); or performing one or more of detecting, enumerating or extracting the one or more colonies formed by the bead-bound cell(s).

Further, in one or some embodiments, one, some, or each of the following functions may be performed in a first well and other function(s) (such as a remainder of the functions) may be performed in a second well including: generating bead-bound cell(s); performing immunomagnetic separation to separate the bead-bound cell(s); plating the bead-bound cell(s); incubating the bead-bound cell(s); or performing one or more of detecting, enumerating or extracting the one or more colonies formed by the bead-bound cell(s). In one embodiment, the first well and second well are within the same machine (but may have different plates or may have different wells within the same plate). Alternatively, the first well and the second well are within different machines.

As one example, IMS may be performed within the same machine as incubation. Alternatively, IMS may be performed manually (and may be performed on a different platform), with incubation being performed on a different machine.

As another example, microplating may be performed automatically. Alternatively, microplating may be performed manually. Further, in one or some embodiments, the microplating may be performed on a different machine than incubation. In addition, in one or some embodiments, during incubation, the time-lapsed imaging (e.g., obtaining an image of a respective well every hour, or at predetermined times, such as at hours 4, 5 and 6) may be performed automatically (e.g., automatically moving the camera to the respective well; automatically obtaining an image of the respective well).

As yet another example, any one, any combination, or all of detecting the one or more colonies, enumerating the one or more colonies, or extracting the one or more colonies may be automatically performed. In particular, detecting may be automatically performed by the imaging system, such as described above. Further, enumerating may be automatically performed by the imaging system, such as described above. Also, extracting (e.g., picking and/or removing) the one or more colonies may be automatically performed. Alternatively, extracting may be manually performed.

Thus, a variety of workflows are contemplated. As one example, a user may first prepare the samples by manually performing the bead-binding (which may take on the order of 15 minutes) and immunomagnetic separation. As another example, a user may first prepare the samples by manually performing the bead-binding and immunomagnetic separation, and plating the samples with agar. In this regard, the machine may perform fewer automatic operations. Instead, a multi-well plate may simply be inserted into the machine, either after immunomagnetic separation or after immunomagnetic separation and plating the samples with agar. Alternatively, the machine may perform all the automatic steps, may perform all of the automatic steps after immunomagnetic separation or, may perform all of the automatic steps after immunomagnetic separation and plating the samples with agar. Still alternatively, the machine may guide the user, such as via a display (discussed below with regard to FIG. 9), as to the sequence of steps to perform.

Further, as discussed above, the colony (or colonies) after being detected and/or being enumerated, may be extracted (e.g., picked) from the respective well. As discussed further below with regard to FIG. 9, well B2 has 53 colonies (e.g., the image analysis analyzed one or more time-lapsed images with regard to well B2 to count 53 colonies). In one or some embodiments, the colony (or colonies) within a respective well may be classified, typed, and/or detected. For example, various types of colonies may grow within a respective well, such as *Salmonella* or "unknown" (if the image analysis indicates that the traits of the colony are not like *Salmonella*, such as traits that are unlike the traits of *Salmonella*), or the like. The various types of colonies may have one or more traits, such as any one, any combination, or all of: color; growth rate; or morphology. In this regard, in one or some embodiments, separate from detecting and/or enumerating the colony (or colonies), the image analysis may detect the type of colony. Further, in one or some embodiments, the image analysis may detect within in an image, such an image displayed in section 920, one or both of: (1) the one or more colonies; or (2) the type(s) of colonies within the image. As one example, the image analysis may overlay on the image arrows, icons, boxes, circles, or the like to indicate the one or more colonies within the image. Alternatively, or in addition, the image analysis may overlay on the image arrows, icons, boxes, circles, or the like to indicate the type of colony or the types of colonies within the image. For example, a colony suspected (e.g., presumptive positive or a preliminary screening for the pathogen of interest) as *Salmonella* may have a first color arrow, a first color box, a first color icon, a first color circle, or the like superimposed on the section of the image where the colony suspected as *Salmonella* is present. Further, a colony detected as Non-*Salmonella* (or "Unknown 1") may have a second color arrow, a second color box, a second color icon, a second color circle, or the like superimposed on the section of the image where the colony detected as Non-*Salmonella* is present (with the second color being different from the first color and optionally with the display including a key indicating the first color as *Salmonella* and the second color as Non-*Salmonella*). Alternatively, or in addition, a colony detected as "Unknown 2" may have a third color arrow, a third color box, a third color icon, a third color circle, or the like superimposed on the section of the image where the colony detected as "Unknown 2" is present (with the third color being different from the first color and the second color, and optionally with the display including a key indicating the first color as *Salmonella*, the second color as Non-*Salmonella*, and the third color as "Unknown 2").

In one or some embodiments, the image analysis may further recommend which of the colonies to extract from the well. Various criteria may be used to determine (e.g., rank) which one or more colonies (from the colonies identified within the well) to extract including any one, any combination, or all of: size (e.g., the size of the colony, as identified by the image analysis, is at least 0.5 mm in diameter); placement within the well (e.g., the colony is at least 1 mm from an edge of the well); or separation from other colony/colonies (e.g., the image analysis indicates that there is a clearance criteria of at least 1 mm between a respective colony and one or more neighboring colonies).

In practice, the image analysis may thus perform any one, any combination, or all of: detect the colony (or colonies) within a respective well; detect a respective type of the colony (or colonies) within a respective well; for a respective type (such as *Salmonella*), determine rank of the colonies for potential extraction (e.g., based on any one, any combination, or all of: type of the respective colony; size of the respective colony; placement of the respective colony within the well (e.g., at least a predetermined distance from a wall of the well); or separation of the respective colony from other colony/colonies, such as a nearest colony). Various one or more icons or the like may indicate a colony, a colony's respective type, or a rank for extraction. As one example, a single icon may indicate a colony, a colony's type, and a colony's rank, such as by selecting the icon to indicate the type (whether selecting the type of icon to indicate the colony is detected as *Salmonella, E-coli* or "unknown" or selecting the color of the icon to indicate the colony is detected as *Salmonella, E-coli* or "unknown") and/or the rank (e.g., including a number along with or on top of the icon indicating the rank).

In one or some embodiments, responsive to outputting the image detecting the colony (or colonies) within a respective well, detecting a respective type of the colony (or colonies) within the respective well and/or for a respective type, determining the rank of the colonies for potential extraction, an operator may manually perform one or both of: control the pipette tip (or the like) in which magnetically and/or mechanically collect the desired colony (or colonies); or manually select a colony or colonies (such as by clicking on a section of the touchscreen at which the colony or colonies are presented), after which the imaging system may automatically control the pipette tip (or the like) to magnetically and/or mechanically collect the select colony (or selected colonies). Alternatively, responsive to the imaging system identifying the colony (or colonies) within the respective well, detecting the respective type of the colony (or colonies) within the respective well and/or for a respective type, the imaging system (or an alternate system in communication with the imaging system) may: automatically select the colony (e.g., in one embodiment, the imaging system may be programmed to select the *Salmonella* colony that is ranked highest) or select the colonies (e.g., in an alternate embodiment, the imaging system may be programmed to automatically select the *Salmonella* colonies that are ranked first and second highest); and automatically control the pipette tip (or the like) to magnetically and/or mechanically collect the select colony (or selected colonies).

Figure 8D:
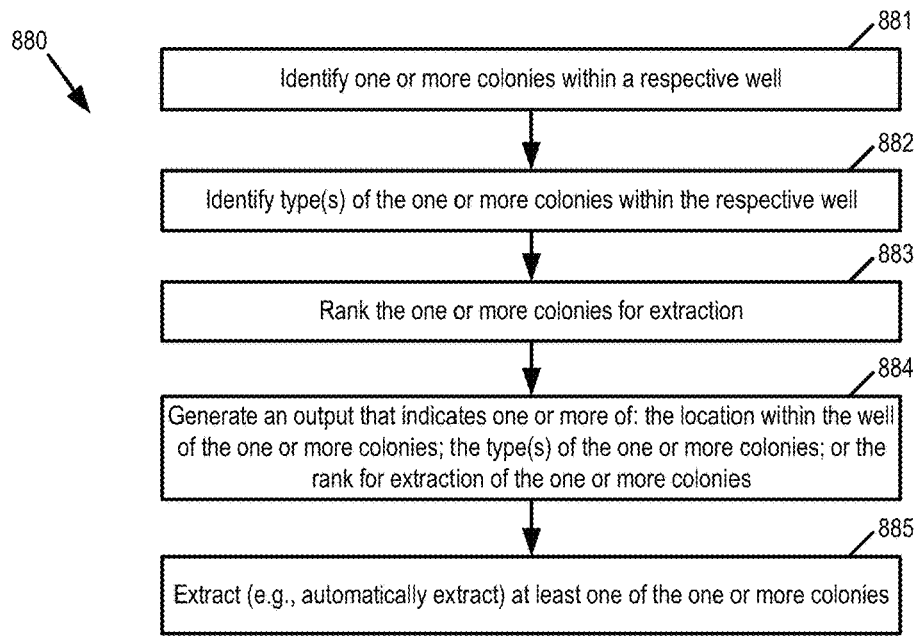
FIG. 8D is a first flow diagram for analyzing and extracting one or more colonies from a respective well.

FIG. 8D is a first flow diagram 880 for automatically analyzing and automatically extracting one or more colonies from a respective well. In particular, any one, any combination, or all of the flow diagram 880 may be performed automatically. At 881, one or more colonies are identified within a respective well. As discussed above, images may be automatically obtained at predetermined intervals, such as at 4 hours, 5 hours, and 6 hours (as illustrated in FIG. 2). The images, obtained in time-lapse, may be analyzed in order to detect the one or more colonies. At 882, the type(s) of the one or more colonies within the respective well may be automatically detected. At 883, some or all of the one or more colonies automatically detected (e.g., as presumptive positive or a preliminary screening for the pathogen(s) sought) may be ranked for extraction. As discussed above, various criteria may be used in order to automatically rank the one or more colonies, such as any one, any combination, or all of: type of the respective colony; size of the respective colony; placement of the respective colony within the well; or separation of the respective colony from other colony/colonies.

At 884, an output may be automatically generated that indicates one or more of: the location within the respective well of the one or more colonies; the type(s) of the one or more colonies; or the rank for extraction of the one or more colonies. At 885, at least one of the colonies in the respective well are extracted, such as manually, at least partly automatically (e.g., an operator may indicate which colony to extract; after which the system may automatically extract the indicated colony), or fully automatically (e.g., the system both automatically selects the colony (or colonies) and automatically extracts the selected colony (or colonies)).

In one or some embodiments, after extraction, the extracted colonies may be automatically placed into another well (which may reside in a different plate entirely or in the same plate). Further, in one or some embodiments, when multiple colonies (e.g., a first colony and a second colony) are automatically extracted within a respective well (such as well B2 in FIG. 9), the multiple colonies may be automatically placed into different respective wells (e.g., the first colony extracted from well B2 may be placed into a first new well and the second colony extracted from well B2 may be placed into a second new well). In practice, the system may automatically track any one, any combination, or all of: the original sample for the respective well (e.g., the original sample placed in well B2); where the respective colonies were extracted from (e.g., from B2); the information regarding the respective colonies (e.g., type, size, etc.); in which new well the extracted colony was thereafter placed; and the subsequent processing performed in the new well.

Figure 8E:
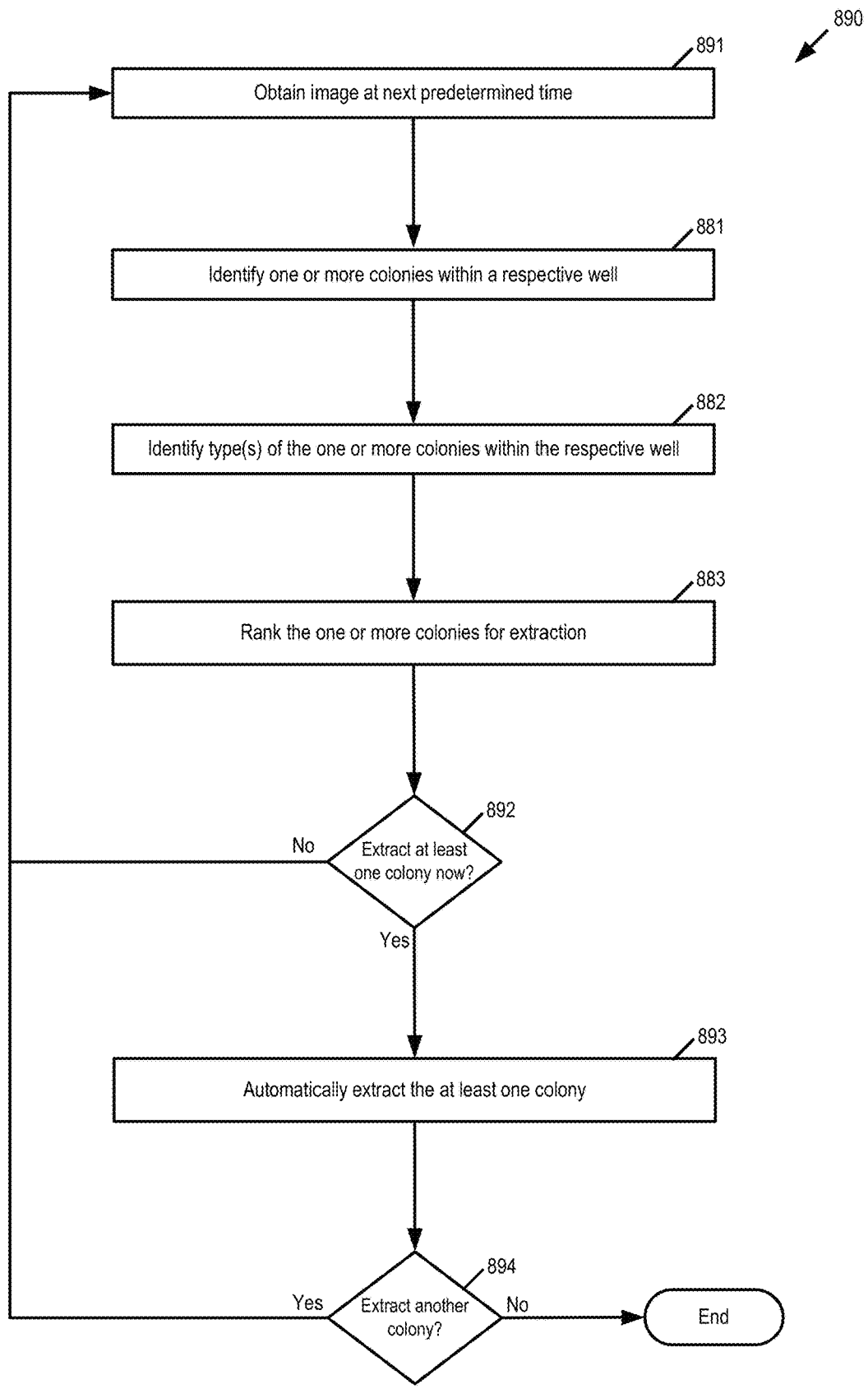
FIG. 8E is a second flow diagram for analyzing and extracting one or more colonies from a respective well.

In one or some embodiments, automatic extraction may occur after a predetermined time (e.g., after incubating for 8 hours). Alternatively, or in addition, automatic extraction may occur based on dynamic analysis of the images obtained. For example, images may be obtained at hours 4, 5, and 6 (see FIG. 2). Rather than wait for the entire 8 hours, after hours 4, or 5, or 6, the analysis may automatically determine whether there are colonies of acceptable criteria (e.g., type, size, position within the well, and/or separation from other colonies) which may trigger automatic extraction. As one example, after the image at hour 5 has been obtained (and optionally the images from one or both of hours 4 and 5 have been analyzed), the analysis may identify at least one colony for immediate extraction (triggering automatic immediate extraction of the identified at least one colony). Moreover, after the image at hour 6 has been obtained (and optionally the images from any one, any combination, or all of hours 4, 5 and 6 have been analyzed), the analysis may identify yet another colony for immediate extraction (triggering automatic immediate extraction of the identified another colony). In this regard, colonies may be automatically extracted from the same respective well at different times (such as picking the colony that best meets the criteria at hour 5 and thereafter picking the colony that best meets the criteria hour 6) so that colonies may be extracted when they have met the criteria (one or both of: after the colony has grown of sufficient size; and/or before the a respective colony has grown too big to be too close to other colonies or to the well wall). Thus, in one or some embodiments, a respective colony may be automatically extracted immediately in real-time upon the one or more criteria being met. This is illustrated in FIG. 8E, which is a second flow diagram 890 for analyzing and extracting one or more colonies from a respective well. Any one, any combination, or all of the flow diagram 890 may be performed automatically. At 891, the image is obtained at the predetermined time, such as the next predetermined time (e.g., hours 4, 5, or 6). After identifying the one or more colonies at 881, detecting the type(s) of the one or more colonies at 883, and ranking the one or more colonies for extraction at 883, it may be determined whether to extract at least one colony now. If not, second flow diagram 890 loops back to 891 to obtain another image at the predetermined time. If so, at 893, the at least one colony is automatically extracted. After which, at 894, it is determined whether to extract another colony. If so, second flow diagram 890 loops back to 891 to obtain another image at the predetermined time. If not, second flow diagram 890 ends.

Figure 9:
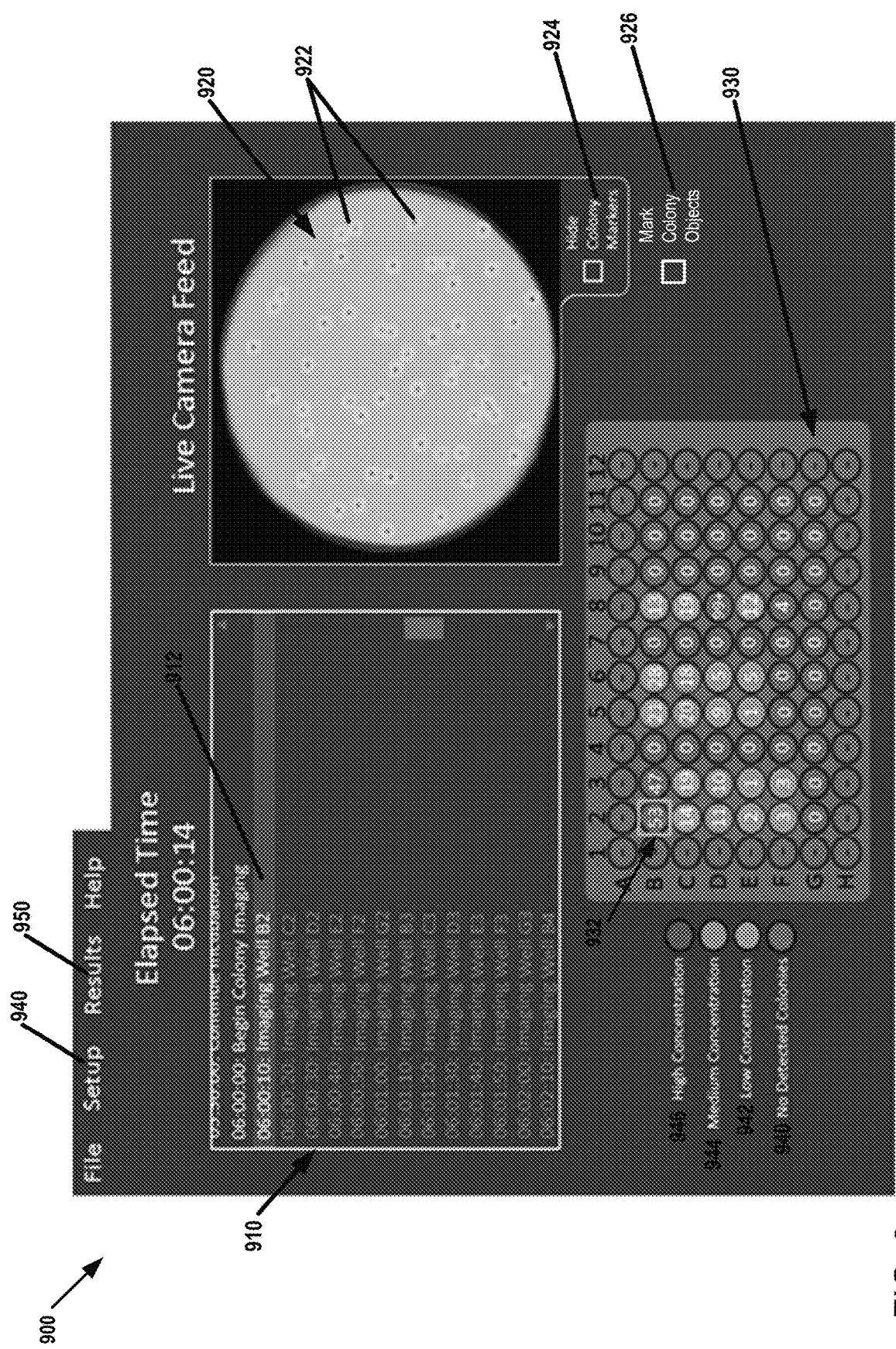
FIG. 9 is a representation of a user interface.

FIG. 9 is a representation 900 of a user interface, such as a single user interface. In one or some embodiments, the user interface may indicate any one, any combination, or all of: the progress of the protocol (see section 910, indicating the protocol status); the live camera feed that shows the latest image of the well of interest (see section 920); and the colony count for each of the wells (see section 930). In the representation 900 of FIG. 9, the system is configured to screen 60 wells on a 96-well plate (see matrix of wells B-G and 2-11). At 6 hours and 10 seconds in the protocol (see section 910 highlighted by 912), the camera is imaging B2 well, which is also indicated by the square 932 around well B2 in section 930 of the user interface. The numbers on each well indicate the latest colony count in that well. For example, well B2 has a current count of 53, which is indicative of a high concentration. Thus, in addition to (or instead of) the latest colony count, the well may have an associated color (or other indicator). As shown in representation 900, the colors 940, 942, 944, 946 correspond to no detected colonies, low concentration, medium concentration, and high concentration, respectively. As such, in one image, the operator may survey the concentrations in the various wells in section 930.

The image captured by the camera is displayed in the Live Camera Feed window in section 920 with presumptive colonies marked, as shown by colony markers 922. Users have the options to hide or mark (default) the objects detected on the live camera feed, or click another well to view the time-lapse images and marked colonies of the selected well. This is illustrated on representation 900 at 924

(which enables the operator to hide the colony markers 924) and at 926 (which enables the operator to click, such as via a mouse, on the section 920 to mark colony objects within section 920).

In one or some embodiments, the count(s) in section 930 may be updated in real-time as more images are obtained and/or may be finalized once the protocol has finished. In one or some embodiments, the results of colony count and the time-lapse images of all wells may be saved in a memory and accessible to authorized users from any internet-connected computer or mobile device.

Thus, a display may output representation 900, which may enable an operator to view the live camera feed in section 920. In one or some embodiments, section 930 may provide a representation of each of the wells in the multi-well plate (such as 96 wells as show by a 12×8 matrix). Further, in one or some embodiments, a user may provide input (such as by clicking via a mouse on a display or touching a touchscreen) to indicate a selection of one of the wells, such as well B2 (which has square 932 around it). Responsive to selecting a particular well (such as B2), section 920 may be updated to provide a live camera feed of the selected particular well. Alternatively, or in addition, responsive to selecting a particular well (such as B2), section 920 may be updated to provide a time-lapsed image (e.g., a type of animation) of the selected particular well (e.g., a sequence of images from hours 4, 5, 6, etc. indicating the growth of a colony or colonies with the selected particular well. Thus, in one embodiment, the section 920 may include a live camera feed. Alternatively, or in addition, section 920 may output the sequence of images captured during incubation. In either instance, the user interface, such as the touchscreen, may allow the operator to input which one or both of the options to present in section 920.

The 'Setup' menu, shown at 940, may allow the operators to perform any one, any combination, or all of: edit a protocol; set up hardware parameters (e.g., well plate type and/or well loadout), or set up software parameters (e.g., protocol run time and/or start running a protocol). The 'Results' menu, shown at 950, allows the operators to access the latest and/or final colony counts and the time lapse images (with colonies marked or hidden). In one or some embodiments, the results may be automatically available to operators from any authorized computer or mobile device.

As discussed above, the machine may guide the user through the process, such as via a display similar to or the same as illustrated in FIG. 9. In one or some embodiments, the display may guide the user to perform any one, any combination, or all of the following: (1) adding samples into the wells (e.g., add 96 samples into a 96-well plate); (2) add antibody-conjugated beads to the wells (after which the user should click a button to indicate the process is complete so that the machine may set a timer, such as a 15-minute timer, for completion of the bead binding); (3) perform the immunomagnetic separation (either manually or automatically) after the predetermined time period for completion of the bead binding; (4) indicate to the user to prepare the agar (e.g., heat the agar); (5) indicate to the user to load the prepared agar into the machine; (6) load the pipette tip; and (7) confirm that the procedures have been completed for the machine to incubate/perform image analysis. Again, any of the following above steps, such as the bead-binding, the immunomagnetic separation, or the plating may be performed on a separation machine.

Figure 10A:
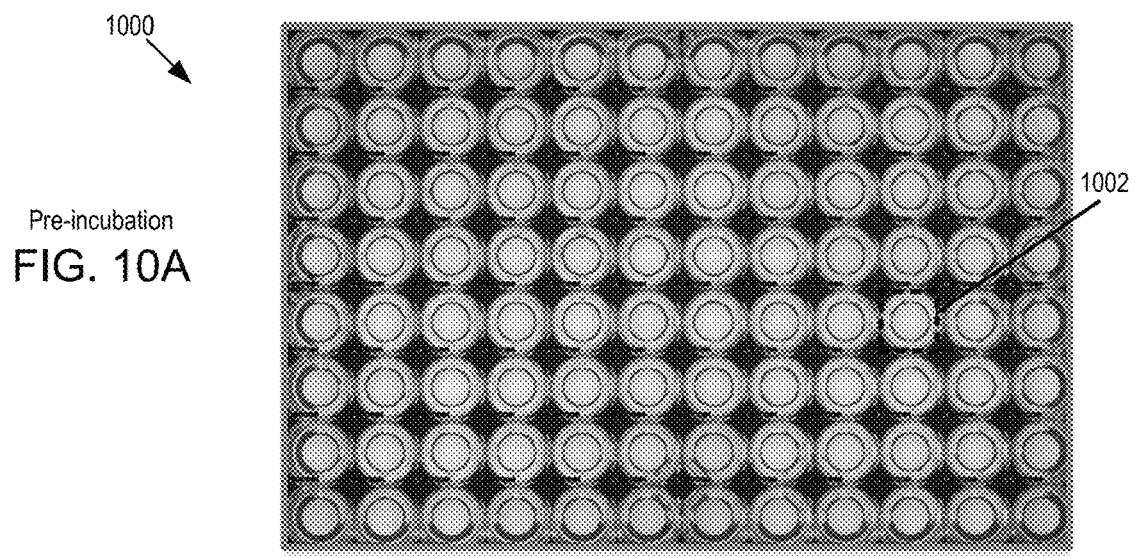
FIGS. 10A-C are images of a 96-well plate when incubated at 0 hours (FIG. 10A), 4 hours (FIG. 10B), and 12 hours (FIG. 10C).
Figure 10B:
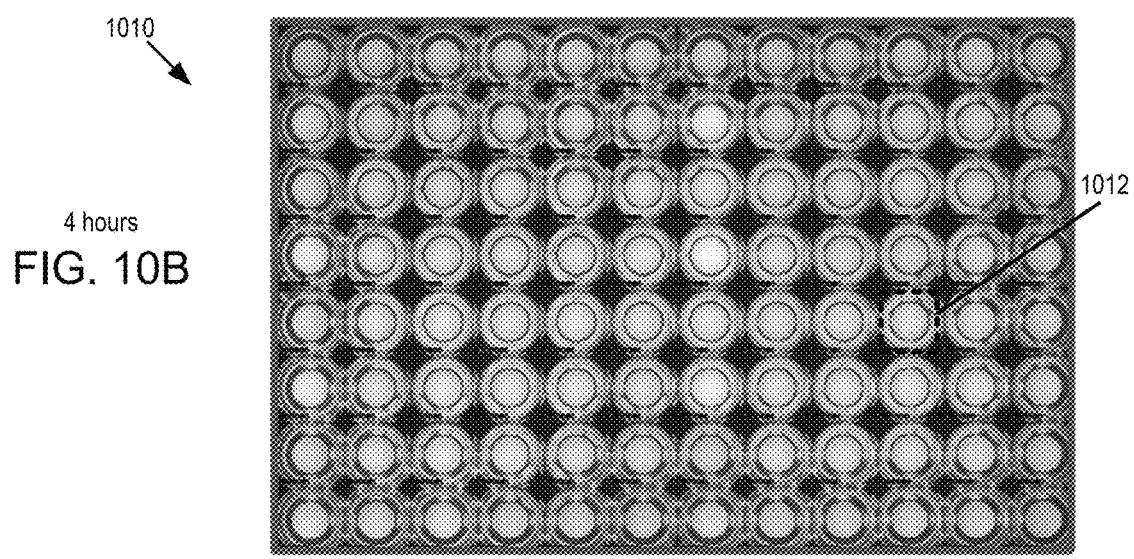
Figure 10C:
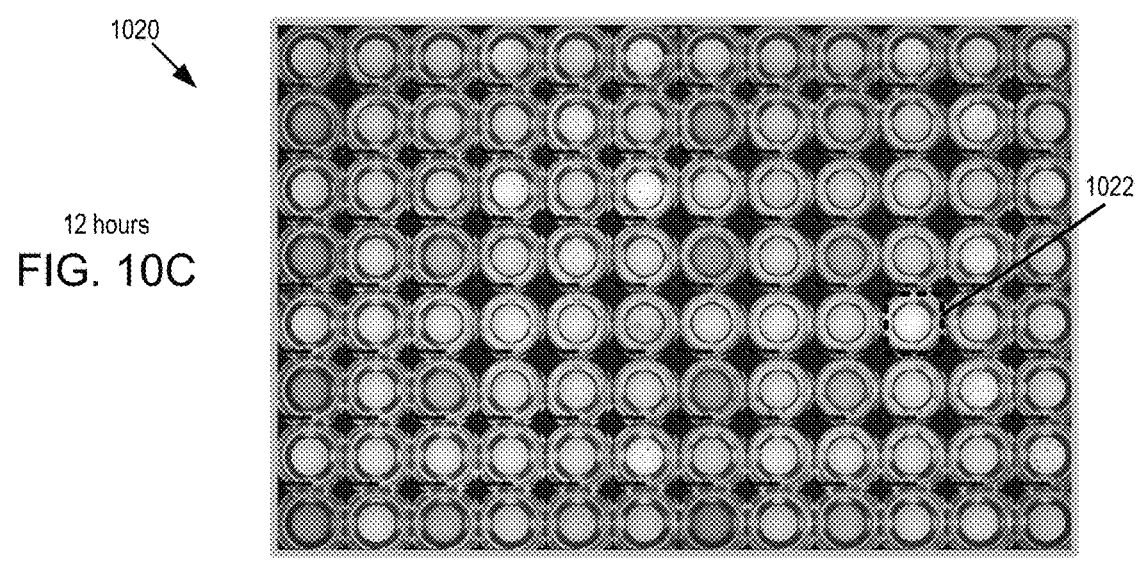

FIGS. 10A-C are images 1000, 1010, 1020 of a 96-well plate when incubated at 0 hours (FIG. 10A), 4 hours (FIG. 10B), and 12 hours (FIG. 10C). As background, various tests may be performed. For example, one or more types of *Salmonella* may be tested for. In particular, FIGS. 10A-C are directed to serially diluted S. *Typhimurium* (ATCC 43971) culture added into a 96 well plate ("sample" plate) in a checkerboard pattern, and mixed with antibody conjugated magnetic beads. In practice, S. *Typhimurium* (ATCC 43971) culture may be serially diluted, such as 10-fold serially diluted, and added into a 96 well "sample" plate in a checkerboard pattern: the primary dilution may be in columns 1, then diluted to column 3 ($10^{-1}$), column 5 ($10^{-2}$), column 6 ($10^{-3}$), column 4 ($10^{-4}$) and column 2 ($10^{-5}$); the right half plate as a replicate of the left half (e.g., columns 7 ($10^{0}$), column 9 ($10^{-1}$), column 11 ($10^{-2}$), column 12 ($10^{-3}$), column 10 ($10^{-4}$) and column 8 ($10^{-5}$). The "sample" plate may then be loaded into the apparatus (such as illustrated in FIG. 4B) with other consumables to begin the protocol. Before and during the 12-hour incubation, the apparatus may obtain an image of each well every hour (e.g., FIG. 10A at 0 hours; FIG. 10B at 4 hours; FIG. 10C at 12 hours). For example, a total of 1248 images (each of the 96 wells in the well plate, thirteen times at 0 hours to 12 hours) may be obtained. Yellow/pink colonies with black center grow in most *Salmonella*-spiked wells, except some of the highest diluted samples in column 2 and 8, as shown in FIGS. 10B-C. Colony growth and color change in wells are captured by the time-lapse images, with no cross contamination (e.g., false positive) being shown.

After incubation, the coordinates of isolated colonies in each well may be reported by the software on the apparatus to control the robot arm and pipette to pick target colonies and transfer each colony into a well in a standard 96-well plate ("output plate"). For example, it is noted that the color change in high-concentration wells (e.g., B1, B7) from light brown/pink (pre-incubation) to yellow (6 hours) to red (12 hours): XLD agar has a pH of approximately 7.4 with a bright pink or red appearance due to the indicator phenol red; sugar fermentation lowers the pH and the phenol red indicator registers this by changing to yellow; after exhausting the xylose supply *Salmonella* colonies will decarboxylate lysine, increasing the pH once again to alkaline with the phenol red indicator registers changing to red. In practice, the apparatus may analyze the images in order to identify the various aspects of the images, such as the colors in the images, in order to identify one or more aspects of the images. Post-picking images may be obtained by the apparatus. Further, the picked colonies in the "output" plate may be streaked onto XLD agar petri dishes for validation.

FIG. 10D are time lapse images of well E10 (highlighted as 1002, 1012, 1022 in FIGS. 10A-C, respectively) from the 96-well plate depicted in FIGS. 10A-C when incubated for 6-12 hours and after picking two colonies after 12 hour incubation, with image at hour 6 (1030); image at hour 7 (1031); image at hour 8 (1032); image at hour 9 (1033); image at hour 10 (1034); image at hour 11 (1035); and image at hour 12 (1036). Further, image (1037) is after picking a first colony 1043 and image (1038) is after picking a second colony (1041).

As discussed above, the wells may be cultured, such as by using agar, over the course of several hours. By obtaining images periodically over the course of the wells being cultured, the image processing analysis may perform any one, any combination, or all of: (i) determining which colonies are growing and/or which colonies are not (e.g., for purposes of any one, any combination, or all of detection, enumeration, or extraction); (ii) determining one or more aspects of the colonies (such as one or more aspects of the colonies that are growing, including any one, any combination, or all of: (A) growth rate of a respective colony; (B) size of the respective colony; (C) color of the respective colony; (D) shape of the respective colony; or (E) pattern of the respective colony)); (iii) enumerating the colonies in the respective well; or (iv) determining when to remove a colony from the respective well. As shown in FIG. 10D, colonies 1040, 1041, 1042, 1043 are identified and are shown as growing over the culturing period. Further, either during culturing and/or after culturing, one or more of the identified colonies 1040, 1041, 1042, 1043 may be removed. This is illustrated in images 1037, 1038 in which colonies 1043, 1041 (respectively) are removed from the well. Separate from (or in addition to) extraction, the number of colonies in the respective well may be tallied for purposes of enumeration. For example, based on identified growth of the colonies and/or morphological features, the colonies may be identified as being of interest for purposes of enumeration (as shown in FIG. 10D, there are a total of four colonies 1040, 1041, 1042, 1043).

FIG. 10E are time lapse images 1050, 1052, 1054, 1056, 1058, 1060 of well B11 from the 96-well plate depicted in FIGS. 10A-C, with FIG. 10F being a zoom-in of the area of interest 1051, 1053, 1055, 1057, 1059, 1061 depicted in FIG. 10E. In one or some embodiments, part (or all) of the images of the wells may be analyzed. For example, in one or some embodiments, the images of the wells may be divided into subparts, such as the zoom-in of the area of interest 1051, 1053, 1055, 1057, 1059, 1061, for analysis. Alternatively, the entirety of the image of the wells may be analyzed without being subdivided. As discussed above, the analysis of the image(s) of the wells may be for any one, any combination, or all of: detection of the target cell; enumeration of the target cell; or extraction of the target cell.

Within FIG. 10F, regions 1070, 1071, 1072, 1073, 1074, 1075, 1076, 1077, 1078, 1079, 1080 are identified for further analysis, such as depicted in FIG. 10G. In particular, FIG. 10G depicts post processing analysis of the regions 1070, 1071, 1072, 1073, 1074, 1075, 1076, 1077, 1078, 1079, 1080 in the images depicted in FIG. 10F illustrating how the automated system and method detects and enumerates colonies (e.g., *Salmonella* colonies). For example, in 1081, the analysis identifies a colony in region 1070. In 1082, the analysis identifies 5 separate colonies (including colonies 1087, 1088) in region 1071. In 1083, the analysis identifies that two of the colonies (identified as colonies 1087, 1088 in 1082) have merged, as indicated by the "2" at 1089. In 1084, the analysis identifies that three of the colonies (identified as colonies 1087, 1088, 1090 in 1082, 1083) have merged, as indicated by the "3" at 1091. At 1085, the analysis identifies that three of the colonies (identified in 1084) have remained as three merged colonies, as indicated by the "3" at 1091, and identifies that two of the colonies (identified as colonies 1092, 1093 in 1084) have merged, as indicated by the "2" at 1094. Finally, at 1086, the analysis identifies that five of the colonies (identified as 1087, 1088, 1090, 1092, 1093) have merged, as indicated by the "5" at 1095. In this regard, the analysis may track the number of colonies as culturing is performed (even if colonies have merged) so that an accurate number of the colonies in a respective well may be tabulated. Further, separate from identifying and enumerating the colonies, the system may extract one or more colonies from the wells (such as prior to discrete colonies merging). For example, prior to colonies 1087, 1088 merging, one or both of colonies 1087, 1088 may be extracted from the well.

In one or some embodiments, the agar used to culture the samples may comprise selective agar, which may be configured to only culture a select biological organism, such as only *Salmonella* or a specific type of *Salmonella*. In this regard, the selective agar may be used as another way (e.g., separate from IMS, centrifugation, etc.) in which to be selective as to the microorganism on which to focus. Alternatively, or in addition, the agar may comprise chromogenic agar, which may comprise a chromogenic substrate that is utilized by the microorganisms to give colored colonies specific for each microorganism and which may thus change the color of the microorganism. In this regard, depending on the color of the result, the presence or absence of the target organism may be determined by the image analysis for differentiation with other microorganisms.

Figure 11:
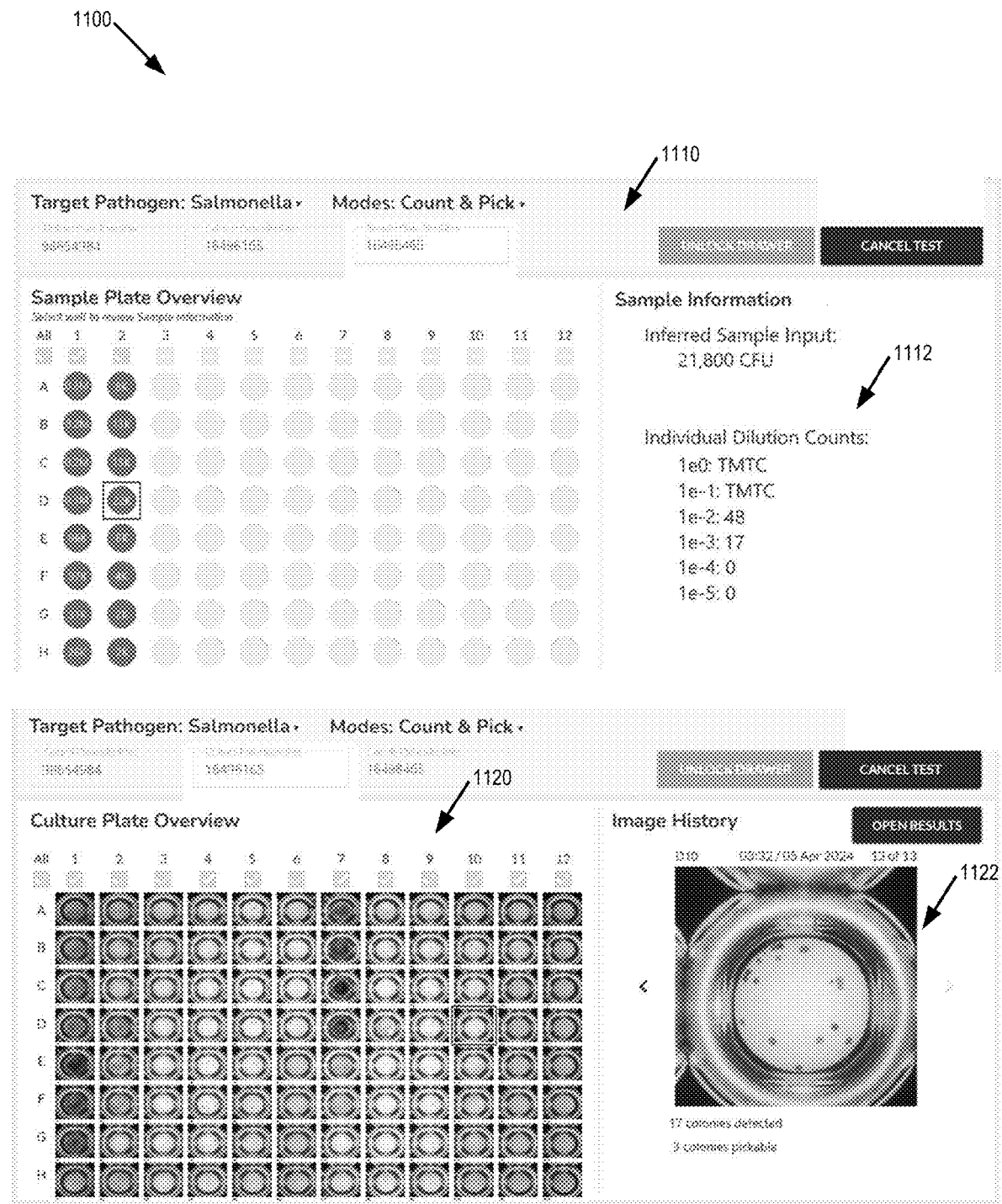
FIG. 11 is an illustration of a user interface for the system.

FIG. 11 is an illustration of a user interface 1100 for the system. The user interface 1100 illustrates the number of colonies identified.

One or more target pathogens and/or one or more protocol modes may be selected in a dropdown menu in the user interface 1100. In particular, portion 1110 of user interface 1100 illustrates a Sample Plate overview showing the inferred colony forming units (CFU) counts in each of the 16 samples passed through the Count & Pick version of the protocol. Each sample well may be clicked to view Sample Information at 1112. Portion 1120 of user interface 1100 illustrates the Culture Plate overview, which shows images of the individual dilutions of the original samples as they are grown in the culture plate. Each dilution well may be clicked to view the image history for that well (see 1120), giving the user access to the time-lapse images of that well.

Figure 12:
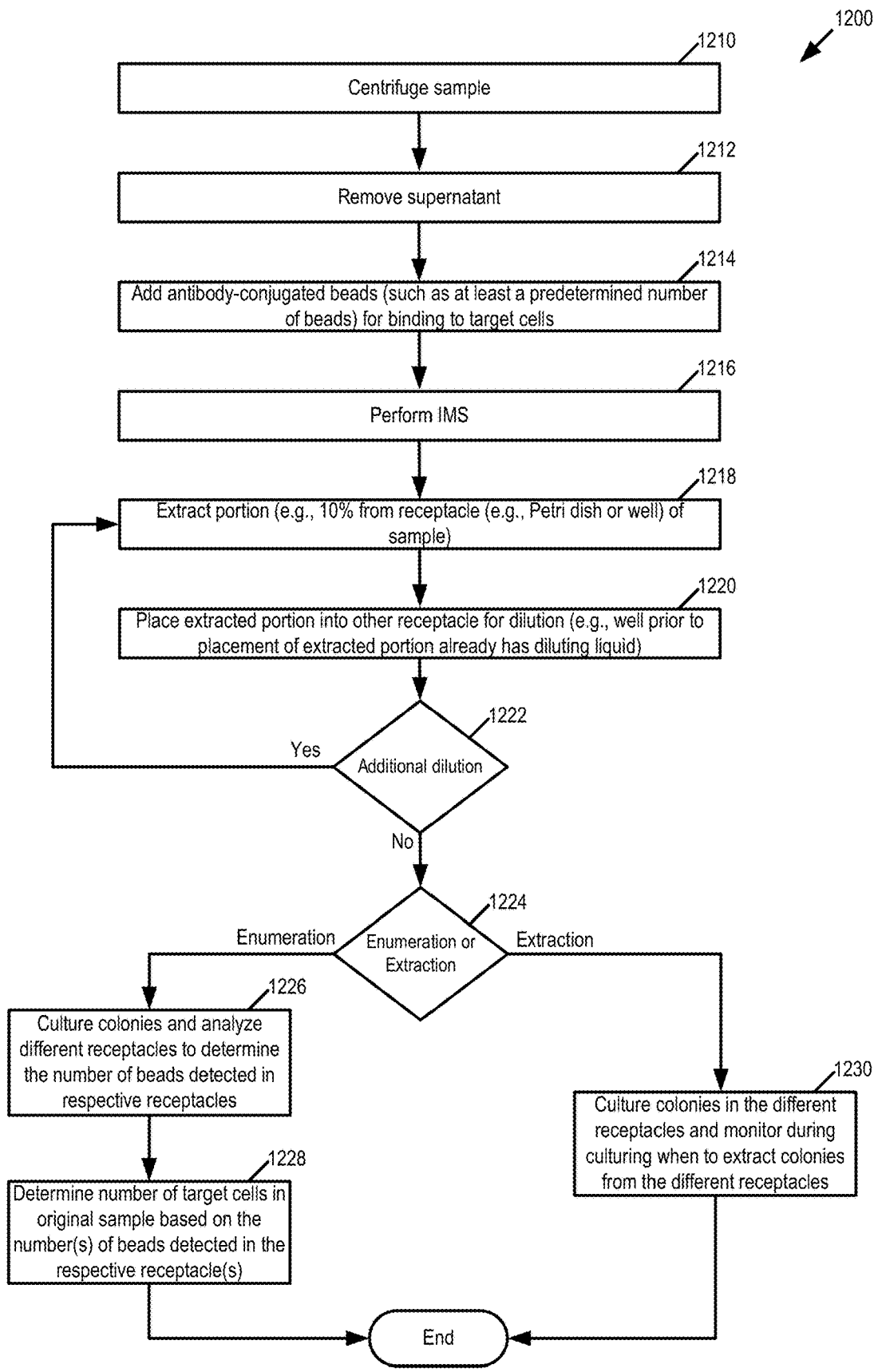
FIG. 12 is a flow chart to perform one or both of enumeration or extraction.

FIG. 12 is a flow chart 1200 to perform one or both of enumeration or extraction. At 1210, the sample may be centrifuged in order to segment the heavier and/or larger particles within the sample from the lighter and/or smaller particles. After which, at 1212, the supernatant may be removed. Merely by way of example, the sample may be on the order of 100 milliliters and may be centrifuged. After removing the supernatant, 100 microliters may remain, which may then be put into a respective well (e.g., a well within a "sample" well plate).

After which, at 1214, antibody-conjugated beads (such as a predetermined number of beads) may be added to the respective well in order for the beads to bind to the target cells, thereby creating bead-conjugated target cells (e.g., bead-bound target cells). At 1216, IMS may be performed. Various types of IMS are contemplated. As one example, a magnetic field may be applied to the well in order to use the magnetic properties of the bead-conjugated target cells to separate the bead-conjugated target cells. In particular, the magnetic field may be applied to a portion of the well (e.g., the side of the well), thereby attracting the bead-conjugated target cells and the free beads (unbound beads), with supernatant being removed from the other portion of the well (e.g., the other side of the well). After which, buffer may be added. In one or some embodiments, this process of IMS may be performed once, or may be repeated multiple times. In this regard, in one or some embodiments, supernatant may be performed at one or more stages, such as after centrifugation and/or during IMS.

After performing IMS, dilution may be performed. In particular, at 1218, a portion may be extracted from the sample. At 1220, the extracted portion may be placed into another receptacle (e.g., another Petri dish or another well) for dilution. For example, 10% of the sample (which may comprise 100 microliters) may be extracted from the receptacle (e.g., the Petri dish or well) holding the sample. The 10 microliters may then be placed in another receptacle (e.g., another Petri dish or another well) for dilution (e.g., placed in a well that already has 90 microliters of buffer or placed in a well, after which 90 microliters of buffer is added). Optionally, the diluted sample may be mixed (e.g., a pipette tip, via robot control, may be inserted into the respective well to mix the diluted sample). At 1222, it is determined whether additional dilution is to be performed. If so, flow chart 1200 loops back to 1218. If not, flow chart 1200 proceeds to 1224. By way of example, an original sample may be in well #1, with the portion extracted from well #1 and placed into well #2 (with additional buffer). If additional dilution is performed, the next portion to be extracted may be extracted from well #2, and then placed into well #3. This process may be iteratively performed a predetermined number of times as discussed above.

After dilution, one or both of enumeration or extraction may be performed. In this regard, at 1224, it is determined whether enumeration or extraction is to be performed. It is noted, however, that only one of enumeration or extraction may be performed, or both of enumeration or extraction may be performed. If enumeration is to be performed, at 1226, the colonies are cultured and the different receptacles (e.g., wells or Petri dishes) are analyzed to determine the number of beads detected in the respective receptacles. At 1228, the system determines the number of target cells in the original sample based on the number(s) of beads detected in the respective receptacles. If enumeration is to be performed, at 1230, the colonies are cultured in the different receptacles and the culturing is monitored to determine when to extract the colonies from the different receptacles (e.g., when a respective colony is large enough for extraction and/or prior to merging with another colony).

As discussed above, dilution may be performed in order to ensure that one or more wells are within the dynamic range of enumeration. In the particular example of 1,000 target cells in the original sample, there are, ideally, 1,000 bindings to created 1,000 bead-conjugated target cells. In performing 10% dilution iteratively, the ideal distribution of the bead-conjugated target cells in the respective wells is as follows: 900 in well #1; 90 in well #2; 9 in well #3; 1 in well #4; 0 in well #5; and 0 in well #6. So that, in the ideal, wells #2, #3 and #4 are within the dynamic range of 1 to 200. However, the actual numbers of the bead-conjugated target cells in the respective wells may deviate from the ideal (being fewer or greater numbers of bead-conjugated target cells than ideal). Nevertheless, identifying the numbers of bead-conjugated target cells within the respective wells may be used to estimate the number of target cells in the original sample. Merely by way of example, the number of bead-conjugated target cells in well #2 may be in the range of 70-110, in well #3 may be in the range of 7-11, in well #4 may be in the range of 0-2, etc. Even with deviations from ideal, the system may estimate the number of target cells in the original sample based on determining the numbers of bead-conjugated target cells in one, some, or all of the wells. In one or some embodiments, the system may only base its estimate of the number of target cells in the original sample based on a respective well with the highest number of detected bead-conjugated target cells and based on the amount of dilution for the respective well. In the given example, the system may base its estimate only on the number of detected bead-conjugated target cells from well #2 (e.g., given that the dilution of well #2 is 10% of the original sample, the number of detected bead-conjugated target cells from cell #2=100, then the system correlates this to 1,000 target cells in the original sample; the number of detected bead-conjugated target cells from cell #2=150, then the system correlates this to 1,500 target cells in the original sample). Alternatively, the system may base its estimate of the number of target cells in the original sample based on multiple numbers of detected bead-conjugated target cells from different wells. For example, the system may base its estimate on the number of detected bead-conjugated target cells from wells #2, #3, and #4. However, due to deviations from ideal being more pronounced the lower the number of detected bead-bound conjugated target cells, the system may weight the higher numbers of detected bead-bound conjugated target cells greater (e.g., weight the number of detected bead-conjugated target cells from cell #2 highest, weight the number of detected bead-conjugated target cells from cell #3 second highest, and weight the number of detected bead-conjugated target cells from cell #4 lowest).

As discussed above, the system may comprise an automated system. As such, in one or some embodiments, computer functionality may be configured as the automated system. One example of computer functionality is disclosed in FIG. 13, which is a general computer system 1300, programmable to be a specific computer system, which may represent any of the computing devices referenced herein, such as the wristband, the stationary controller, or the back-end. The computer system 1300 may include an ordered listing of a set of instructions 1302 that may be executed to cause the computer system 1300 to perform any one or more of the methods or computer-based functions disclosed herein. The computer system 1300 can operate as a stand-alone device or can be connected, e.g., using the communications network 1345, to other computer systems or peripheral devices.

In a networked deployment, the computer system 1300 can operate in the capacity of a server or as a client-user computer in a server-client user network environment, or as a peer computer system in a peer-to-peer (or distributed) network environment. The computer system 1300 can also be implemented as or incorporated into various devices, such as a personal computer or a mobile computing device capable of executing a set of instructions 1302 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 1300 can include a memory 1304 on a bus 1320 for communicating information. Code operable to cause the computer system to perform any of the acts or operations described herein can be stored in the memory 1304. The memory 1304 can be a random-access memory, read-only memory, programmable memory, hard disk drive or any other type of volatile or non-volatile memory or storage device.

The computer system 1300 can include a processor 1308, such as a central processing unit (CPU) and/or a graphics processing unit (GPU). In one implementation, one example of a processor is a controller. Further, one example of a controller is a microcontroller. The processor 1308 can include one or more general processors, digital signal processors, application specific integrated circuits, field programmable gate arrays, digital circuits, optical circuits, analog circuits, combinations thereof, or other now known or later-developed devices for analyzing and processing data. The processor 1308 can implement the set of instructions 1302 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 1300 can also include a disk or optical drive unit 1315. The disk drive unit 1315 can include a computer-readable medium 1340 in which one or more sets of instructions 1302, e.g., software, can be embedded. Further, the instructions 1302 can perform one or more of the operations as described herein. The instructions 1302 can reside completely, or at least partially, within the memory 1304 or within the processor 1308 during execution by the computer system 1300.

The memory 1304 and the processor 1308 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 1300 can include an input device 1325, such as a keyboard or mouse, configured for a user to interact with any of the components of the computer system 1300. It can further include a display 1370, such as a liquid crystal display (LCD), a cathode ray tube (CRT), or any other display suitable for conveying information. The display 1370 can act as an interface for the user to see the functioning of the processor 1308, or specifically as an interface with the software stored in the memory 1304 or the disk drive unit 1315. For example, the system may include an intuitive user-friendly interface on display 1370 that assists the operator.

The computer system 1300 can include a communication interface 1336 that enables communications via the communications network 1345. The communications network 1345 can include wired networks, wireless networks, or combinations thereof. The communication interface 1336 network can enable communications via any number of communication standards, such as 802.11, 802.17, 802.20, WiMAX, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including FIGS. 4A, 5, and 6A, may be implemented using the computer functionality disclosed in FIG. 13. Further, the flow diagrams illustrated in FIGS. 6B, 7A-D, 8A-E, and 12 may use computer readable instructions that are executed by one or more processors in order to implement the functionality disclosed. In addition, the sequences illustrated (such as in FIGS. 1C-D, 2B and 3A-L) and the display (such as in FIGS. 9 and 12) may be controlled, such as automatically controlled by the computing functionality disclosed in FIG. 13. Finally, the hardware disclosed in FIG. 4B may be controlled by the computing functionality disclosed in FIG. 13.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively, or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively, or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The following example embodiments of the invention are also disclosed:

Embodiment 1

A method for detecting, enumerating, or extracting of one or more colonies of microorganisms from a sample, the method comprising:
after performing immunomagnetic separation in order to separate one or more bead-bound cells and the one or more bead-bound cells are plated, incubating the one or more bead-bound cells in order to generate one or more colonies formed by the one or more bead-bound cells; and
performing one or more of detecting, enumerating, or extracting the one or more colonies formed by the one or more bead-bound cells.

Embodiment 2

The method of embodiment 1:
wherein plating the one or more bead-bound cells is by combining the one or more bead-bound cells with an immobilizing agent configured to culture the one or more colonies; and
wherein performing the one or more of detecting, enumerating, or extracting is using the one or more colonies that have been cultured using the immobilizing agent.

Embodiment 3

The method of embodiments 1 or 2:
wherein combining the one or more bead-bound cells with the immobilizing agent comprises performing at least one of streaking, spreading, or pouring the one or more bead-bound cells onto the immobilizing agent.

Embodiment 4

The method of any of embodiments 1-3:
wherein combining the one or more bead-bound cells comprises placing the one or more bead-bound cells onto a surface of agar or an agar mixture, wherein the surface of the agar or the agar mixture is sufficiently solid such that the one or more bead-bound cells sit on the surface without the one or more bead-bound cells fully penetrating the surface so that the one or more bead-bound cells are not immersed within the agar or the agar mixture.

Embodiment 5

The method of any of embodiments 1-4:
wherein the immunomagnetic separation is performed in a first well; and
wherein the plating is performed in a second well.

Embodiment 6

The method of any of embodiments 1-5:
wherein free beads are used to bind with target cells in order to generate the one or more bead-bound cells;
wherein at least some of the free beads are unbound to any of the target cells; and
wherein part or all of the free beads that are unbound are not removed after immunomagnetic separation or after culturing of the one or more colonies.

Embodiment 7

The method of any of embodiments 1-6:
further comprising, after the immunomagnetic separation and prior to incubating, diluting the sample into a plurality of separate wells; and
performing enumerating based on image analysis while incubating to count the one or more colonies in the plurality of separate wells.

Embodiment 8

The method of any of embodiments 1-7:
wherein enumerating is performed at different times during incubation in order to count the one or more colonies in the plurality of separate wells so that separate colonies are counted separately prior to merging during incubation.

Embodiment 9

The method of any of embodiments 1-8:
wherein plating the one or more bead-bound cells comprises adding immobilizing agent onto the one or more bead-bound cells, wherein the immobilizing agent added onto the one or more bead-bound cells is at least partly fluid or at least partly liquid.

Embodiment 10

The method of any of embodiments 1-9:
wherein the one or more bead-bound cells are within a well;
wherein a magnetic field is applied to at least a part of the well at least partly while the immobilizing agent solidifies in order to attract the one or more bead-bound cells to a predetermined section of the well and to immobilize the one or more bead-bound cells at the predetermined section of the well at least partly as the immobilizing agent solidifies.

Embodiment 11

The method of any of embodiments 1-10:
wherein the immunomagnetic separation is performed in a first well; and
wherein the plating is performed in a second well by:
  first placing the one or more bead-bound cells onto a surface of an agar or an agar mixture, wherein the surface of the agar or the agar mixture is sufficiently solid such that the one or more bead-bound cells sits on the surface without the one or more bead-bound cells fully penetrating the surface; and
  thereafter adding the immobilizing agent onto the one or more bead-bound cells, wherein the immobilizing agent added onto the one or more bead-bound cells is at least partly fluid or at least partly liquid, wherein the magnetic field is applied to at least a part of the second well at least partly while the immobilizing agent solidifies in order to attract the one or more bead-bound cells to a predetermined section of the second well and to immobilize the one or more bead-bound cells at the predetermined section of the second well.

Embodiment 12

The method of any of embodiments 1-11:
wherein the immunomagnetic separation is performed in a first well; and
wherein after the immunomagnetic separation is performed in the first well, the plating is also performed in the first well by:
  after supernatant has been removed from the first well, adding the immobilizing agent into the first well and onto the one or more bead-bound cells, wherein the immobilizing agent added onto the one or more bead-bound cells is at least partly fluid or at least partly liquid and wherein the magnetic field is applied to at least a part of the first well at least partly while the immobilizing agent solidifies in order to attract the one or more bead-bound cells to a predetermined section of the first well and to immobilize the one or more bead-bound cells at the predetermined section of the first well.

Embodiment 13

The method of any of embodiments 1-12:
wherein at least one of plating or applying a magnetic field results in the one or more bead-bound cells being in a predetermined section.

Embodiment 14

The method of any of embodiments 1-13:
wherein plating of the one or more bead-bound cells onto agar or an agar mixture of sufficient solidity results in the one or more bead-bound cells being in the predetermined section.

Embodiment 15

The method of any of embodiments 1-14:
wherein the magnetic field is added to at least a part of a well containing the one or more bead-bound cells at least partly while an immobilizing agent added to the well solidifies in order to attract the one or more bead-bound cells to the predetermined section and to immobilize the one or more bead-bound cells at the predetermined section.

Embodiment 16

The method of any of embodiments 1-15:
wherein applying the magnetic field comprises applying a substantially evenly distributed magnetic field across an area is the predetermined section in order to distribute a plurality of the bead-bound cells in the predetermined section.

Embodiment 17

The method of any of embodiments 1-16:
wherein, during or after applying the substantially evenly distributed magnetic field across the area, counting or enumerating to determine a number of colonies in at least a part of the area.

Embodiment 18

The method of any of embodiments 1-17:
wherein applying the magnetic field comprises applying a focused magnetic field at a center of well in the predetermined section in order to attract a plurality of the bead-bound cells to the center of the well.

Embodiment 19

The method of any of embodiments 1-18:
wherein, during or after applying the focused magnetic field across at the center of the well, detecting whether there are any colonies at the center of the well.

Embodiment 20

The method of any of embodiments 1-19:
further comprising determining a type of colony for at least one colony from the one or more colonies.

Embodiment 21

The method of any of embodiments 1-20:
wherein the type of colony of the at least one colony is determined based on one or more of: a size of the at least one colony; a growth rate of the at least one colony; a color of the at least one colony; or a morphology of the at least one colony.

Embodiment 22

The method of any of embodiments 1-21:
wherein a respective well includes a plurality of detected colonies; and
further comprising analyzing one or more aspects of the plurality of detected colonies in order to automatically determine which of the plurality of detected colonies to extract.

Embodiment 23

The method of any of embodiments 1-22:
wherein automatically determining which of the plurality of detected colonies to extract is based on one or more of: a type of a respective colony; a size of the respective colony; a placement of the respective colony within a respective well; or separation of the respective colony from a nearest colony; and
further comprising at least partly automatically extracting at least one colony from the respective well based on the automatic determination of which of the plurality of detected colonies to extract.

Embodiment 24

The method of any of embodiments 1-23:
wherein images of the respective well are obtained at predetermined times during incubation; and
wherein, responsive to obtaining an image at one of the predetermined times during incubation, automatically performing:
determining whether to extract at least one colony from the plurality of detected colonies; and
responsive to determining to extract the at least one colony, automatically extracting the at least one colony from the respective well.

Embodiment 25

The method of any of embodiments 1-24:
further comprising removing the one or more colonies from a well in order to perform additional analysis on the one or more colonies.

Embodiment 26

The method of any of embodiments 1-25:
wherein the additional analysis comprises matrix-assisted laser desorption/ionization-time of flight (MALDI-TOF) mass spectrometry.

Embodiment 26

At least one apparatus configured for isolation and detecting, enumerating, or extracting of one or more colonies of microorganisms from a sample, the at least one apparatus comprising:
at least one receptacle configured to incubate one or more bead-bound cells in order to generate one or more colonies formed by the one or more bead-bound cells, the one or more bead-bound cells being formed by immunomagnetic separation;
at least one imaging sensor; and
at least one processor in communication with the at least one imaging sensor, the at least one processor configured to:
perform at least one of detecting, enumerating, or extracting the one or more colonies formed by the one or more bead-bound cells.

Embodiment 28

The apparatus of embodiment 27:
wherein the at least one receptacle comprises at least one multi-well plate;
further comprising at least one heater and at least one robot; and
wherein the at least one processor is further configured to:
combine, using the at least one robot, the one or more bead-bound cells with an immobilizing agent in the at least one multi-well plate; and
generate, using the at least one heater, the one or more colonies; and
wherein the at least one processor is configured to perform the at least one of detecting, enumerating, or extracting using the one or more colonies that have been cultured using the immobilizing agent.

Embodiment 29

The apparatus of embodiments 27 or 28:
wherein the at least one robot is configured to combine the one or more bead-bound cells with the immobilizing agent by performing at least one of streaking, spreading, or pouring in order to combine the one or more bead-bound cells with the immobilizing agent.

Embodiment 30

The apparatus of any of embodiments 27-29:
wherein the at least one robot is configured to combine the one or more bead-bound cells by placing the one or more bead-bound cells onto a surface of agar or an agar mixture, wherein the surface of the agar or the agar mixture is sufficiently solid such that the one or more bead-bound cells sit on the surface without the bead-bound cells fully penetrating the surface.

Embodiment 31

The apparatus of any of embodiments 27-30:
wherein the at least one processor is configured to generate a predetermined magnetic field for the immunomagnetic separation to be performed in a first well; and
wherein the at least one processor, after the immunomagnetic separation is performed, is configured to plate the one or more bead-bound cells in a second well.

Embodiment 32

The apparatus of any of embodiments 27-31:
wherein free beads are used to bind with target cells in order to generate the one or more bead-bound cells;
wherein at least some of the free beads are unbound to any of the target cells; and
wherein the apparatus is configured not to remove part or all of the free beads that are unbound after immunomagnetic separation or after culturing of the one or more colonies.

Embodiment 33

The apparatus of any of embodiments 27-32:
further comprising, after the immunomagnetic separation and prior to incubating, the at least one processor is further configured to control one or more structures in order to dilute the sample into a plurality of separate wells; and
wherein the at least one processor is configured to perform the enumerating based on image analysis while incubating to count the one or more colonies in the plurality of separate wells.

Embodiment 34

The apparatus of any of embodiments 27-33:
wherein the at least one processor is configured to perform the enumerating at different times during incubation in order to count the one or more colonies in the plurality of separate wells so that separate colonies are counted separately prior to merging during incubation.

Embodiment 35

The apparatus of any of embodiments 27-34:
wherein at least one robot is configured to plate the one or more bead-bound cells by adding immobilizing agent onto the one or more bead-bound cells, wherein the immobilizing agent added onto the one or more bead-bound cells is at least partly fluid or at least partly liquid.

Embodiment 36

The apparatus of any of embodiments 27-35:
wherein the one or more bead-bound cells are within a well; and
further comprising a magnetic field generator in communication with the at least one processor, the magnetic field generator being configured to apply a magnetic field to at least a part of the well and at least partly while the immobilizing agent solidifies in order to attract the one or more bead-bound cells to a predetermined section of the well and to immobilize the one or more bead-bound cells at the predetermined section of the well.

Embodiment 37

The apparatus of any of embodiments 27-36:
wherein the immunomagnetic separation is performed in a first well; and
wherein the at least one robot is configured to plate in a second well by:
first placing the one or more bead-bound cells onto a surface of an agar or an agar mixture, wherein the surface of the agar or the agar mixture is sufficiently solid such that the one or more bead-bound cells sits on the surface without the one or more bead-bound cells fully penetrating the surface; and
thereafter adding the immobilizing agent onto the one or more bead-bound cells, wherein the immobilizing agent added onto the one or more bead-bound cells is at least partly fluid or at least partly liquid, wherein the magnetic field is applied to at least a part of the second well at least partly while the immobilizing agent solidifies in order to attract the one or more bead-bound cells to a predetermined section of the second well and to immobilize the one or more bead-bound cells at the predetermined section of the second well.

Embodiment 38

The apparatus of any of embodiments 27-37:
wherein the immunomagnetic separation is performed in a first well; and
wherein after the immunomagnetic separation is performed in the first well, the at least one robot is configured to plate in the first well by:
after supernatant has been removed from the first well, adding the immobilizing agent into the first well and onto the one or more bead-bound cells, wherein the immobilizing agent added onto the one or more bead-bound cells is at least partly fluid or at least partly liquid and wherein the magnetic field is applied to at least a part of the first well at least partly while the immobilizing agent solidifies in order to attract the one or more bead-bound cells to a predetermined section of the first well and to immobilize the one or more bead-bound cells at the predetermined section of the first well.

Embodiment 39

The apparatus of any of embodiments 27-38:
wherein the at least one processor is configured to control at least one of plating or applying a magnetic field, thereby resulting in the one or more bead-bound cells being in a predetermined section of the well.

Embodiment 40

The apparatus of any of embodiments 27-39:
wherein the at least one processor is configured to control the plating of the one or more bead-bound cells onto agar or an agar mixture of sufficient solidity results in the one or more bead-bound cells being in the predetermined section of the well.

Embodiment 41

The apparatus of any of embodiments 27-40:
further comprising a magnetic field generator in communication with the at least one processor, the magnetic field generator being configured to apply a magnetic field to at least a part of a well containing the one or more bead-bound cells at least partly while an immobilizing agent added to the well solidifies in order to attract the one or more bead-bound cells to the predetermined section of the well and to immobilize the one or more bead-bound cells at the predetermined section of the well.

Embodiment 42

The apparatus of any of embodiments 27-41:
further comprising a magnetic field generator in communication with the at least one processor, the magnetic field generator being configured to apply a substantially evenly distributed magnetic field across an area in the predetermined section of the well in order to distribute a plurality of the bead-bound cells in the predetermined section of the well.

Embodiment 43

The apparatus of any of embodiments 27-42:
wherein, during or after applying the substantially evenly distributed magnetic field across the area, the at least one processor is configured to use one or more images generated by the at least one imaging sensor in order to count or enumerate in order to determine a number of colonies in at least a part of the area.

Embodiment 44

The apparatus of any of embodiments 27-43:
further comprising a magnetic field generator in communication with the at least one processor, the magnetic field generator being configured to apply a focused magnetic field at a center of well in the predetermined section of the well in order to attract a plurality of the bead-bound cells to the center of the well.

Embodiment 45

The apparatus of any of embodiments 27-44:
wherein, during or after applying the focused magnetic field across at the center of the well, the at least one processor is configured to use one or more images generated by the at least one imaging sensor in order to detect whether there are any colonies at the center of the well.

Embodiment 46

The apparatus of any of embodiments 27-45:
wherein the at least one processor is further configured to determine a type of colony for at least one colony from the one or more colonies.

Embodiment 47

The apparatus of any of embodiments 27-46:
wherein the at least one processor is configured to determine the type of colony of the at least one colony based on one or more of: a size of the at least one colony; a growth rate of the at least one colony; a color of the at least one colony; or a morphology of the at least one colony.

Embodiment 48

The apparatus of any of embodiments 27-47:
further comprising at least one extraction device configured to extract at least one colony from a respective well;
wherein the respective well includes a plurality of detected colonies; and
wherein the at least one processor is further configured to analyze one or more aspects of the plurality of detected colonies in order to automatically determine which of the plurality of detected colonies to extract from the respective well.

Embodiment 49

The apparatus of any of embodiments 27-48:
wherein the at least one processor is configured to automatically determine which of the plurality of detected colonies to extract on one or more of: a type of a respective colony; a size of the respective colony; a placement of the respective colony within a respective well; or separation of the respective colony from a nearest colony; and
wherein the at least one processor is configured to control the at least one extraction device to at least partly automatically extract at least one colony from the respective well based on the automatic determination of which of the plurality of detected colonies to extract.

Embodiment 50

The apparatus of any of embodiments 27-49:
wherein the at least one image sensor is configured to generate images of the respective well at predetermined times during incubation; and
wherein, responsive to obtaining an image at one of the predetermined times during incubation, the at least one processor is configured:
determine whether to extract at least one colony from the plurality of detected colonies; and
responsive to determining to extract the at least one colony, automatically control the at least one extraction device in order to extract the at least one colony from the respective well.

Embodiment 51

The apparatus of any of embodiments 27-50:
further comprising at least one extraction device; and
wherein the at least one processor is configured to control the at least one extraction device in order to remove the one or more colonies from a well in order to perform additional analysis on the one or more colonies.

The invention claimed is:
1. A method for detecting, enumerating, or extracting of one or more colonies of cells from a sample, the method comprising:
after performing immunomagnetic separation in order to separate one or more magnetic bead-bound cells from non-magnetic components, plating the one or more magnetic bead-bound cells by:
placing the one or more magnetic bead-bound cells on a surface of an immobilizing agent;
after placing the one or more magnetic bead-bound cells on the surface of the immobilizing agent, adding additional immobilizing agent onto the one or more magnetic bead-bound cells, wherein the additional immobilizing agent added onto the one or more magnetic bead-bound cells is fluid or liquid; and
applying a magnetic field on the additional immobilizing agent at least partly while the additional immobilizing agent solidifies under conditions that immobilize the one or more magnetic bead-bound cells in a predetermined section;
after plating the one or more magnetic bead-bound cells, incubating the one or more magnetic bead-bound cells under culture conditions that enable generation of one or more colonies formed by the one or more magnetic bead-bound cells; and
detecting, enumerating, or extracting of the one or more colonies formed by the one or more magnetic bead-bound cells; and
wherein extracting comprises removing the one or more colonies in order to perform additional analysis on the one or more colonies.

2. The method of claim 1, wherein plating the one or more magnetic bead-bound cells is by combining the one or more magnetic bead-bound cells with the immobilizing agent configured to culture the one or more colonies; and wherein detecting or enumerating is using the one or more colonies that have been cultured using the immobilizing agent.

3. The method of claim 2, wherein combining the one or more magnetic bead-bound cells with the immobilizing agent comprises performing at least one of streaking, spreading, or pouring the one or more magnetic bead-bound cells onto the immobilizing agent.

4. The method of claim 3, wherein the immobilizing agent comprises agar or an agar mixture; and wherein combining the one or more magnetic bead-bound cells with the immobilizing agent comprises placing the one or more magnetic bead-bound cells onto the surface of the agar or the agar mixture, wherein the surface of the agar or the agar mixture is sufficiently solid such that the one or more magnetic bead-bound cells sit on the surface without the one or more magnetic bead-bound cells fully penetrating the surface so that the one or more magnetic bead-bound cells are not immersed within the agar or the agar mixture.

5. The method of claim 4, wherein the method uses a first well and a second well;

wherein the immunomagnetic separation is performed in the first well; and wherein the plating is performed in the second well.

6. The method of claim 1, wherein applying the magnetic field comprises applying a substantially evenly distributed magnetic field across an area in the predetermined section in order to distribute a plurality of the magnetic bead-bound cells in the predetermined section.

7. The method of claim 6, wherein, during or after applying the substantially evenly distributed magnetic field across the area, counting or enumerating to determine a number of colonies in at least a part of the area.

8. The method of claim 1, wherein applying the magnetic field comprises applying a focused magnetic field at a center of at least one well in the predetermined section in order to attract a plurality of the magnetic bead-bound cells to the center of the well; and wherein, during or after applying the focused magnetic field across at the center of the well, detecting whether there are any colonies at the center of the well.

9. The method of claim 1, wherein the additional analysis comprises matrix-assisted laser desorption/ionization-time of flight (MALDI-TOF) mass spectrometry.

10. The method of claim 1, wherein free magnetic beads are used to bind with target cells in order to generate the one or more magnetic bead-bound cells;

wherein at least some of the free magnetic beads are unbound to any of the target cells; and wherein part or all of the free magnetic beads that are unbound are not removed after immunomagnetic separation or after culturing of the one or more colonies.

11. The method of claim 1, wherein detecting the one or more colonies formed by the one or more magnetic bead-bound cells is performed prior to removing the one or more colonies.

12. The method of claim 1, wherein enumerating the one or more colonies formed by the one or more magnetic bead-bound cells is performed prior to removing the one or more colonies.

13. The method of claim 12, wherein enumerating the one or more colonies formed by the one or more magnetic bead-bound cells comprises counting the one or more colonies formed by the one or more magnetic bead-bound cells.

14. The method of claim 1, wherein the one or more colonies formed by the one or more magnetic bead-bound cells are extracted from a first well and then placed into a second well; and wherein the one or more colonies are removed from the second well.

15. The method of claim 1, wherein the predetermined section is a predetermined focal plane.

16. A method for detecting, enumerating, or extracting of one or more colonies of cells from a sample, the method comprising:

after performing immunomagnetic separation in order to separate one or more magnetic bead-bound cells from non-magnetic components, plating the one or more magnetic bead-bound cells on at least one plate or in at least one well by:

placing the one or more magnetic bead-bound cells on a surface;

after placing the one or more magnetic bead-bound cells on the surface, adding immobilizing agent onto the one or more magnetic bead-bound cells, wherein the immobilizing agent added onto the one or more magnetic bead-bound cells is fluid or liquid; and applying a magnetic field at least partly while the immobilizing agent solidifies under conditions that immobilize the one or more magnetic bead-bound cells in a predetermined section;

incubating the one or more magnetic bead-bound cells in order to generate one or more colonies formed by the one or more magnetic bead-bound cells; and detecting, enumerating, or extracting the one or more colonies formed by the one or more magnetic bead-bound cells;

wherein plating the one or more magnetic bead-bound cells is by combining the one or more magnetic bead-bound cells with the immobilizing agent configured to culture the one or more colonies; and wherein detecting, enumerating, or extracting is using the one or more colonies that have been cultured using the immobilizing agent;

wherein free magnetic beads are used to bind with target cells in order to generate the one or more magnetic bead-bound cells;

wherein at least some of the free magnetic beads are unbound to any of the target cells; and wherein part or all of the free magnetic beads that are unbound are not removed after immunomagnetic separation or after culturing of the one or more colonies.

17. The method of claim 16, wherein the one or more magnetic bead-bound cells are plated using Petri dishes or wells.

18. The method of claim 16, wherein the one or more magnetic bead-bound cells are plated using at least one of: streaking plating; spreading plating; pouring plating; or pouring liquid immobilizing medium.

* * * * *